(12) United States Patent
Sunsdahl et al.

(10) Patent No.: US 9,434,244 B2
(45) Date of Patent: Sep. 6, 2016

(54) SIDE-BY-SIDE ATV

(71) Applicant: Polaris Industries Inc., Medina, MN (US)

(72) Inventors: Richard L. Sunsdahl, Badger, MN (US); Aaron D. Deckard, Zionsville, IN (US); Marcus J. Tullemans, Eden Prairie, MN (US); Richard E. Eck, Fond du Lac, WI (US); Jason C. Plugge, Coon Rapids, MN (US); Alan A. Meyer, Lafayette, IN (US); Laurie J. Rengel, Maple Grove, MN (US); Geoffrey G. White, Norway, MI (US); Thomas S. P. McCoubrey, Ste. Anne (CA); Brian M. Safranski, Standquist, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 13/776,588

(22) Filed: Feb. 25, 2013

(65) Prior Publication Data
US 2013/0161109 A1 Jun. 27, 2013

Related U.S. Application Data

(60) Division of application No. 12/409,176, filed on Mar. 23, 2009, now Pat. No. 8,382,125, which is a continuation of application No. 11/494,891, filed on Jul. 28, 2006, now Pat. No. 7,819,220.

(51) Int. Cl.
| B60K 5/00 | (2006.01) |
| B60K 17/02 | (2006.01) |
| B62D 21/20 | (2006.01) |
| B60N 2/01 | (2006.01) |
| B60K 17/348 | (2006.01) |
| B62D 21/18 | (2006.01) |

(52) U.S. Cl.
CPC ............... B60K 5/00 (2013.01); B60K 17/348 (2013.01); B60N 2/01 (2013.01); B62D 21/183 (2013.01)

(58) Field of Classification Search
CPC ......... B60K 5/12; B60K 13/02; B62D 21/00
USPC .............. 180/249, 291, 292, 311, 312, 68.4; 280/124.107, 781; 296/91
See application file for complete search history.

(56) References Cited

U.S. PATENT DOCUMENTS

| 1,031,497 A | 7/1912 | West |
| 1,648,536 A | 11/1927 | Brumbaugh |

(Continued)

FOREIGN PATENT DOCUMENTS

| DE | 4129643 A1 | 3/1993 |
| GB | 2347398 | 9/2000 |

(Continued)

OTHER PUBLICATIONS

Casucci, Piero, Lancia 037-Delta S4-Delta 4WD.*

(Continued)

Primary Examiner — Karen Beck
(74) Attorney, Agent, or Firm — Faegre Baker Daniels LLP

(57) ABSTRACT

The present invention relates to all terrain vehicles having at least a pair of laterally spaced apart seating surfaces. More particularly, the present invention relates to trail compliant side-by-side all terrain vehicles.

24 Claims, 32 Drawing Sheets

(56) References Cited

U.S. PATENT DOCUMENTS

| | | | | |
|---|---|---|---|---|
| 1,791,815 | A | 2/1931 | Jantsch | |
| 1,976,071 | A | 10/1934 | Hoffman | |
| 1,989,837 | A | 2/1935 | Walters et al. | |
| 2,203,290 | A | 6/1940 | Best | |
| 2,751,029 | A | 6/1956 | Dixon | |
| 2,755,875 | A | 7/1956 | Muller | |
| 2,757,017 | A | 7/1956 | Matthias et al. | |
| 2,757,747 | A | 8/1956 | MacPherson | |
| 2,833,366 | A | 5/1958 | Olley | |
| 2,856,201 | A | 10/1958 | Muller et al. | |
| 3,149,690 | A | 9/1964 | Rosenkrands et al. | |
| 3,193,302 | A | 7/1965 | Hill | |
| 3,292,944 | A | 12/1966 | Dangauthier | |
| 3,292,945 | A | 12/1966 | Dangauthier | |
| 3,448,994 | A | 6/1969 | King et al. | |
| 3,603,422 | A | 9/1971 | Cordiano | |
| 3,709,314 | A * | 1/1973 | Hickey | 180/249 |
| 3,712,416 | A | 1/1973 | Swanson et al. | |
| 3,760,770 | A | 9/1973 | Weaver et al. | |
| 3,791,482 | A | 2/1974 | Sykora | |
| 3,800,910 | A | 4/1974 | Rose | |
| 3,858,901 | A | 1/1975 | Johnson | |
| 3,966,014 | A | 6/1976 | Gowing | |
| 4,026,378 | A | 5/1977 | DePriester | |
| 4,109,751 | A | 8/1978 | Kabele | |
| 4,114,713 | A | 9/1978 | Mery | |
| 4,136,756 | A | 1/1979 | Kawamura | |
| 4,254,746 | A | 3/1981 | Chiba et al. | |
| 4,342,533 | A | 8/1982 | Hane | |
| 4,358,072 | A | 11/1982 | Williamson | |
| 4,425,976 | A | 1/1984 | Kimura | |
| 4,505,169 | A | 3/1985 | Ganoung | |
| 4,592,316 | A | 6/1986 | Shiratsuchi et al. | |
| 4,600,072 | A | 7/1986 | Krude | |
| 4,641,854 | A | 2/1987 | Masuda et al. | |
| 4,648,620 | A | 3/1987 | Nuss | |
| 4,681,178 | A | 7/1987 | Brown | |
| 4,693,134 | A | 9/1987 | Kraus | |
| 4,696,508 | A | 9/1987 | Brautigam | |
| 4,705,128 | A | 11/1987 | Krude | |
| 4,721,178 | A | 1/1988 | Ito | |
| 4,765,647 | A | 8/1988 | Kondo et al. | |
| 4,773,675 | A * | 9/1988 | Kosuge | 280/781 |
| 4,798,400 | A | 1/1989 | Kosuge | |
| 4,805,720 | A | 2/1989 | Clenet | |
| 4,817,985 | A | 4/1989 | Enokimoto | |
| 4,969,661 | A | 11/1990 | Omura et al. | |
| 4,974,697 | A | 12/1990 | Krude | |
| 4,981,193 | A | 1/1991 | Lings | |
| 5,016,728 | A | 5/1991 | Zulawski | |
| 5,033,567 | A | 7/1991 | Washburn et al. | |
| 5,036,938 | A | 8/1991 | Blount | |
| 5,036,939 | A | 8/1991 | Johnson et al. | |
| 5,046,753 | A | 9/1991 | Giovanni | |
| 5,048,860 | A | 9/1991 | Kanai et al. | |
| RE33,769 | E | 12/1991 | Harrod | |
| 5,074,374 | A | 12/1991 | Ohtake et al. | |
| 5,203,585 | A | 4/1993 | Pierce | |
| 5,234,247 | A * | 8/1993 | Pacer | 296/91 |
| 5,251,713 | A * | 10/1993 | Enokimoto | 180/68.4 |
| 5,251,718 | A | 10/1993 | Inagawa et al. | |
| 5,252,713 | A | 10/1993 | Morgan et al. | |
| 5,327,989 | A * | 7/1994 | Furuhashi et al. | 180/248 |
| 5,373,910 | A | 12/1994 | Nixon | |
| 5,477,936 | A | 12/1995 | Sugioka et al. | |
| 5,507,510 | A | 4/1996 | Kami et al. | |
| 5,513,721 | A | 5/1996 | Ogawa | |
| 5,562,066 | A | 10/1996 | Gere et al. | |
| 5,566,591 | A | 10/1996 | Burkett | |
| 5,697,633 | A | 12/1997 | Lee | |
| 5,833,023 | A | 11/1998 | Shimizu | |
| 5,833,026 | A | 11/1998 | Zetterstrom et al. | |
| 5,950,748 | A * | 9/1999 | Matsumoto et al. | 180/6.24 |
| 5,954,364 | A | 9/1999 | Nechushtan | |
| 5,961,135 | A | 10/1999 | Smock | |
| 6,054,844 | A | 4/2000 | Frank | |
| 6,056,077 | A | 5/2000 | Kobayashi | |
| 6,056,078 | A * | 5/2000 | Pham | 180/219 |
| 6,070,689 | A * | 6/2000 | Tanaka et al. | 180/291 |
| 6,149,540 | A | 11/2000 | Johnson | |
| 6,152,253 | A | 11/2000 | Monoghan | |
| 6,216,809 | B1 | 4/2001 | Etou et al. | |
| 6,224,046 | B1 | 5/2001 | Miyamoto | |
| 6,247,442 | B1 | 6/2001 | Bedard et al. | |
| RE38,012 | E | 3/2003 | Ochab et al. | |
| 6,581,716 | B1 | 6/2003 | Matsuura | |
| 6,588,536 | B1 | 7/2003 | Chiu | |
| 6,622,806 | B1 | 9/2003 | Matsuura | |
| 6,626,256 | B2 | 9/2003 | Dennison et al. | |
| 6,631,775 | B1 | 10/2003 | Chaney | |
| 6,651,768 | B2 | 11/2003 | Fournier et al. | |
| 6,655,717 | B1 | 12/2003 | Wang | |
| 6,659,566 | B2 | 12/2003 | Bombardier | |
| 6,732,830 | B2 | 5/2004 | Gagnon et al. | |
| 6,745,862 | B2 | 6/2004 | Morii et al. | |
| D497,324 | S | 10/2004 | Chestnut et al. | |
| D503,658 | S | 4/2005 | Lu | |
| 6,892,847 | B2 | 5/2005 | Seiki | |
| 7,004,137 | B2 | 2/2006 | Kunugi et al. | |
| 7,040,437 | B1 | 5/2006 | Fredrickson et al. | |
| 7,055,454 | B1 | 6/2006 | Whiting et al. | |
| 7,143,861 | B2 | 12/2006 | Chu | |
| D535,215 | S | 1/2007 | Turner et al. | |
| 7,159,557 | B2 | 1/2007 | Yasuda et al. | |
| 7,168,516 | B2 * | 1/2007 | Nozaki et al. | 180/68.3 |
| 7,172,232 | B2 | 2/2007 | Chiku et al. | |
| 7,195,001 | B1 | 3/2007 | Pallett | |
| D549,133 | S | 8/2007 | LePage | |
| 7,258,355 | B2 | 8/2007 | Amano | |
| 7,270,336 | B2 | 9/2007 | Fujimori | |
| 7,275,512 | B2 | 10/2007 | Deiss et al. | |
| D555,036 | S | 11/2007 | Eck | |
| D563,274 | S | 3/2008 | Ramos | |
| 7,347,490 | B2 | 3/2008 | Kobayashi et al. | |
| 7,357,207 | B2 | 4/2008 | Vaisanen | |
| 7,357,211 | B2 * | 4/2008 | Inui | 180/266 |
| 7,367,417 | B2 * | 5/2008 | Inui et al. | 180/89.2 |
| 7,377,342 | B2 | 5/2008 | Miyazaki | |
| 7,377,522 | B2 | 5/2008 | MacIsaac | |
| 7,380,805 | B1 | 6/2008 | Turner | |
| 7,401,797 | B2 | 7/2008 | Cho | |
| 7,434,822 | B2 | 10/2008 | Takahashi | |
| 7,461,864 | B2 * | 12/2008 | Ervin | 280/781 |
| 7,506,718 | B2 | 3/2009 | Morita et al. | |
| 7,575,088 | B2 | 8/2009 | Mir et al. | |
| 7,591,472 | B2 | 9/2009 | Kinjyo et al. | |
| 7,600,769 | B2 * | 10/2009 | Bessho et al. | 280/124.109 |
| 7,631,721 | B2 | 12/2009 | Hobbs | |
| 7,650,959 | B2 * | 1/2010 | Kato et al. | 180/312 |
| 7,708,103 | B2 | 5/2010 | Hiroshi et al. | |
| 7,708,106 | B1 | 5/2010 | Bergman et al. | |
| 8,052,202 | B2 | 11/2011 | Nakamura | |
| 8,100,434 | B2 * | 1/2012 | Miura | 280/781 |
| 8,215,443 | B2 | 7/2012 | Miura | |
| 8,225,901 | B2 * | 7/2012 | Ohtsuki et al. | 180/312 |
| 8,464,827 | B2 | 6/2013 | Tsumiyama et al. | |
| 8,499,882 | B2 | 8/2013 | Tsumiyama et al. | |
| 8,505,662 | B2 | 8/2013 | Schwarz | |
| 8,567,543 | B2 | 10/2013 | Kubota | |
| 8,585,068 | B2 | 11/2013 | Schlangen et al. | |
| 8,662,239 | B2 * | 3/2014 | Takagi | 180/291 |
| 8,746,719 | B2 | 6/2014 | Safranski et al. | |
| 8,936,126 | B2 | 1/2015 | Nitawaki | |
| 2002/0023792 | A1 | 2/2002 | Bouffard et al. | |
| 2003/0137121 | A1 | 7/2003 | Lenz et al. | |
| 2004/0031639 | A1 * | 2/2004 | Deves et al. | 180/311 |
| 2004/0195019 | A1 | 10/2004 | Kato | |
| 2004/0195028 | A1 | 10/2004 | Izumi | |
| 2004/0195034 | A1 * | 10/2004 | Kato et al. | 180/312 |
| 2004/0206567 | A1 * | 10/2004 | Kato et al. | 180/291 |
| 2004/0206568 | A1 | 10/2004 | Davis et al. | |
| 2004/0217568 | A1 | 11/2004 | Gradu | |
| 2005/0056472 | A1 | 3/2005 | Smith et al. | |
| 2005/0073126 | A1 | 4/2005 | Seki | |

(56) References Cited

U.S. PATENT DOCUMENTS

| | | | |
|---|---|---|---|
| 2005/0173180 A1* | 8/2005 | Hypes et al. | 180/292 |
| 2005/0206111 A1 | 9/2005 | Gibson et al. | |
| 2006/0000458 A1 | 1/2006 | Dees et al. | |
| 2006/0032700 A1 | 2/2006 | Vizanko | |
| 2006/0071441 A1 | 4/2006 | Mathis | |
| 2006/0180383 A1* | 8/2006 | Bataille et al. | 180/311 |
| 2006/0236980 A1 | 10/2006 | Maruo et al. | |
| 2006/0273539 A1* | 12/2006 | Barth et al. | 280/124.107 |
| 2006/0289224 A1 | 12/2006 | Ono et al. | |
| 2007/0023221 A1 | 2/2007 | Okuyama et al. | |
| 2007/0023566 A1 | 2/2007 | Howard | |
| 2007/0119650 A1 | 5/2007 | Eide | |
| 2007/0170681 A1 | 7/2007 | Nelson et al. | |
| 2007/0227793 A1 | 10/2007 | Nozaki et al. | |
| 2008/0289896 A1 | 11/2008 | Kosuge | |
| 2009/0090575 A1 | 4/2009 | Nagasaka | |
| 2009/0127813 A1 | 5/2009 | Stewart | |
| 2010/0078256 A1* | 4/2010 | Kuwabara et al. | 180/337 |
| 2010/0133800 A1 | 6/2010 | Buschjohann et al. | |
| 2011/0024258 A1 | 2/2011 | Avny et al. | |
| 2011/0094818 A1* | 4/2011 | Suzuki et al. | 180/292 |
| 2011/0209937 A1* | 9/2011 | Belzile et al. | 180/291 |
| 2011/0284299 A1 | 11/2011 | Takahashi | |
| 2012/0125702 A1 | 5/2012 | Bergfjord | |
| 2012/0193163 A1* | 8/2012 | Wimpfheimer et al. | 180/233 |
| 2012/0223500 A1* | 9/2012 | Kinsman et al. | 280/124.153 |
| 2013/0048406 A1 | 2/2013 | Kuramoto | |
| 2013/0048407 A1 | 2/2013 | Kuramoto et al. | |
| 2013/0075183 A1 | 3/2013 | Kochidomari et al. | |
| 2013/0234412 A1 | 9/2013 | Kuroda | |
| 2013/0294856 A1 | 11/2013 | Mueller et al. | |
| 2013/0319784 A1* | 12/2013 | Kennedy et al. | 180/292 |
| 2013/0319785 A1* | 12/2013 | Spindler et al. | 180/292 |
| 2014/0034409 A1* | 2/2014 | Nakamura et al. | 180/291 |
| 2014/0374183 A1 | 12/2014 | Sunsdahl et al. | |
| 2014/0374184 A1 | 12/2014 | Sunsdahl et al. | |
| 2015/0375614 A1 | 12/2015 | Osaki | |

FOREIGN PATENT DOCUMENTS

| | | |
|---|---|---|
| JP | 60067206 | 4/1985 |
| WO | WO 2008/005131 A2 | 1/2008 |

OTHER PUBLICATIONS

Casucci, Piero. Lancia: 037-DeltaS4-Delta4WD, Giovanna Mazzocci Bordone, 1987.*
Peugeot 205 1.6 GTI (1986), the-blueprints.com/blueprints/cars/peugeot/57693/view/peugeot_205_1_6_gti_(1986)/.*
Response to Final Office Action and RCE filed Jan. 17, 2013, in corresponding U.S. Appl. No. 11/494,890; 24 pages.
Non-final Office Action mailed Apr. 5, 2013 in corresponding U.S. Appl. No. 11/494,890; 16 pages.
Second Declaration of Aaron Deckard, dated Jan. 17, 2013; 2 pages.
Response to Non-final Office Action filed Jul. 1, 2013, in corresponding U.S. Appl. No. 11/494,890; 31 pages.
Amendment and Request for Continued Prosecution filed Oct. 11, 2012, for corresponding U.S. Appl. No. 12/925,560; 9 pages.
Non-final Office Action mailed Nov. 28, 2012, for corresponding U.S. Appl. No. 12/925,560; 13 pages.
Response to Non-final Office Action filed Apr. 29, 2013, in corresponding U.S. Appl. No. 12/925,560; 13 pages.
Final Office Action mailed Jun. 7, 2013 for corresponding U.S. Appl. No. 12/925,560; 16 pages.
Response to Final Office Action filed Jul. 1, 2013 in corresponding U.S. Appl. No. 12/925,560; 13 pages.
Polaris 2004 Sportsman 700 EFI Service Manual; Copyright 2003; 2 pages.
Non-final Office Action mailed Apr. 29, 2014 in corresponding U.S. Appl. No. 11/494,890; 5 pages.
Applicant's Amendment After Non-Final Rejection filed May 16, 2014 in corresponding U.S. Appl. No. 11/494,890; 22 pages.

CFMOTO's Mar. 15, 2014 Second Amended Prior Art/Invalidity claim chart; 20 pages.
Defendants' Ex. W The Illustrated Encyclopedia of Military Vehicles, Iam V. Hogg and John Weeks, 1980 New Berlington Books, p. 63, 207; 6 pages.
Defendants' Ex. X, Technical Report ARBRL-TR-02054, A Combinatorial Geometry Computer Description of the SR311 Vehicle, Jemes E. Shiells, Apr. 1978; 209 pages.
Defendants' Ex. Y, The XR311 Story, as posted on www.meisterburg.com (Archive version from Jun. 2, 2003 produced); 4 pages.
Defendants' Ex. Z, 1971 XR311, Fourwheeler Magazine Feb. 1, 2013, Jim Allen, www.fourwheeler.com/features/129-1302-february-2013-backward-glances/ ; 5 pages.
Defendants' Ex. AA, The Humvee (FMC), www.angelfire.com/nb2/jeeppickups/humvee.html ; Mar. 7, 2014; 9 pages.
Defendants' Ex. BB, XR311 Experimental Attack Vehicle, photographed by Mike Burton at www.svsm.org/gallery/sr311; Feb. 26, 2014; 16 pages.
Defendants' Ex. CC, FMC XR311, www.bellum.nu/armoury/FMCXR311.html (Archived version from Jun. 21, 2006 produced); 2 pages.
Defendants' Ex. DD, FMC XR311, www.wikipedia.org/wiki/FMC_XR311; Mar. 11, 2014; 3 pages.
Defendants' Ex. EE, YouTube video, Real XR-311 Vehicle Promotional Not Tamiya Product XR-311, http://www.youtube.com/watch?v=wmnmleyBbes; (Date Unknown).
Defendants' Ex. FF, YouTube video, Restored XR311 Military Prototype Vehicle, http://www.youtube.com/watch?v=mib9rBHRIDM; (Date Unknown).
Defendants' Ex. GG, YouTube video, XR311 007 Military Prototype First Start Since 1970s, http://www.youtube.com/watch?v=q_ZoUNX4W4A.
Defendants' Ex. HH, YouTube video, XR311 007 Military Prototype Vehicle Progress, http://www.youtube.com/watch?v=QSobtJHeheo; (Date Unknown).
Defendants' Ex. II, YouTube video, XR311 007 Military Vehicle Sounds, http://www.youtube.com/watch?v=MfYAY-V2kEI; (Date Unknown).
Defendants' Ex. JJ, James Glickenhaus brings the Hurst Baja Boot back to Monterey, Justin Hyde, http://jalopnik.com/5832752/james-glickenhaus-brings-the-hurst-baja-boot-to-monterey; Aug. 21, 2011; 4 pages.
Defendants' Ex. KK, James Glickenhaus buys Steve McQueen's Baja Boot, Ben Wojdyla, http://jalopnik.com/5620733/james-glickenhaus-buys-steve-mcqueens-baja-boot; Aug. 24, 2011; 2 pages.
Defendants' Ex. LL, Steve McQueen and the 450 hp Dune Buggy, www.silodrome.com; Mar. 12, 2014; 7 pages.
Defendants' Ex. MM, Conceptcarz.com 1967 Chevrolet Baja Boot images, www.conceptcarz.com; Mar. 7, 2014; 22 pages.
Defendants' Ex. NN, Class3racing.com Baja Boot images, Dec. 16, 2007; 7 pages.
Defendants' Ex. OO, Re: Front Suspension: Torsion Bar?, Dale Meisen, www.dune-buggy.com, Sep. 6, 2002, www.dune-buggy.com/buggytalk/buggytalkarchive.cgi?read=152999; 2 pages.
Defendants' Ex. PP, The Baja Boot 'off road' vehicle, Steve McQueen online, www.mcqueenonline.com; Mar. 12, 2014; 2 pages.
Defendants' Ex. QQ, 30 Years of Baja Racing, 4Wheel and Off Road Magazine, Peter MacGillivray, Mar. 1, 1998, www.fourwheeler.com; Mar. 12, 2014; 6 pages.
Defendants' Ex. RR, YouTube video, 1967 Baja 1000 Part I; http://www.youtube.com/watch?v=qVs9V0oRD-Q.
The pleading related to CFMOTO's Jan. 27, 2014 Answer and Counterclaims; 29 pages.
Redacted Deposition Transcript of Eric J. Groen dated Dec. 21, 2011; 15 pages.
Exhibit 2 to Deposition of Eric J. Groen dated Dec. 21, 2011; 35 pages.
Excerpts to Exhibit 3 to Deposition of Eric J. Groen dated Dec. 21, 2011; 15 pages.

(56) References Cited

OTHER PUBLICATIONS

Exhibit 4 to Deposition of Eric J. Groen dated Dec. 21, 2011; 29 pages.
Redacted Errata Sheet of Deposition of Eric J. Groen dated Dec. 21, 2011; 2 pages.
Redacted Deposition Transcript of Aaron Deckard; Feb. 27, 2012; 66 pages.
Exhibit 3 to Deposition of Aaron Deckard; Feb. 27, 2012; 35 pages.
Exhibit 5 to Deposition of Aaron Deckard; Feb. 27, 2012; 7 pages.
Exhibit 6 to Deposition of Aaron Deckard; Feb. 27, 2012; 14 pages.
Exhibit 7 to Deposition of Aaron Deckard; Feb. 27, 2012; 65 pages.
Excerpts to Exhibit 8 to Deposition of Aaron Deckard; Feb. 27, 2012; 5 pages.
Exhibit 9 to Deposition of Aaron Deckard; Feb. 27, 2012; 10 pages.
Exhibit 10 to Deposition of Aaron Deckard; Feb. 27, 2012; 2 pages.
Excerpts to Exhibit 11 to Deposition of Aaron Deckard; Feb. 27, 2012; 13 pages.
Exhibit 12 to Deposition of Aaron Deckard; Feb. 27, 2012; 1 page.
Exhibit 23 to Deposition of Aaron Deckard; Feb. 27, 2012; 1 page.
"Hart's Hunter," Dirt Wheels Magazine, Dec. 1998; pp. 69-71 and 74; 4 pages.
ridgerunner.biz, "Let's start with a basic premise: Thre is nothing that an ATV or Quad can do that a Ridge Runner Rough Terrain Vehicle (TTV) won't do better," Jun. 5, 2004; 5 pages.
ridgerunner.biz, Ridge Runner product specifications; Jun. 7, 2004; 1 page.
ridgerunner.biz, "Why Even Consider Buying a Two-Seat Ridge Runner?" Sep. 2, 2004; 11 pages.
ridgerunner.biz, "Why Even Consider Buying a Two-Seat Ridge Runner?" Dec. 10, 2004; 4 pages.
ridgerunner.biz, "Ridge Runner Introduces It's New 2006 RTX800," Sep. 18, 2005; 5 pages.
ridgerunner.biz, "Ridge Runner Introduces It's New 2006 RTX800," Dec. 25, 2005; 9 pages.
ridgerunner.biz, " 'New' Ridge Runner™ 800 Packages, The 'Fully-Loaded' RTX800™, The 'Basic' 800-B, Ridge Runner's Gather in Moab, Utah," Jun. 13, 2006; 3 pages.
Color Exhibit 5 to Deposition of Aaron Deckard; Feb. 27, 2012; 7 pages.
Color Exhibit 6 to Deposition of Aaron Deckard; Feb. 27, 2012; 14 pages.
Color Exhibit 7 to Deposition of Aaron Deckard; Feb. 27, 2012; 65 pages.
Color Excerpts to Exhibit 8 to Deposition of Aaron Deckard; Feb. 27, 2012; 5 pages.
Color Exhibit 9 to Deposition of Aaron Deckard; Feb. 27, 2012; 10 pages.
Color Exhibit 10 to Deposition of Aaron Deckard; Feb. 27, 2012; 2 pages.
Color Excerpts to Exhibit 11 to Deposition of Aaron Deckard; Feb. 27, 2012; 11 pages.
Defendants' Ex. SS, U.S. Appl. No. 60/750,945 for Hybrid suspension system filed Dec. 16, 2005; 74 pages.
Defendants' Ex. TT, "Volkswagen Schwimmwagen" Article from Wikipedia, Mar. 13, 2014; 4 pages.
Joint claim construction filed Jan. 30, 2012 in *Polaris Industries Inc.* vs *CFMOTO Powersports, Inc., et al.* United States District Court District of Minnesota, case 10-cv-04362 (JNE/JJG); 613 pages.
Cover pages to Polaris' May 5, 2014 response to CFMOTO's Second Amended Prior Art/Invalidity claim chart filed on Mar. 15, 2014; 8 pages.
Exhibit A-1 to Polaris' May 5, 2014 response to CFMOTO's Second Amended Prior Art/Invalidity claim chart filed on Mar. 15, 2014; 92 pages.
Exhibit A-2 to Polaris' May 5, 2014 response to CFMOTO's Second Amended Prior Art/Invalidity claim chart filed on Mar. 15, 2014; 206 pages.
Exhibit A-3 to Polaris' May 5, 2014 response to CFMOTO's Second Amended Prior Art/Invalidity claim chart filed on Mar. 15, 2014; 37 pages.

Notice of Allowance mailed Jul. 29, 2013 in corresponding U.S. Appl. No. 12/925,560 (now U.S. Pat. No. 8,596,405); 9 pages.
Amendment (in Response to Notice of NonCompliant Amendment) filed Dec. 23, 2013 in U.S. Appl. No. 11/494,890; 23 pages.
Plaintiff's Artic Cat Inc., et al, First Amended Complaint, filed Apr. 29, 2014 in *Artic Cat Inc., et al.* vs. *Polaris Industries Inc., et al.* United States District Court District of Minnesota, Civil Action No. 0:13-cv-03579-MJD/FLN; 42 pages.
Amended Joint Claim Construction Statement filed Jun. 27, 2014, in *Polaris Industries Inc.* vs *CFMOTO Powersports, Inc., et al.* United States District Court District of Minnesota, case 10-cv-04362 (JNE/JJG); 8 pages.
Appendix A to Amended Joint Claim Construction Statement filed Jun. 27, 2014, in *Polaris Industries Inc.* vs *CFMOTO Powersports, Inc., et al.* United States District Court District of Minnesota, case 10-cv-04362 (JNE/JJG); 56 pages.
Appendix B to Amended Joint Claim Construction Statement filed Jun. 27, 2014, in *Polaris Industries Inc.* vs *CFMOTO Powersports, Inc., et al.* United States Districtcourt District of Minnesota, case 10-cv-04362 (JNE/JJG); 4 pages.
Petition for Inter Partes Review filed by Arctic Cat Inc., Case No. IPR2014-01427 filed Aug. 29, 2014; 58 pages.
Petition for Inter Partes Review filed by Arctic Cat Inc., Case No. IPR2014-01428 filed Aug. 29, 2014; 55 pages.
Declaration of Dr. Gregory W. Davis Ph.D., P.E., dated Aug. 29, 2014, in Support of Arctic Cat's Petition for Inter Partes Review, Case Nos. IPR2014-01427 and IPR2014-01428; 148 pages.
Appendix A to Declaration of Dr. Gregory W. Davis Ph.D., P.E.—Curriculum Vitae of Dr. Gregory W. Davis Ph.D., P.E., (Aug. 2014); 10 pages.
Appendix B to Declaration of Dr. Gregory W. Davis Ph.D., P.E.—Chapter 1 of Duffy's "Auto Drive Trains", pp. 1-23 (1995); 26 pages.
Appendix C to Declaration of Dr. Gregory W. Davis Ph.D., P.E.—*Cistalia: Porsche Type 360*, The Autocar, pp. 134-135 (1961); 4 pages.
Appendix D to Declaration of Dr. Gregory W. Davis Ph.D., P.E.—Williams, Big Wheeling in Virginia, Petersen's 4Wheel & Off-Road, pp. 110-111 (2005); 4 pages.
Appendix E to Declaration of Dr. Gregory W. Davis Ph.D., P.E.—Toyo Tires Advertisement, Four Wheeler—2 pages (Dec. 2005); 3 pages.
Appendix F to Declaration of Dr. Gregory W. Davis Ph.D., P.E.—BFGoodrich Take Control (Advertisement), Four Wheeler-2 pages (Jun. 2003); 3 pages.
Complaint, *Arctic Cat, Inc. et al.* v. *Polaris Indus. Inc.*, filed Dec. 19, 2013, Case No. 0:13-cv-03579; 124 pages.
Complaint, *Polaris Indus. Inc.* v. *Arctic Cat, Inc.*, filed Dec. 20, 2013, Case No. 0:13-cv-03595; 46 pages.
Complaint, *Polaris Indus. Inc.* v. *CFMOTO Powersports, Inc. et al.*, filed Oct. 26, 2010, Case No. 0:10-cv-04362; 49 pages.
Memorandum Opinion and Order, *Artic Cat, Inc. et al.* v. *Polaris Industries Inc., et al.*, Civil No. 13-3579 (JRT/FLN) and *Polaris Industies Inc.* v. *Artic Cat, Inc.*, Civil No. 13-3595 (JRT/FLN); filed Oct. 20, 2014, Case No. 0:13-03579-JRT-FLN; 56 pages.
Artic Cat's Answer and Counterclaims, *Polaris Industries Inc., et al.* v. *Artic Cat, Inc. et al*, filed Oct. 1, 2014, Case No. 0:14-cv-03412-JRT-FLN; 39 pages.
Plaintiffs' Artic Cat Inc., et al, Prior Art Statement, Jan. 22, 2015, in *Artic Cat Inc., et al.* vs *Polaris Industries Inc., et al.* United States District Court District of Minnesota, Civil Action No. 0:13-cv-03579-JRT/FLN; 13 pages.
Exhibit A to Artic Cat Inc.'s Prior Art Statement—Disclosure of Claim Elements of U.S. Pat. No. 8,596,405 by Ridge Runner; 45 pages.
Exhibit B to Artic Cat Inc.'s Prior Art Statement—Disclosure of Claim Elements of U.S. Pat. No. 8,596,405 by Honda Odyssey FL350 ATV; 49 pages.
Exhibit C to Artic Cat Inc.'s Prior Art Statement—Disclosure of Claim Elements of U.S. Pat. No. 8,596,405 by Honda Pilot FL400 ATV; 58 pages.

(56) References Cited

OTHER PUBLICATIONS

Exhibit D to Artic Cat Inc.'s Prior Art Statement—Disclosure of Claim Elements of U.S. Pat. No. 8,596,405 by FMC XR311; 45 pages.
Exhibit E to Artic Cat Inc.'s Prior Art Statement—Disclosure of Claim Elements of U.S. Pat. No. 8,596,405 by Lancia Delta S4; 46 pages.
Exhibit F to Artic Cat Inc.'s Prior Art Statement—Disclosure of Claim Elements of U.S. Pat. No. 8,596,405 by Peugeot 205 Turbo; 52 pages.
Exhibit G to Artic Cat Inc.'s Prior Art Statement—Disclosure of Claim Elements of U.S. Pat. No. 8,596,405 by Polaris Vista Vehicle; 45 pages.
Exhibit H to Artic Cat Inc.'s Prior Art Statement—Disclosure of Claim Elements of U.S. Pat. No. 8,596,405 by Marty Hart Conversion Vehicles; 36 pages.
Exhibit I to Artic Cat Inc.'s Prior Art Statement—Disclosure of Claim Elements of U.S. Pat. No. 8,596,405 by Volkswagon Beetle; 28 pages.
Exhibit J to Artic Cat Inc.'s Prior Art Statement—Disclosure of Claim Elements of U.S. Pat. No. 8,596,405 by Yamaha Rhino 660; 39 pages.
Exhibit K to Artic Cat Inc.'s Prior Art Statement—Disclosure of Claim Elements of U.S. Pat. No. 8,596,405 by U.S. Pat. No. 2004/0195034 (Kato); 40 pages.
Exhibit L to Artic Cat Inc.'s Prior Art Statement—Disclosure of Claim Elements of U.S. Pat. No. 8,596,405 by U.S. Pat. No. 7,377,342 to (Miyazaki); 33 pages.
Exhibit M to Artic Cat Inc.'s Prior Art Statement—Disclosure of Claim Elements of U.S. Pat. No. 8,596,405 by U.S. Pat. No. 3,709,314 (Hickey); 36 pages.
Exhibit N To Artic Cat Inc.'s Prior Art Statement—Disclosure of Claim Elements of U.S. Pat. No. 8,596,405 by U.S. Pat. No. 5,251,713 (Enokimoto); 34 pages.
Exhibit O to Artic Cat Inc.'s Prior Art Statement—Disclosure of Claim Elements of U.S. Pat. No. 8,596,405 by U.S. Pat. No. 3,366,411 (Vittone); 28 pages.
Exhibit P to Artic Cat Inc.'s Prior Art Statement—Disclosure of Claim Elements of U.S. Pat. No. 8,596,405 by U.S. Pat. No. 2004/0195797 (Nash); 41 pages.
Exhibit Q to Artic Cat Inc.'s Prior Art Statement—Disclosure of Claim Elements of U.S. Pat. No. 8,596,405 by U.S. Pat. No. 4,817,985 (Masuda); 30 pages.
Exhibit R to Artic Cat Inc.'s Prior Art Statement—Disclosure of Claim Elements of U.S. Pat. No. 8,596,405 by U.S. Pat. No. 7,658,258 (Denney); 31 pages.
Exhibit S to Artic Cat Inc.'s Prior Art Statement—Disclosure of Claim Elements of U.S. Pat. No. 8,596,405 by U.S. Pat. No. 5,327,989 (Furuhashi); 40 pages.
Non-final Office Action mailed Jun. 27, 2014, in corresponding U.S. Appl. No. 14/094,747; 16 pages.
Response to Office Action filed Dec. 22, 2014 in corresponding U.S. Appl. No. 14/094,747; 10 pages.
Final Office Action mailed Jan. 14, 2015 in corresponding U.S. Appl. No. 14/094,747; 17 pages.
Response to Office Action filed Apr. 14, 2015 in corresponding U.S. Appl. No. 14/094,747; 19 pages.
Non-final Office Action mailed Feb. 11, 2015 in corresponding U.S. Appl. No. 14/478,689; 13 pages.
Non-final Office Action mailed Oct. 16, 2014 in corresponding U.S. Appl. No. 14/478,700; 14 pages.
Response to Office Action filed Jan. 16, 2015 in corresponding U.S. Appl. No. 14/478,700; 16 pages.
Final Office Action mailed Mar. 17, 2015 in corresponding U.S. Appl. No. 14/478,700; 21 pages.
Notice of Allowance mailed Jul. 23, 2014 in corresponding U.S. Appl. No. 11/494,890; 13 pages.
Inter Partes Review Decision, dated Feb. 13, 2015, *Artic Cat, Inc.* v. *Polaris Industries Inc.*, Case No. IPR2014-01427; 16 pages.
Inter Partes Review Decision, dated Feb. 13, 2015, *Artic Cat, Inc.* v. *Polaris Industries Inc.*, Case No. IPR2014-01428; 29 pages.
Decision to Institute 37 C.F.R. § 42.108, dated Feb. 3, 2016, *Arctic Cat, Inc.* v. *Polaris Industries, Inc.*, United States Patent and Trademark Office before the Patent Trial and Appeal Board, Case IPR2015-01783, 22 pages.
Decision Institute of Inter Partes Review 37 C.F.R. § 42.108, dated Feb. 3, 2016, *Arctic Cat, Inc.* v. *Polaris Industries, Inc.*, United States Patent and Trademark Office before the Patent Trial and Appeal Board, Case IPR2015-01781, 34 pages.
Final Written Decision, 35 U.S.C. § 318(a) and 37 C.F.R. § 42.73, dated Feb. 4, 2016, *Arctic Cat, Inc.* v. *Polaris Industries, Inc.*, United States Patent and Trademark Office before the Patent Trial and Appeal Board, Case IPR2014-01428, 18 pages.
Final Written Decision, 35 U.S.C. § 318(a) and 37 C.F.R. § 42.73, dated Feb. 4, 2016, *Arctic Cat, Inc.* v. *Polaris Industries, Inc.*, United States Patent and Trademark Office before the Patent Trial and Appeal Board, Case IPR2014-01427, 40 pages.
Arctic Cat's First Amended Answer and Counterclaim, *Polaris Industries Inc., a Delaware Corporation, Plaintiff,* v. *Arctic Cat Inc.,* a Minnesota Corporation, and Arctic Cat Sales Inc., a Minnesota Corporation, Minnesota District, Civil Action No. 2015cv04475; filed Feb. 18, 2016, 33 pages.
Final Rejection issued Mar. 22, 2016 in corresponding U.S. Appl. No. 14/478,689, 23 pages.
Response to Final Office Action and Rce filed Apr. 21, 2016 in corresponding U.S. Appl. No. 14/478,700; 19 pages.
Non-final Office Action mailed May 11, 2016 in corresponding U.S. Appl. No. 14/478,700; 16 pages.
Non-final Office Action mailed Mar. 16, 2016 in corresponding U.S. Appl. No. 14/094,747; 15 pages.
Response to Non-final Office Action filed May 5, 2016 in corresponding U.S. Appl. No. 14/094,747; 9 pages.
Non-final Office Action mailed on May 27, 2016 in corresponding U.S. Appl. No. 14/094,747; 15 pages.
""Tuning" up the chassis: suspension enhancements have moved beyond the 'street rodders.' Today, pickups, SUVs and even luxury cars are getting into the act," Mike Mavrigian, Motor Age, Dec. 1, 2002, vol. 121, Issue 12, 7 pages, Exhibit 1008, *Arctic Cat, Inc.* v. *Polaris Industries, Inc.*, United States Patent and Trademark Office before the Patent Trial and Appeal Board, Case IPR2015-01788 and Case IPR2015-01789.
""Anti-sway bars turn for the better," Bob Weber, Chicago Tribune, Jan. 7, 2002, http://articles.chicagotribune.com/2002-01-07/business/0201070119_1_bar-anti-sway-car, 6 pages, Exhibit 1009, *Arctic Cat, Inc.* v. *Polaris Industries, Inc.*, United States Patent and Trademark Office before the Patent Trial and Appeal Board, Case IPR2015-01788 and Case IPR2015-01789".
""Sand Styling" and "Deaton's Dream," Dune Buggies and Hot VWs, Sand Special, Oct. 2004 Edition, 7 pages, Exhibit 1010, *Arctic Cat, Inc.* v. *Polaris Industries, Inc.*, United States Patent and Trademark Office before the Patent Trial and Appeal Board, Case IPR2015-01788 and Case IPR2015-01789".
"Honda Service Manual'89 FL400R Pilot, Honda Motor Co., Ltd., Nov. 1988, 265 pages, Exhibit 1014, *Arctic Cat, Inc.* v. *Polaris Industries, Inc.*, United States Patent and Trademark Office before the Patent Trial and Appeal Board, Case IPR2015-01788 and Case IPR2015-01789".
"Odyssey 350 1985 Brochure, 1984 American Honda Motor Co., Inc., 6 pages, Exhibit 1015, *Arctic Cat, Inc.* v. *Polaris Industries, Inc.*, United States Patent and Trademark Office before the Patent Trial and Appeal Board, Case IPR2015-01788 and Case IPR2015-01789 ".
""The Automotive Chassis," Engineering Principles, 2nd Edition, J. Reimpell et al., translated from German by AGET Limited, SAE International, 2001 Reed Educational and Professional Publishing Ltd., 5 pages, Exhibit 1016, *Arctic Cat, Inc.*v. *Polaris Industries, Inc.*, United States Patent and Trademark Office before the Patent Trial and Appeal Board, Case IPR2015-01788 and Case IPR2015-01789".
"Bosch Automotive Handbook, 3rd Edition, Robert Bosch GmbH, 1993, 4 pages, Exhibit 1017, *Arctic Cat, Inc.* v. *Polaris Industries,*

(56) References Cited

OTHER PUBLICATIONS

*Inc.*, United States Patent and Trademark Office before the Patent Trial and Appeal Board, Case IPR2015-01788 and Case IPR2015-01789".
"New for 2004, Yamaha Rhino 660 4x4!", ATV Connection Magazine, 1996-2005 ATV Connection, Inc., 4 pages, Exhibit 1019, *Arctic Cat, Inc. v. Polaris Industries, Inc.*, United States Patent and Trademark Office before the Patent Trial and Appeal Board, Case IPR2015-01788 and Case IPR2015-01789.
"Hart's Hunter," Dirt Wheels Magazine, Dec. 1998 / Dirt Wheels 69, 5 pages, Exhibit 1020, *Arctic Cat, Inc. v. Polaris Industries, Inc.*, United States Patent and Trademark Office before the Patent Trial and Appeal Board, Case IPR2015-01788 and Case IPR2015-01789.
Non-final Office Action mailed Sep. 30, 2015 in corresponding U.S. Appl. No. 14/478,689; 22 pages.
Response to Non-Final Office Action filed Dec. 29, 2015 in corresponding U.S. Appl. No. 14/478,689; 22 pages.
Response to Office Action filed Oct. 20, 2015 in corresponding U.S. Appl. No. 14/478,700; 28 pages.
Final Office Action mailed Nov. 24, 2015 in corresponding U.S. Appl. No. 14/478,700; 17 pages.
Artic Cat's Prior Art Statement, Jun. 1, 2015; AC00019818-AC00012820_Porche Cistalia—"Cisitalia: Porsche Type 360," The Autocar, Jan. 27, 1961; 3 pages.
Report and Recommendation, dated Dec. 23, 2015, *Polaris Industries Inc. v. CFMOTO Powersports, Inc.*, CFMOTO America, Inc., John T. O'Mara & Angela M. O'Mara, d/b/a Quad Central MotorSports, and Leo's Kawasaki Sales South, Inc., Case No. 10-cv-4362 (NJE/HB); 68 pages.
Arctic Cat's Prior Art Statement, Jun. 1, 2015; 028 Exhibit A—Disclosure of claim elements of U.S. Pat. No. 8,827,028 by U.S. Pat. No. 4,817,985 ("Enokimoto '985") alone or in combination with other references; 83 pages.
Arctic Cat's Prior Art Statement, Jun. 1, 2015; 028 Exhibit B—Disclosure of Claim Elements of U.S. Pat. No. 8,827,028 by U.S. Pat. No. 3,709,314 ("Hickey") alone or in combination with other references; 83 pages.
Arctic Cat's Prior Art Statement, Jun. 1, 2015; 028 Exhibit C—Disclosure of Claim Elements of U.S. Pat. No. 8,827,028 by U.S. Pat. No. 5,327,989 ("Furuhashi") alone or in combination with other references; 86 pages.
Arctic Cat's Prior Art Statement, Jun. 1, 2015; 028 Exhibit D—Disclosure of Claim Elements of U.S. Pat. No. 8,827,028 by U.S. Pat. No. 7,708,103 ("Okuyama") alone or in combination with other references; 82 pages.
Arctic Cat's Prior Art Statement, Jun. 1, 2015; 028 Exhibit E—Disclosure of Claim Elements of U.S. Pat. No. 8,827,028 by U.S. Pat. No. 5,954,364 ("Nechustan") alone or in combination with other references; 81 pages.
Arctic Cat's Prior Art Statement, Jun. 1, 2015; 028 Exhibit F—Disclosure of Claim Elements of U.S. Pat. No. 8,827,028 by U.S. Pat. No. 5,252,713 ("Enokimoto") alone or in combination with other references; 85 pages.
Arctic Cat's Prior Art Statement, Jun. 1, 2015; 028 Exhibit G—Disclosure of Claim Elements of U.S. Pat. No. 8,827,028 by U.S. Pat. No. 7,461,864 ("Ervin") alone or in combination with other references; 83 pages.
Arctic Cat's Prior Art Statement, Jun. 1, 2015; 028 Exhibit H—Disclosure of Claim Elements of U.S. Pat. No. 8,827,028 by Ridge Runner alone or in combination with other references; 84 pages.
Arctic Cat's Prior Art Statement, Jun. 1, 2015; 028 Exhibit I—Disclosure of Claim Elements of U.S. Pat. No. 8,827,028 by the Polaris Vehicle ("Vista") alone or in combination with other references; 101 pages.
Arctic Cat's Prior Art Statement, Jun. 1, 2015; 028 Exhibit J—Disclosure of Claim Elements of U.S. Pat. No. 8,827,028 by Marty Hart Conversion Vehicles ("Hart Vehicles") alone or in combination with other references; 81 pages.
Arctic Cat's Prior Art Statement, Jun. 1, 2015; 028 Exhibit K—Disclosure of Claim Elements of U.S. Pat. No. 8,827,028 by U.S. Pat. No. 2004/0195797 ("Nash") alone or in combination with other references; 86 pages.
Arctic Cat's Prior Art Statement, Jun. 1, 2015; 028 Exhibit L—Disclosure of Claim Elements of U.S. Pat. No. 8,827,028 by Honda Pilot FL400 ATV ("Pilot") alone or in combination with other references; 80 pages.
Arctic Cat's Prior Art Statement, Jun. 1, 2015; 028 Exhibit M—Disclosure of Claim Elements of U.S. Pat. No. 8,827,028 by Yamaha Rhino 660 alone or in combination with other references; 94 pages.
Arctic Cat's Prior Art Statement, Jun. 1, 2015; 028 Exhibit N—Disclosure of Claim Elements of U.S. Pat. No. 8,827,028 by FMC XR311 ("XR311") alone or in combination with other references; 79 pages.
Arctic Cat's Prior Art Statement, Jun. 1, 2015; 028 Exhibit O—Disclosure of Claim Elements of U.S. Pat. No. 8,827,028 by U.S. Pat. No. 7,658,258 ("Denney") alone or in combination with other references; 64 pages.
Arctic Cat's Prior Art Statement, Jun. 1, 2015; 405 Exhibit A—Amended—Disclosure of Claim Elements of U.S. Pat. No. 8,596,405 by Ridge Runner alone or in combination with other references; 49 pages.
Arctic Cat's Prior Art Statement, Jun. 1, 2015; 405 Exhibit B—Amended—Disclosure of Claim Elements of U.S. Pat. No. 8,596,405 by Honda Odyssey FL350 ATV ("Odyssey") alone or in combination with other references; 52 pages.
Arctic Cat's Prior Art Statement, Jun. 1, 2015; 405 Exhibit C—Amended—Disclosure of Claim Elements of U.S. Pat. No. 8,596,405 by Honda Pilot FL400 ATV ("Pilot") alone or in combination with other references; 63 pages.
Arctic Cat's Prior Art Statement, Jun. 1, 2015; 405 Exhibit D—Amended—Disclosure of Claim Elements of U.S. Pat. No. 8,596,405 by FMC XR311 alone or in combination with other references; 48 pages.
Arctic Cat's Prior Art Statement, Jun. 1, 2015; 405 Exhibit E—Amended—Disclosure of Claim Elements of U.S. Pat. No. 8,596,405 by Lancia Delta S4 ("Lancia") alone or in combination with other references; 49 pages.
Arctic Cat's Prior Art Statement, Jun. 1, 2015; 405 Exhibit F—Disclosure of Claim Elements of U.S. Pat. No. 8,596,405 by Peugeot 205 Turbo ("Peugeot") alone or in combination with other references; 59 pages.
Arctic Cat's Prior Art Statement, Jun. 1, 2015; 405 Exhibit G—Amended—Disclosure of Claim Elements of U.S. Pat. No. 8,596,405 by Polaris Vista Vehicle ("Vista") alone or in combination with other references; 49 pages.
Arctic Cat's Prior Art Statement, Jun. 1, 2015; 405 Exhibit H—Amended—Disclosure of Claim Elements of U.S. Pat. No. 8,596,405 by Marty Hart Conversion Vehicles ("Hart Vehicles") alone or in combination with other references; 42 pages.
Arctic Cat's Prior Art Statement, Jun. 1, 2015; 405 Exhibit I—Amended—Disclosure of Claim Elements of U.S. Pat. No. 8,596,405 by Volkswagen Beetle ("Beetle") alone or in combination with other references; 30 pages.
Arctic Cat's Prior Art Statement, Jun. 1, 2015; 405 Exhibit J—Amended—Disclosure of Claim Elements of U.S. Pat. No. 8,596,405 by Yamaha Rhino 660 alone or in combination with other references; 42 pages.
Arctic Cat's Prior Art Statement, Jun. 1, 2015; 405 Exhibit K—Amended—Disclosure of Claim Elements of U.S. Pat. No. 8,596,405 by U.S. Pat. No. US 2004/0195034 ("Kato") alone or in combination with other references; 47 pages.
Arctic Cat's Prior Art Statement, Jun. 1, 2015; 405 Exhibit L—Amended—Disclosure of Claim Elements of U.S. Pat. No. 8,596,405 by U.S. Pat. No. 7,377,342 ("Miyazaki") alone or in combination with other references; 41 pages.
Arctic Cat's Prior Art Statement, Jun. 1, 2015; 405 Exhibit M—Amended—Disclosure of Claim Elements of U.S. Pat. No. 8,596,405 by U.S. Pat. No. 3,709,314 ("Hickey") alone or in combination with other references; 42 pages.
Arctic Cat's Prior Art Statement, Jun. 1, 2015; 405 Exhibit N—Amended—Disclosure of Claim Elements of U.S. Pat. No.

(56) References Cited

OTHER PUBLICATIONS 8,596,405 by U.S. Pat. No. 5,251,713 ("Enokimoto") alone or in combination with other references; 41 pages.
Arctic Cat's Prior Art Statement, Jun. 1, 2015; 405 Exhibit O—Amended—Disclosure of Claim Elements of U.S. Pat. No. 8,596,405 by U.S. Pat. No. 3,366,411 ("Vittone") alone or in combination with other references; 38 pages.
Arctic Cat's Prior Art Statement, Jun. 1, 2015; 405 Exhibit P—Amended—Disclosure of Claim Elements of U.S. Pat. No. 8,596,405 by U.S. Pat. No. 2004/0195797 ("Nash") alone or in combination with other references; 47 pages.
Arctic Cat's Prior Art Statement, Jun. 1, 2015; 405 Exhibit Q—Amended—Disclosure of Claim Elements of U.S. Pat. No. 8,596,405 by U.S. Pat. No. 4,817,985 ("Masuda") alone or in combination with other references; 39 pages.
Arctic Cat's Prior Art Statement, Jun. 1, 2015; 405 Exhibit R—Amended—Disclosure of Claim Elements of U.S. Pat. No. 8,596,405 by U.S. Pat. No. 7,658,258 ("Denney") alone or in combination with other references; 36 pages.
Arctic Cat's Prior Art Statement, Jun. 1, 2015; 405 Exhibit S—Amended—Disclosure of Claim Elements of U.S. Pat. No. 8,596,405 by U.S. Pat. No. 5,327,989 ("Furuhashi") alone or in combination with other references; 46 pages.
Arctic Cat's Prior Art Statement, Jun. 1, 2015; 405 Exhibit T—Amended—Disclosure of Claim Elements of U.S. Pat. No. 8,596,405 by John Deere Gator HPX 4x4 ("Gator") alone or in combination with other references; 52 pages.
Arctic Cat's Prior Art Statement, Jun. 1, 2015; 405 Exhibit T—(including pin cites).pdf—Disclosure of Claim Elements of U.S. Pat. No. 8,596,405 by John Deere Gator HPX 4x4 ("Gator") alone or in combination with other references; 51 pages.
Arctic Cat's Prior Art Statement, Jun. 1, 2015; 405 Exhibit U—Amended—Disclosure of Claim Elements of U.S. Pat. No. 8,596,405 by U.S. Pat. No. 5,954,364 ("Nechushtan") alone or in combination with other references; 59 pages.
Arctic Cat's Prior Art Statement, Jun. 1, 2015; 719 Exhibit A—Disclosure of Claim Elements of U.S. Pat. No. 8,746,719 by U.S. Pat. No. 4,969,661 ("Omura") alone or in combination with other references; 82 pages.
Arctic Cat's Prior Art Statement, Jun. 1, 2015; 719 Exhibit B—Disclosure of Claim Elements of U.S. Pat. No. 8,746,719 by U.S. Pat. No. 7,377,522 ("MacIsaac") alone or in combination with other references; 75 pages.
Arctic Cat's Prior Art Statement, Jun. 1, 2015; 719 Exhibit C—Disclosure of Claim Elements of U.S. Pat. No. 8,746,719 by U.S. Pat. No. 4,641,854 ("Masuda") alone or in combination with other references; 80 pages.
Arctic Cat's Prior Art Statement, Jun. 1, 2015; 719 Exhibit D—Disclosure of Claim Elements of U.S. Pat. No. 8,746,719 by U.S. Pat. No. 8,585,068 ("Schlangen") alone or in combination with other references; 92 pages.
Arctic Cat's Prior Art Statement, Jun. 1, 2015; 719 Exhibit E—Disclosure of Claim Elements of U.S. Pat. No. 8,746,719 by U.S. Pat. No. 7,434,822 ("Takahashi") alone or in combination with other references; 87 pages.
Arctic Cat's Prior Art Statement, Jun. 1, 2015; 719 Exhibit F - Disclosure of Claim Elements of U.S. Pat. No. 8,746,719 by U.S. Pat. No. 5,251,713 ("Enokimoto '713") alone or in combination with other references; 77 pages.
Arctic Cat's Prior Art Statement, Jun. 1, 2015; 719 Exhibit G—Disclosure of Claim Elements of U.S. Pat. No. 8,746,719 by Porsche model 996 ("Porsche 996") alone or in combination with other references; 88 pages.
Arctic Cat's Prior Art Statement, Jun. 1, 2015; 719 Exhibit H—Disclosure of Claim Elements of U.S. Pat. No. 8,746,719 by the Drakart vehicle ("Drakart") alone or in combination with other references; 80 pages Arctic Cat's Prior Art Statement, Jun. 1, 2015; 719 Exhibit I—Disclosure of Claim Elements of U.S. Pat. No. 8,746,719 by the Revenge Racing Silencer ("Silencer") alone or in combination with other references; 76 pages.
Arctic Cat's Prior Art Statement, Jun. 1, 2015; 719 Exhibit J—Disclosure of Claim Elements of U.S. Pat. No. 8,746,719 by the Polaris Vista vehicle Porsche ("Vista") alone or in combination with other references; 72 pages.
Arctic Cat's Prior Art Statement, Jun. 1, 2015; 719 Exhibit K—Disclosure of Claim Elements of U.S. Pat. No. 8,746,719 by Honda Odyssey ("Odyssey") alone or in combination with other references; 73 pages.
Arctic Cat's Prior Art Statement, Jun. 1, 2015; 719 Exhibit L—Disclosure of Claim Elements of U.S. Pat. No. 8,746,719 by Honda Pilot ATV ("Pilot") alone or in combination with other references; 85 pages.
Arctic Cat's Prior Art Statement, Jun. 1, 2015; 719 Exhibit M—Disclosure of Claim Elements of U.S. Pat. No. 8,746,719 by Redline Revolt ("Revolt") alone or in combination with other references; 77 pages.
Arctic Cat's Prior Art Statement, Jun. 1, 2015; 719 Exhibit N—Disclosure of Claim Elements of U.S. Pat. No. 8,746,719 by U.S. Pat. No. 3,292,944 ("Dangauthier '944") alone or in combination with other references; 85 pages.
Arctic Cat's Prior Art Statement, Jun. 1, 2015; 719 Exhibit O—Disclosure of Claim Elements of U.S. Pat. No. 8,746,719 by U.S. Pat. No. 3,292,945 ("Dangauthier '945") alone or in combination with other references; 81 pages.
Arctic Cat's Prior Art Statement, Jun. 1, 2015; 719 Exhibit P—Disclosure of Claim Elements of U.S. Pat. No. 8,746,719 by U.S. Pat. No. 4,817,985 ("Enokimoto '985") alone or in combination with other references; 90 pages.
Arctic Cat's Prior Art Statement, Jun. 1, 2015; 719 Exhibit Q—Disclosure of Claim Elements of U.S. Pat. No. 8,746,719 by Ridge Runner alone or in combination with other references; 33 pages.
Arctic Cat's Prior Art Statement, Jun. 1, 2015; 719 Exhibit R—Disclosure of Claim Elements of U.S. Pat. No. 8,746,719 by the Polaris RZR Vehicles alone or in combination with other references; 65 pages.
Arctic Cat's Prior Art Statement, Jun. 1, 2015; 719 Exhibit S—Disclosure of Claim Elements of U.S. Pat. No. 8,746,719 by U.S. Pat. No. 2008/0023249 to Sundsdahl alone or in combination with other references; 62 pages.
Arctic Cat's Prior Art Statement, Jun. 1, 2015; AC00019818-AC00012820_Porche Cistalia—"Cisitalia: Porsche Type 360," The Autocar, Jan. 27, 1961, 3 pages.
Arctic Cat's Prior Art Statement, Jun. 1, 2015; AC00019821—"G.P. Cisitalia," Prototype Parade No. 117, by Walkden Fisher, Apr. 1962, 1 page.
Arctic Cat's Prior Art Statement, Jun. 1, 2015; Auto Drive Trains Chp 1 Arctic Cat Exhibit-1013—"Principles, Diagnosis, and Service for all major types of Drive Trains," Auto Drive Trains Technology, by James E. Duffy and Chris Johanson; 25 pages.
Arctic Cat's Prior Art Statement, Jun. 1, 2015; Exhibit L Documents Cited; AC00016461—"Honda Pilot 2 Seater Prototype," 3 Wheeler World, http://www.3wheelerworld.com/showthread.php/71694-Honda-Pilot-2-Seater-Prototype; 2 pages.
Arctic Cat's Prior Art Statement, Jun. 1, 2015; Exhibit L Documents Cited; AC00016463—"Honda Odyssey," Honda Odyssey and Honda Pilot, http://www.rc-trucks.org/honda-odyssey.htm; 5 pages.
Arctic Cat's Prior Art Statement, Jun. 1, 2015; Exhibit L Documents Cited; AC00016476-16740—"90 FL400R Pilot," Honda Service Manual, Nov. 1988; 265 pages.
Arctic Cat's Prior Art Statement, Jun. 1, 2015; Exhibit L Documents Cited; AC00018649-18725—"Instruction Manual" Volkswagen Sedan and Convertible, Jan. 1954; 77 pages.
Arctic Cat's Prior Art Statement, Jun. 1, 2015; Exhibit L Documents Cited; AC00018726-18755—"Instruction Manual," Volkswagenwerk GMBH, Jan. 1952; 30 pages.
Arctic Cat's Prior Art Statement, Jun. 1, 2015; Exhibit L Documents Cited; AC00018756-18826—"Instruction Manual," Volkswagen Sedan and Convertible, Dec. 1952; 71 pages.

(56) References Cited

OTHER PUBLICATIONS

Arctic Cat's Prior Art Statement, Jun. 1, 2015; Exhibit L Documents Cited; AC00018827—"German Volkswagen," War Department Technical Manuel TM E9-803, Jun. 6, 1944; 144 pages.
Arctic Cat's Prior Art Statement, Jun. 1, 2015; Exhibit L Documents Cited; AC00019818—"Cisitalia: Porsche Type 360," the Autocar, Jan. 27, 1961; 3 pages.
Arctic Cat's Prior Art Statement, Jun. 1, 2015; Exhibit L Documents Cited; AC00019822—"Sporting Peugeot 205s," Dave Thornton; 128 pages.
Arctic Cat's Prior Art Statement, Jun. 1, 2015; Exhibit L Documents Cited; AC00020079—"Peugeot 205 Service Repair Manual," by A.K. Legg, Lae Mimi, and John S. Mead, 1996; 249 pages.
Arctic Cat's Prior Art Statement, Jun. 1, 2015; Exhibit L Documents Cited; AC00020545-20618—"Instruction Manual," Volkswagen Sedan and Convertible, Dec. 1954; 74 pages.
Arctic Cat's Prior Art Statement, Jun. 1, 2015; Exhibit L Documents Cited; AC00021897—"Volkswagen 1200A," Instruction Manual, 1965; 78 pages.
Arctic Cat's Prior Art Statement, Jun. 1, 2015; Exhibit L Documents Cited; AC00022066—"Volkswagen 1200," Instruction Manual Sedan and Convertible, Aug. 1963; 91 pages.
Arctic Cat's Prior Art Statement, Jun. 1, 2015; Exhibit L Documents Cited; AC0022533—"Instruction Manual," Volkswagen Sedan and Convertible, Jan. 1961; 93 pages.
Arctic Cat's Prior Art Statement, Jun. 1, 2015; Exhibit L Documents Cited; AC00023336—"Instruction Manual," Volkswagen Sedan and Convertible, Apr. 1958; 85 pages.
Arctic Cat's Prior Art Statement, Jun. 1, 2015; Exhibit L Documents Cited; AC00023421—"Instruction Manual," Volkswagen Sedan and Convertible, Aug. 1958; 83 pages.
Arctic Cat's Prior Art Statement, Jun. 1, 2015; Exhibit L Documents Cited; AC00023672—"Instruction Manual," Volkswagen Sedan and Convertible, Jun. 1956; 81 pages.
Arctic Cat's Prior Art Statement, Jun. 1, 2015; Exhibit L Documents Cited; AC00023753—"Instruction Manual," Volkswagen Sedan and Convertible, Aug. 1955; 42 pages.
Arctic Cat's Prior Art Statement, Jun. 1, 2015; Exhibit L Documents Cited; AC00108721—"Tornado by Drakart," Drakart, http://web.archive.org/web/20060922104409/http://drakart.com/tornado.html, Sep. 22, 2006; 3 pages.
Arctic Cat's Prior Art Statement, Jun. 1, 2015; Exhibit L Documents Cited; AC00108724—"Drakart Two Seater," Drakart, http://web.archive.org/web/20021204120435/http:/drakart.com/englisb/twoseat.htm, Dec. 4, 2002; 1 page.
Arctic Cat's Prior Art Statement, Jun. 1, 2015; Exhibit L Documents Cited; AC00108728—"Drakart Extreme," Drakart, http://web.archive.org/web/20021227091813/http:/www.drakart.com/english/extreme.html, Dec. 27, 2002; 3 pages.
Arctic Cat's Prior Art Statement, Jun. 1, 2015; Exhibit L Documents Cited; AC00108731—"Performance Test—Formula Cross Buggy," Drakart, http://web.archive.org/web/20030221031037/http:/drakart.com/english/drakart dirt.html, Feb. 21, 2003; 4 pages.
Arctic Cat's Prior Art Statement, Jun. 1, 2015; Exhibit L Documents Cited; AC00108802—"Drakart," http://web.archive.org/web/20021204092801/http:/drakart.com/english/english.htm, Dec. 4, 2002; 2 pages.
Arctic Cat's Prior Art Statement, Jun. 1, 2015; Exhibit L Documents Cited; AC00108812—"2000 Formula Cross Review by Dirt Wheels Magazine," Drakart, http://web.archive.org/web/20030209212715/http:/drakart. com/english/FormulaCross.html, Feb. 9, 2003; 3 pages.
Arctic Cat's Prior Art Statement, Jun. 1, 2015; Exhibit L Documents Cited; AC00108842—"Official Honda Shop Manual: FL350R Odyssey 350," Honda Motor Co., Ltd., 1985; 209 pages.
Arctic Cat's Prior Art Statement, Jun. 1, 2015; Exhibit L Documents Cited; AC00109442—"Lancia 037—Delta S4—Delta 4WD," Profili Quattroruote, by Piero Casucci, 1987; 81 pages.
Arctic Cat's Prior Art Statement, Jun. 1, 2015; Exhibit L Documents Cited; AC00109651—"Peugeot 205T16," Rally Giants, by Graham Robson, Aug. 15, 2007; 129 pages.
Arctic Cat's Prior Art Statement, Jun. 1, 2015; Exhibit L Documents Cited; AC00110208—http://auto-pub.net/Peugeot/205_Turbo_16_presse/205_Turbo_16_presse_990.jpg; 1 page.
Arctic Cat's Prior Art Statement, Jun. 1, 2015; Exhibit L Documents Cited; AC00110235—Caracteristiques Techniques 1984, http://auto-pub.net/Peugeot/205_Turbo_16_98.jpg, retrieved Apr. 9, 2014; 1 page.
Arctic Cat's Prior Art Statement, Jun. 1, 2015; Exhibit L Documents Cited; AC00110255—Porsche 2005 996T Parts Catalogue, Porsche; 500 pages.
Arctic Cat's Prior Art Statement, Jun. 1, 2015; Exhibit L Documents Cited; AC00110755—"911 Carrera (996) Technical Manual," Porsche, www.workshopmanuals.co.uk; 345 pages.
Arctic Cat's Prior Art Statement, Jun. 1, 2015; Exhibit L Documents Cited; AC00111100—"911 Carrera (996) Technical Manual," Porsche, www.workshopmanuals.co.uk; 303 pages.
Arctic Cat's Prior Art Statement, Jun. 1, 2015; Exhibit L Documents Cited; AC00111403—"Redline Revolt," Redline Performance Products; 9 pages.
Arctic Cat's Prior Art Statement, Jun. 1, 2015; Exhibit L Documents Cited; AC00111412—"Revolt Service Manual," Redline Performance Products, LLC; 259 pages.
Arctic Cat's Prior Art Statement, Jun. 1, 2015; Exhibit L Documents Cited; AC00111671—"2009 Redline Riot 750,"UTV Off Road Magazine; 4 pages.
Arctic Cat's Prior Art Statement, Jun. 1, 2015; Exhibit L Documents Cited; AC00111687—2007 Revenge Racing Silencer Mid Engine 600HP LS2,S4, http://www.americansandassociation.org/phpBB3/viewtopic.php?f=34&t=24139&sid=65368d16b46243 fac7998b8b09bf55ff, Mar. 17, 2008; 4 pages.
Arctic Cat's Prior Art Statement, Jun. 1, 2015; Exhibit L Documents Cited; AC00111695—http://www.dumontduneriders.com/invision/?showtopic=15655, Dec. 26, 2010; 5 pages.
Arctic Cat's Prior Art Statement, Jun. 1, 2015; Exhibit L Documents Cited; AC00111700—"My New Revenge Silencer," Sandrail Forums, http://www.glamisdunes.com/invisionindex.php?showtopic=; 66 pages.
Arctic Cat's Prior Art Statement, Jun. 1, 2015; Exhibit L Documents Cited; AC00112436—http://www.duneguide.com/images/Silencer-10.jpg; 1 page.
Arctic Cat's Prior Art Statement, Jun. 1, 2015; Exhibit L Documents Cited;Auto Drive Trains Chp 1 Arctic Cat Exhibit-1013—"Auto Drive Trains Technology: Principles, Diagnosis, and Service for all major types of Drive Trains," by James E. Duffy and Chris Johanson, 1995; 25 pages.
Arctic Cat's Prior Art Statement, Jun. 1, 2015; Exhibit L Documents Cited; BF Goodrich—Exhibit—1017— ; 2 pages.
Arctic Cat's Prior Art Statement, Jun. 1, 2015; Exhibit L Documents Cited; Big Wheeling in Virginia—"Big Wheeling in Virginia," Peterson's 4Wheel & Off-Road, by Fred Williams, Sep. 2005; 3 pages.
Arctic Cat's Prior Art Statement, Jun. 1, 2015; Exhibit L Documents Cited; HONDA00002017—"Pilot Accessories 1990," Hondaline, 1989; 2 pages.
Arctic Cat's Prior Art Statement, Jun. 1, 2015; Exhibit L Documents Cited; HONDA00005482—"It Doesn't Fit into a Class. It Creates One," Honda,1989; 1 page.
Arctic Cat's Prior Art Statement, Jun. 1, 2015; Exhibit L Documents Cited; HONDA00006226—6488—"89 FL400R Pilot," Honda Service Manual, 1988; 263 pages.
Arctic Cat's Prior Art Statement, Jun. 1, 2015; Exhibit L Documents Cited; Toyo Tires Advertisement—Exhibit—1016—"Open Country M/T," Dec. 2005; 2 pages.
Arctic Cat's Prior Art Statement, Jun. 1, 2015; Exhibit K Documents Cited; — AC00018352—"Hart's Hunter," Dirt Wheels, by Kelly Strong, Dec. 1998; 4 pages.
Arctic Cat's Prior Art Statement, Jun. 1, 2015; Exhibit K Documents Cited; AC00018380—Ridge Runner of Idaho Ltd., Co., 2004; 7 pages.

(56) References Cited

OTHER PUBLICATIONS

Arctic Cat's Prior Art Statement, Jun. 1, 2015; Exhibit K Documents Cited; AC00019708—"Ridge Runner of Idaho Introduces New Two Seat ATV," ATV Illustrated, Jun. 2, 2004; 1 page.
Arctic Cat's Prior Art Statement, Jun. 1, 2015; Exhibit K Documents Cited; AC00019709—"Ridge Runner," Ridge Runner of Idaho Ltd., Co.; 1 page.
Arctic Cat's Prior Art Statement, Jun. 1, 2015; Exhibit K Documents Cited; AC00019710—"A New Way to Have Fun Smoothing out the Trial," http://ridgerunner.biz/, Apr. 9, 2004, 1 page.
Arctic Cat's Prior Art Statement, Jun. 1, 2015; Exhibit K Documents Cited; AC00019712—Ridge Runner of Idaho Ltd., Co.; 2 pages.
Arctic Cat's Prior Art Statement, Jun. 1, 2015; Exhibit K Documents Cited; AC00019716—"Why Even Consider Buying a Two-Seat Ridge Runner?," http://ridgerunner.biz/homt.html, Sep. 2, 2004; 1 page.
Arctic Cat's Prior Art Statement, Jun. 1, 2015; Exhibit K Documents Cited; AC00019717—"Ridge Runner Rugged Terrain Vehicle Introduces 2005 Model with New Options," OffRoad.com, by ORC Staff, Dec. 31, 2004; 1 page.
Arctic Cat's Prior Art Statement, Jun. 1, 2015; Exhibit K Documents Cited; AC00019718—"First Ridge Runner Rally Dubbed a Pinnacle Success," Off-Road.Com, by ORC Staff, Jul. 1, 2005; 1 page.
Arctic Cat's Prior Art Statement, Jun. 1, 2015; Exhibit K Documents Cited; AC00019719—"Ridge Runner of Idaho Introduces New Two Seat Rough Terrain Vehicle (RTV)," ATV Source.Com, May 17, 2004; 1 page.
Arctic Cat's Prior Art Statement, Jun. 1, 2015; Exhibit K Documents Cited; AC00019720—"Ridge Runner of Idaho Introduces New Two Seat Rough Terrain Vehicle (RTV)," ATV Source.Com, May 17, 2004, http://www.atvsource.com/articles/press_releases/2004/051904_ridge_runner_new_two_seat_rtv.htm; 4 pages.
Arctic Cat's Prior Art Statement, Jun. 1, 2015; Exhibit K Documents Cited; AC00019724—Ridge Runner Rugged Terrain Vehicle Introduces 2005 Model with New Options, Off-Road.Com, by ORC Staff, Dec. 31, 2004; 2 pages.
Arctic Cat's Prior Art Statement, Jun. 1, 2015; Exhibit K Documents Cited; AC00019726—ATV Illustrated, Apr. 2005 Issue; 92 pages.
Arctic Cat's Prior Art Statement, Jun. 1, 2015; Exhibit K Documents Cited; AC00022018—"Volkswagen 1200," Instruction Manual Sedan and Convertible, Jan. 1963; 48 pages.
Arctic Cat's Prior Art Statement, Jun. 1, 2015; Exhibit K Documents Cited; AC00022533—Instruction Manual, Volkswagen Sedan and Convertible, Jan. 1961; 93 pages.
Arctic Cat's Prior Art Statement, Jun. 1, 2015; Exhibit K Documents Cited; AC00024164—"New for 2004, Yamaha Rhino 660 4x4! Yamaha's Side by Side Rhino, What We Have Been Asking for!," ATV Connection Magazine, by Ray Sedorchuk, Jan. 1, 2006; 4 pages.
Arctic Cat's Prior Art Statement, Jun. 1, 2015; Exhibit K Documents Cited; AC00024172—Additional Features for Yamaha 2004 Rhino 660 4x4, Mineolamoto, 2004; 2 pages.
Arctic Cat's Prior Art Statement, Jun. 1, 2015; Exhibit K Documents Cited; AC00024174—"Owner's Manual Rhino 660 YXR660FAS," Yamaha, Aug. 2003; 154 pages.
Arctic Cat's Prior Art Statement, Jun. 1, 2015; Exhibit K Documents Cited; AC00024328—"Service Manual YXR660FAS," Yamaha, Jul. 2003; 421 pages.
Arctic Cat's Prior Art Statement, Jun. 1, 2015; Exhibit K Documents Cited; AC00108827—"Formula B Super Vee Formula A,"Hawke; 1 page.
Arctic Cat's Prior Art Statement, Jun. 1, 2015; Exhibit K Documents Cited; AC00108830—"Hawke DL2A Formula Ford"; 1 page.
Arctic Cat's Prior Art Statement, Jun. 1, 2015; Exhibit K Documents Cited; AC00108831—"Specification,"; 1 page.
Arctic Cat's Prior Art Statement, Jun. 1, 2015; Exhibit K Documents Cited; AC00108841—"1972 Hawke DL.8 Formula Super Vee,"; 1 page.
Arctic Cat's Prior Art Statement, Jun. 1, 2015; Exhibit K Documents Cited; AC00112569—"Sand Styling," Dune Buggies and Hot VWs, by Dean Kirsten, Oct. 2004; 5 pages.
Arctic Cat's Prior Art Statement, Jun. 1, 2015; Exhibit K Documents Cited; AC00112577—"Deaton's Dream," Dune Buggies and Hot VWs, by Bruce Simurda, Oct. 2004, 2 pages.
Arctic Cat's Prior Art Statement, Jun. 1, 2015; Exhibit K Documents Cited; HART00000005—photo, Jul. 30, 1998; 1 page.
Arctic Cat's Prior Art Statement, Jun. 1, 2015; Exhibit K Documents Cited; HART00000011—4 photos, Sep. 4, 1999; 1 page.
Arctic Cat's Prior Art Statement, Jun. 1, 2015; Exhibit K Documents Cited; PLRSAC00014542—"Humvee," www.angelfire.com/nb2/jeeppickups/humvee.html; 9 pages.
Arctic Cat's Prior Art Statement, Jun. 1, 2015; Exhibit K Documents Cited; PLRSAC00014551—"XR311 Experimental Attack Vehide," by Mike Burton, svsm.org/gallery/xr311, retrieved Feb. 26, 2014; 16 pages.
Arctic Cat's Prior Art Statement, Jun. 1, 2015; Exhibit K Documents Cited; PLRSAC00014567—"FMC XR311," web.archive.org/web/20060621051619/http://www.bellum.nu.armoury/FMCXR311.html, Jun. 21, 2006; 2 pages.
Arctic Cat's Prior Art Statement, Jun. 1, 2015; Exhibit K Documents Cited; PLRSA00014569—"FMC XR311," Wikipedia, http://en.wikipedia.org/w/index.php?title=FMC_XR311&oldid=584875966, retrieved Mar. 11, 2014, last modified Dec. 6, 2013; 3 pages.
Arctic Cat's Prior Art Statement, Jun. 1, 2015; Exhibit K Documents Cited; PLRSAC00014708—"The Illustrated Encyclopedia of Military Vehicles," by Ian V. Hogg and John Weeks, 1980; 6 pages.
Arctic Cat's Prior Art Statement, Jun. 1, 2015; Exhibit K Documents Cited; PLRSAC00014714—"A Combinatorial Geometry Computeer Description of the XR311 Vehicle," by James E. Shiells, Apr. 1978; 60 pages.
*Arctic Cat et al.* v. *Polaris Industries Inc. et al.*, Case No. 13-cv-3579; *Polaris Industries Inc. et al.* v. *Arctic Cat et al.*, Case No. 14-cv-3386; *Polaris Industries Inc. et al.* v. *Arctic Cat et al.*, Case No. 14-cv-3412; Arctic Cat's Prior Art Statement (Redacted), Jun. 1, 2015; 22 pages.
Arctic Cat's Prior Art Statement, Jun. 1, 2015; Exhibit L Documents Cited; AC0110248—Undated Image; 1 page.
Arctic Cat's Prior Art Statement, Jun. 1, 2015; Exhibit L Documents Cited; AC0110250—Undated Image; 1 page.
Arctic Cat's Prior Art Statement, Jun. 1, 2015; Exhibit L Documents Cited; AC0110251—Undated Image; 1 page.
Arctic Cat's Prior Art Statement, Jun. 1, 2015; Exhibit L Documents Cited; AC0110252—Undated Image; 1 page.
Petition for Inter Partes Review of U.S. Pat. No. 8,827,028 Pursuant to 35 U.S.C. §§ 311-319, 37 C.F.R. § 42, Aug. 20, 2015; 56 pages.
Petition for Inter Partes Review of U.S. Pat. No. 8,827,028 Pursuant to 35 U.S.C. §§ 311-319, 37 C.F.R. § 42, Aug. 20, 2015; 68 pages.
Notice of Allowance mailed Nov. 28, 2012 in corresponding U.S. Appl. No. 12/409,176; 8 pgs.
Response to Office Action filed Jun. 16, 2015 in corresponding U.S. Appl. No. 14/478,700; 393 pages.
Final Office Action mailed Jul. 20, 2015 in corresponding U.S. Appl. No. 14/478,700; 22 pages.
Terminal Disclaimer filed Dec. 22, 2014, in corresponding U.S. Appl. No. 14/094,747; 1 pg.
Decision granting Terminal Disclaimer mailed Jan. 7, 2015, in corresponding U.S. Appl. No. 14/094,747; 1 pg.
Petition Under 37 CFR 1.182 filed Apr. 14, 2015, to withdraw Terminal Disclaimer filed Dec. 22, 2014 in corresponding U.S. Appl. No. 14/094,747; 1 page.
Response to Office Action filed Apr. 14, 2015 in corresponding U.S. Appl. No. 14/094,747; 19 pgs.
Decision dated Aug. 7, 2015, granting Petition Under 37 CFR 1.182 in corresponding U.S. Appl. No. 14/094,747; 2 pages.
Response to Non-Final Office Action filed May 11, 2015 in corresponding U.S. Appl. No. 14/478,689; 12 pages.

(56) References Cited

OTHER PUBLICATIONS

Supplemental Response to Non-Final Office Action filed Jun. 2, 2015 in corresponding U.S. Appl. No. 14/478,689; 378 pages.
Final Office Action mailed Jun. 5, 2015 in corresponding U.S. Appl. No. 14/478,689; 21 pages.
Response to Office Action filed Sep. 4, 2015 in corresponding U.S. Appl. No. 14/478,689; 25 pages.
Advisory Action mailed Sep. 16, 2015 in corresponding U.S. Appl. No. 14/478,689; 3 pages.
Redacted Errata Sheet of Deposition of Aaron Deckard dated Feb. 27, 2012; 3 pages.
ridgerunner biz, "A New Way to Have Fun Smoothing Out the Trail," Apr. 9, 2004; 2 pages.
Notice of Allowance mailed Feb. 5, 2014 in corresponding U.S. Appl. No. 11/494,890; 7 pgs.
Amendment After Notice of Allowance Rule 312 filed Feb. 24, 2014 in corresponding U.S. Appl. No. 11/494,890; 21 pages.

\* cited by examiner

SIDE-BY-SIDE ATV

CROSS-REFERENCE TO RELATED APPLICATION

This application is a divisional of U.S. patent application Ser. No. 12/409,176 filed Mar. 23, 2009 (now U.S. Pat. No. 8,382,125 issued Feb. 26, 2013), which is a continuation of U.S. patent application Ser. No. 11/494,891, filed Jul. 28, 2006 (now U.S. Pat. No. 7,819,220 issued Oct. 26, 2010), the disclosures of which are expressly incorporated by reference herein.

FIELD OF THE INVENTION

The present invention relates to side-by-side all terrain vehicles having at least a pair of laterally spaced apart seating surfaces. More particularly, the present invention relates to trail compliant side-by-side all terrain vehicles.

BACKGROUND OF THE INVENTION

Generally, all terrain vehicles ("ATVs") and utility vehicles ("UVs") are used to carry one or two passengers and a small amount of cargo over a variety of terrains. Due to increasing recreational interest in ATVs, specialty ATVs, such as those used for trail riding, racing, and cargo hauling have entered the market place. Most ATVs include seating for up to two passengers which are either seated side-by-side or with the passenger positioned behind the driver of the ATV. Side-by-side ATVs, in which the driver and passenger are seated beside each other on laterally spaced apart seats, have become popular because of the ability to allow the passenger to share the driver's viewpoint and riding experience instead of being positioned behind the driver. Due to the side-by-side seating arrangement, most side-by-side ATVs have a width of at least 54 inches (137 centimeters). Increasing numbers of ATV riders are enjoying recreational trail riding through public lands including state parks and national forests. Most trails on such public lands have a mandated maximum width requirement to limit damage to the environment. For example, most parks have established a maximum trail width of about 50 inches, making the use of most side-by-side ATVs on trails unacceptable or impractical.

SUMMARY OF THE INVENTION

According to an illustrative embodiment of the present disclosure, an all-terrain vehicle is shown which includes a frame, an engine supported by the frame, a transmission supported by the frame. A pair of front wheels, and a pair of rear wheels are operably coupled to the frame. A pair of laterally spaced-apart seating surfaces is supported by the frame. A pair of outermost lateral points of the vehicle defines a vehicle width less than 54 inches.

According to a further illustrative embodiment of the present disclosure, an all-terrain vehicle is shown which includes a frame, an engine supported by the frame, and a transmission supported by the frame. A pair of front wheels, and a pair of rear wheels are operably coupled to the frame. A pair of laterally spaced-apart seating surfaces is supported by the frame. A pair of outermost lateral points of the vehicle defines a trail compliant vehicle width.

According to a further illustrative embodiment of the present disclosure, an all-terrain vehicle includes a frame and a pair of laterally spaced-apart seating surfaces supported by the frame. The all-terrain vehicle further includes a pair of front wheels, and a pair of rear wheels spaced-apart from the pair of front wheels by a wheelbase distance. The pairs of front and rear wheels are adapted to support the frame above a ground surface. The laterally spaced-apart seating surfaces are supported above the ground surface by a seat height distance. The all-terrain vehicle defines a ratio of the wheelbase distance to the seat height distance of at least 6.0 to 1.

According to another illustrative embodiment of the present disclosure, an all-terrain vehicle includes a frame, a pair of laterally spaced-apart seating surfaces supported by the frame, and a pair of front wheels operably coupled to the frame. A pair of rear wheels are operably coupled to the frame and are spaced-apart from the pair of front wheels by a wheelbase distance. A front panel is supported by the frame and is positioned above the pair of front wheels. A hood is removably coupled to the front panel, the front panel including a storage compartment. A pair of outermost lateral points of the vehicle defines a vehicle width of less than 54 inches.

The above mentioned and other features of this invention, and the manner of attaining them, will become more apparent and the invention itself will be better understood by reference to the following description of embodiments of the invention taken in conjunction with the accompanying drawings.

Figure 1:
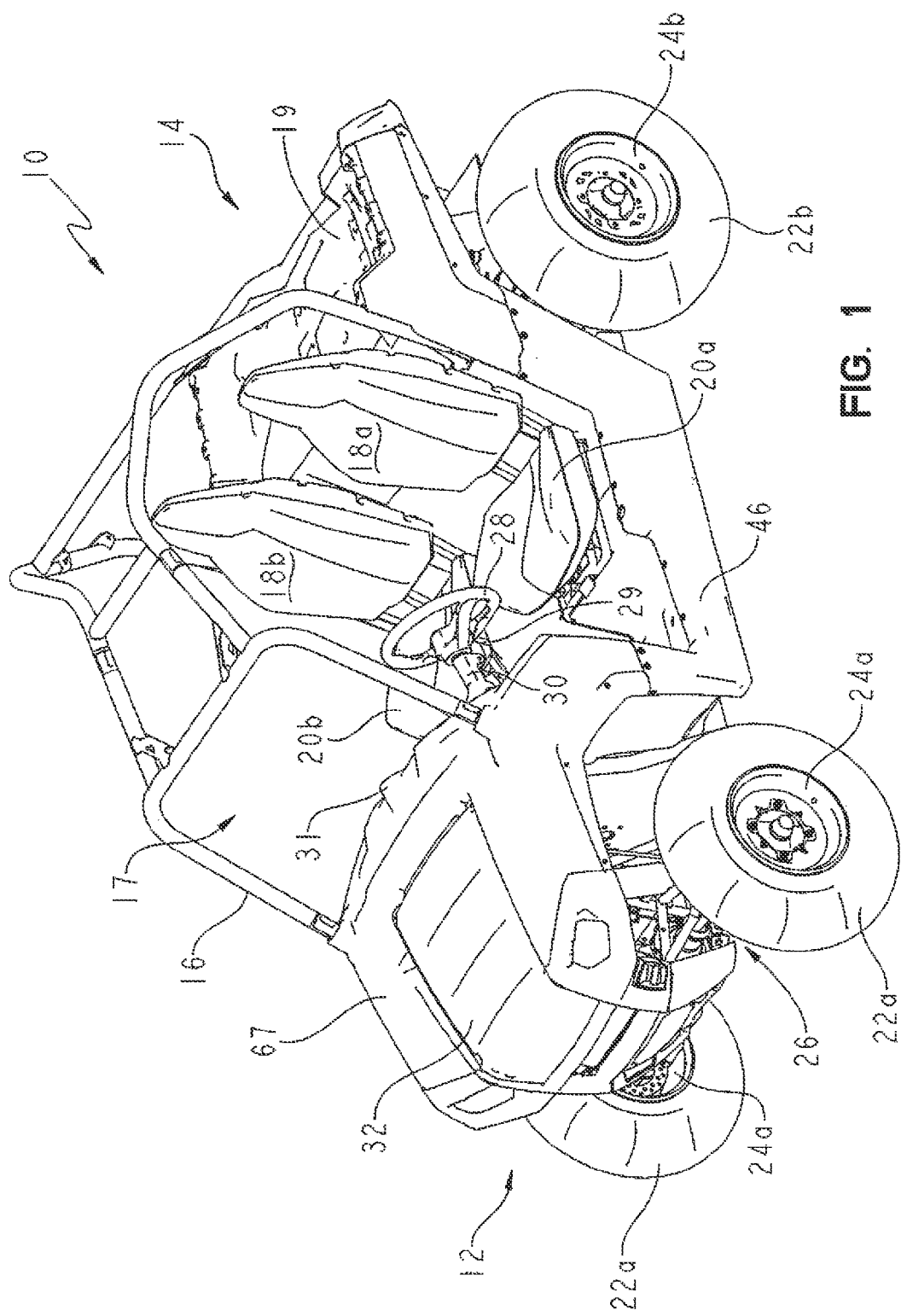
FIG. 1 is a perspective view of one embodiment of a side-by-side ATV.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF EMBODIMENTS OF THE INVENTION

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to a ATV, certain features described herein may be applied to other applications such as UVs, snowmobiles, motorcycles, mopeds, etc.

Referring initially to FIG. 1, one illustrative embodiment of side-by-side ATV 10 is shown. ATV 10 includes front end 12 and rear end 14, and a frame 15 which is supported above the ground surface by a pair of front tires 22a and wheels 24a and a pair of rear tires 22b and wheels 24b. ATV 10 includes a pair of laterally spaced-apart upper and lower seating surfaces 18a, 18b and 20a, 20b, respectively. The upper seating surfaces 18a, 18b are configured to support the backs of sitting riders, while the lower seating surfaces 20a, 20b are configured to support the buttocks of sitting riders. In the illustrative embodiment, upper and lower seating surfaces 18a, 18b, and 20a, 20b form a bucket seat arrangement, however a bench style seat or any other style of seating structure may be used. Upper and lower seating surfaces 18 and 20 are positioned within cab 17 of ATV 10.

Figure 2:
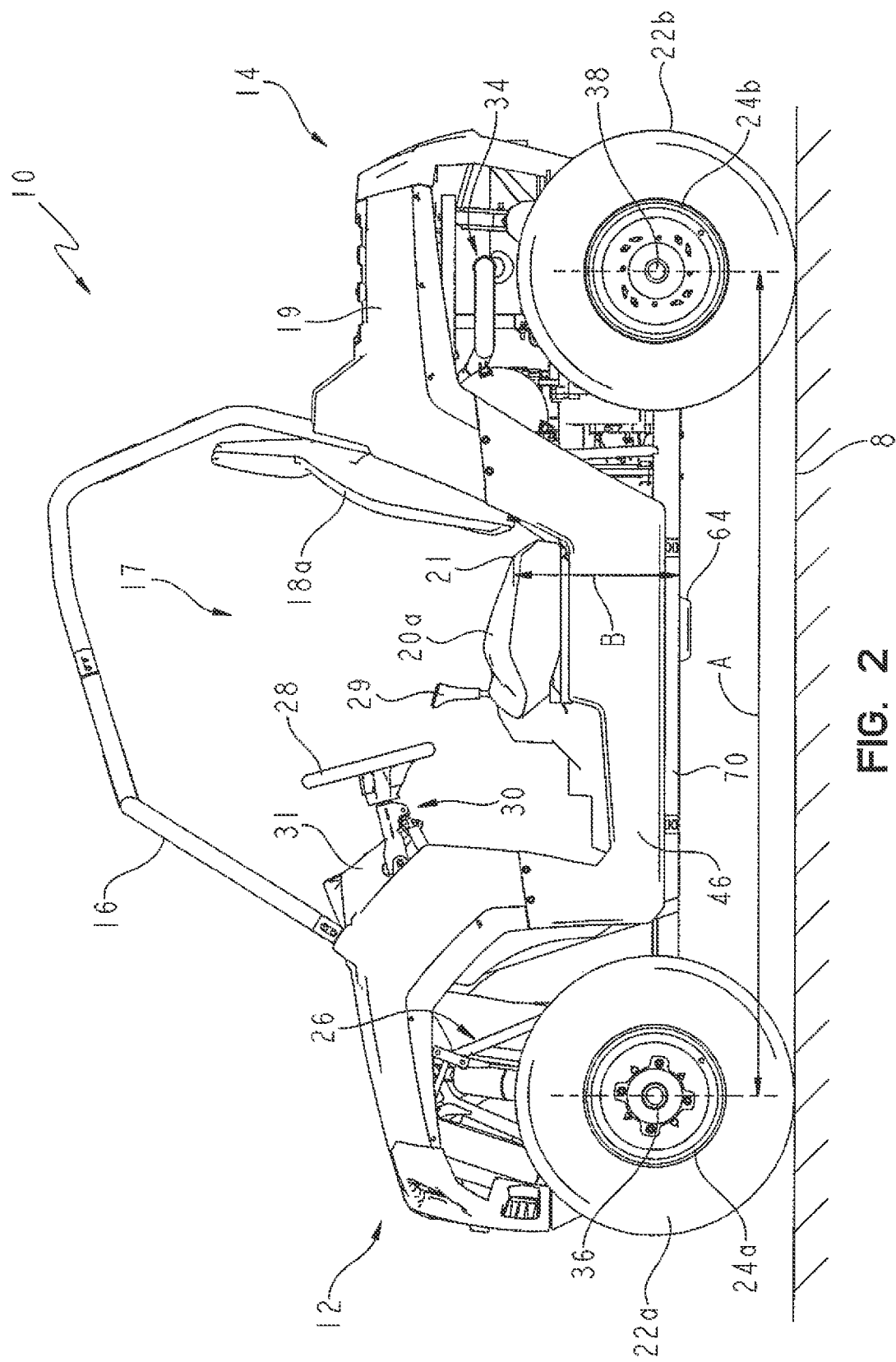
FIG. 2 is a profile view of the side-by-side ATV shown in FIG. 1.
Figure 14:
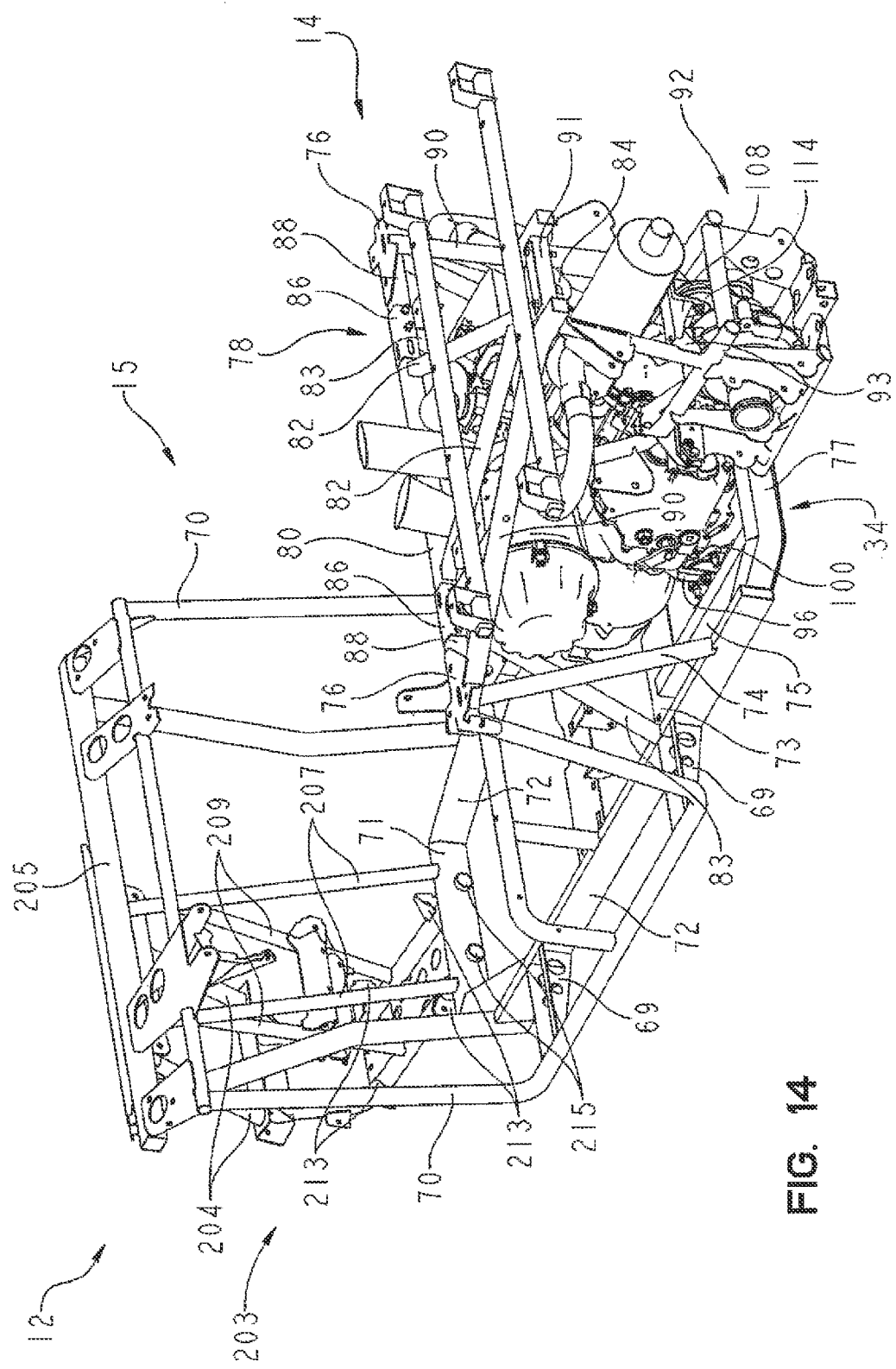
FIG. 14 is a rear perspective view of the frame and the modular engine assembly of the side-by-side ATV shown in FIGS. 1 through 4.
Figure 15:
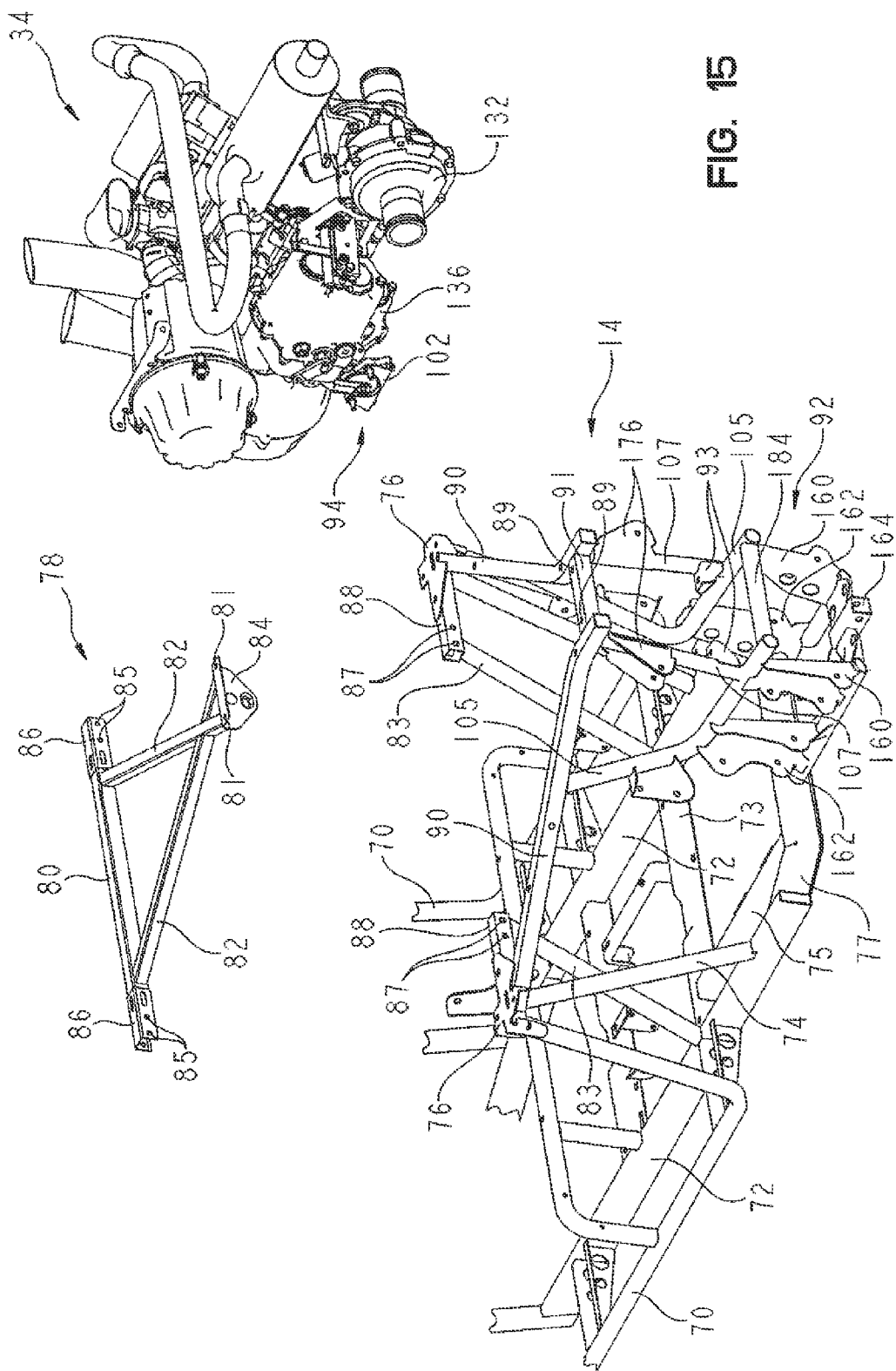
FIG. 15 is a partially exploded, rear perspective view of the frame and modular engine assemblies shown in FIG. 14.

Protective cage 16 extends over cab 17 to assist in preventing injury to passengers of ATV 10 from passing branches or tree limbs, as well as, may act as a support in the event of a vehicle rollover. As shown in FIGS. 1 through 4, protective cage 17 narrows as it extends upwardly to allow the driver and passenger easier entry and exit of cab 17. Additionally, in some embodiments a cover including one or more of a roof, windshield and doors (not shown) may be attached to the protective cage 16 to block weathering elements such as wind, rain or snow. Cab 17 also includes front console 31, adjustable steering wheel 28, and shift lever 29. Front console 31 may include a tachometer, speedometer, or any other suitable instrument. Front end 12 of ATV 10 includes front panel 67, hood 32, and front suspension assembly 26. Front suspension assembly 26 pivotally couples front wheels 24 to ATV 10. Rear end 14 of ATV 10 includes engine cover 19 which extends over modular engine assembly 34, as shown in FIGS. 2, 14, and 15. Modular engine assembly 34 is illustratively positioned completely behind upper and lower seating surfaces 18a, 18b, and 20a, 20b.

As shown in FIG. 2, front wheels 24 are supported for rotation by front axle 36. Similarly, rear wheels 24b are supported for rotation by rear axle 38. In the illustrative embodiment shown in FIG. 2, wheelbase A, which extends between the center of front axle 36 and the center of rear axle 38, is equal to about 77 inches (195.6 centimeters). Seat height B is equal to the distance between a low point 21 of lower seating surfaces 20 and a bottom of the frame 15 when ATV 10 is at rest. In the illustrative embodiment, seat height B is equal to about 11.75 inches (29.8 centimeters). In the illustrative embodiment, the ratio of the wheelbase to the seat height, or distance A to distance B, is about 6.55 to 1. In other embodiments, not shown, the ratio of the wheelbase to the seat height may be equal to other suitable ratios, however the present invention contemplates ATVs having a ratio of wheelbase to seat height greater than about 6.0 to 1. A wheelbase to seat height ratio greater than about 6.0 to 1 facilitates a relatively low vehicle center of gravity and further provides improved ergonomics, handling, and space utilization.

It should be appreciated that dimensions described above regarding the wheelbase and seat height as well as the general layout shown in FIG. 2 further provide additional dimensions specifically called out in FIGS. 2A-2E. For example, lower seating surfaces 20a, 20b define a lower seating surface rearmost point 23. Low point 21 generally defines an upward facing seating surface height. A vertical rear seat plane 27 can be drawn that contains the lower seating surface rearmost point 23. Furthermore, a rearward seat height point 33 can be defined on the vertical rear seat plane 27 at the upward facing seating surface height 21.

Figure 2A:
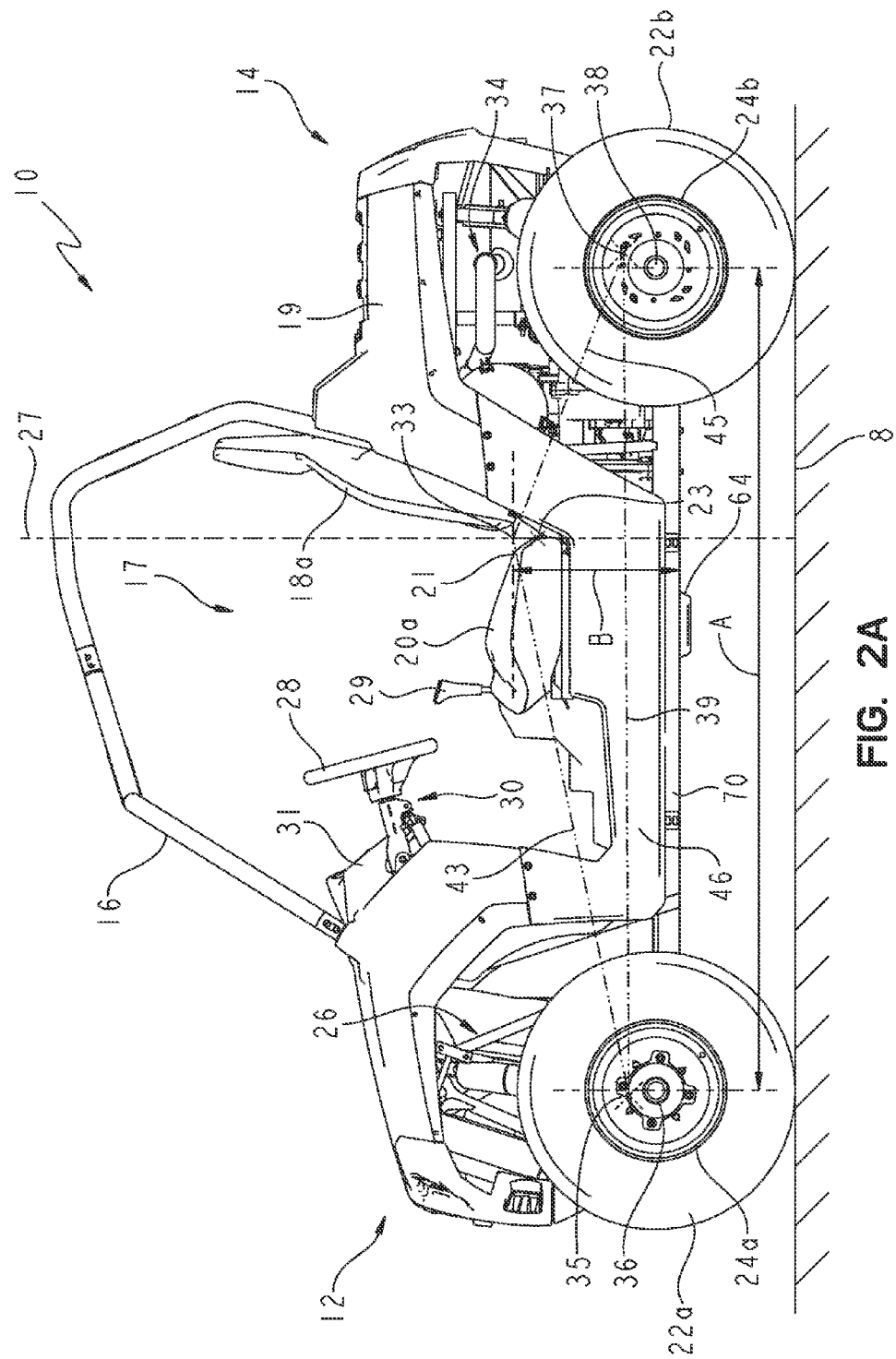
FIGS. 2A-E are views of FIG. 2 specifically calling out spatial relationships between certain parts of the side-by side ATV.

Front and rear axle attachment points 35, 37 that are fixed relative to the frame are further identified in FIG. 2A. In the present embodiment, front and rear axle attachment points 35, 37 correspond to the points at which front axle 206 is fixedly coupled in the front axle assembly, shown most clearly in FIGS. 22 & 23.

Front and rear axle attachment points 35, 37 define a first attachment axis 39 therebetween. Front axle attachment point 35 and the rearward seat height point 33 define an axis 43 therebetween. Rear axle attachment point 37 and the rearward seat height point 33 define an axis 45 therebetween. FIG. 2A depicts first attachment axis 39 and axis 43 defining approximately an eleven (11) degree angle therebetween (the shown angle is between 11 and 12 degrees). FIG. 2A further depicts first attachment axis 39 and axis 45 defining approximately a twenty-one (21) degree angle (the shown angle is between 21 and 22 degrees). Still further, FIG. 2A depicts axis 43 and axis 45 defining approximately a one-hundred-forty-eight (148) degree angle (the shown angle is between 147 and 148 degrees).

Figure 2B:
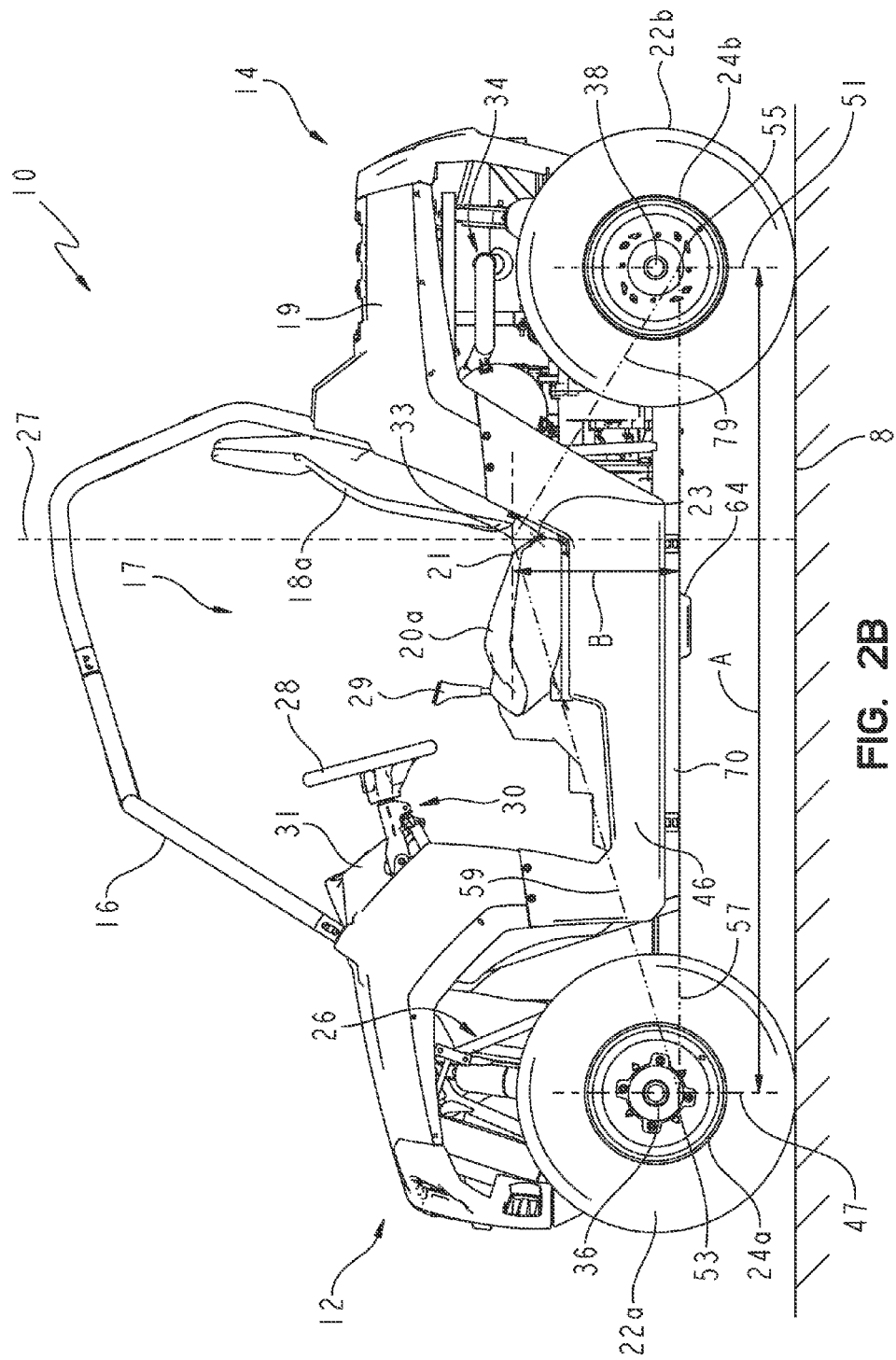
Figure 21:
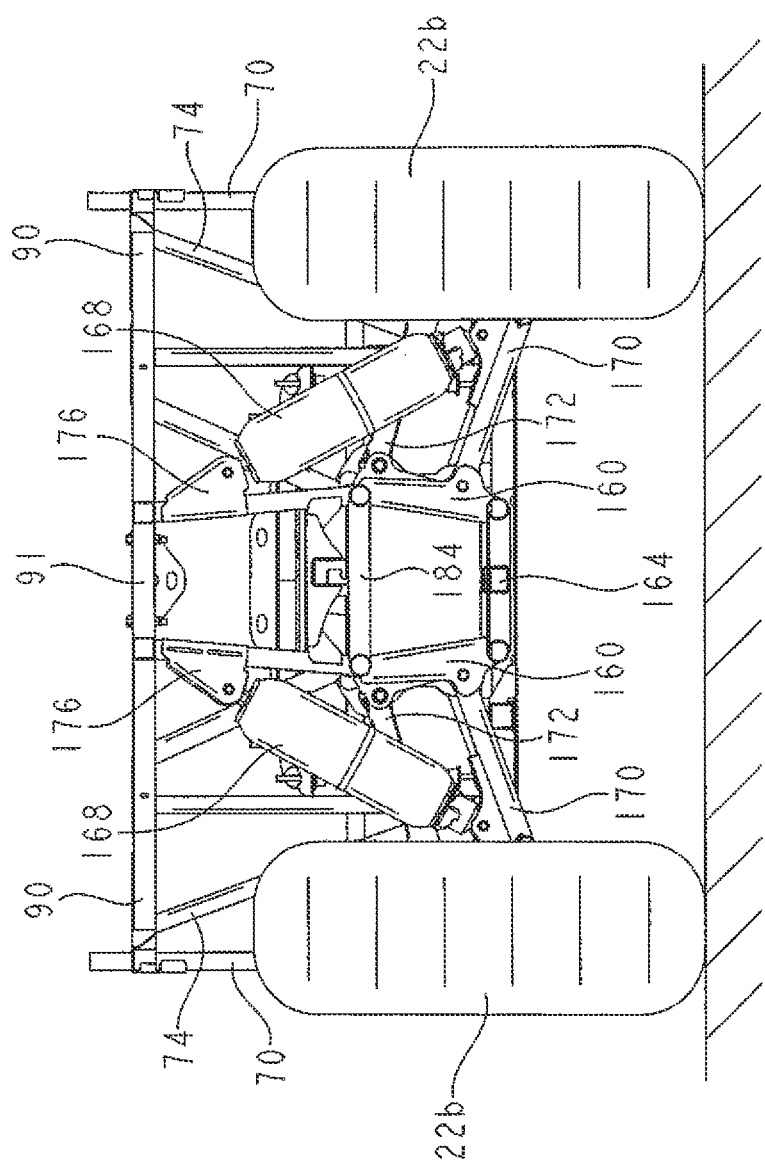
FIG. 21 is a rear view of the frame and suspension system of the ATV shown in FIG. 20.

With reference to FIG. 2B, pair of front wheels 22a define a front wheelbase vertical plane 47. Pair of rear wheels 22b define a rear wheelbase vertical plane 51. The front and rear wheelbase vertical planes 47, 51 are spaced-apart to define the wheelbase distance ("A"). Front and rear lower frame wheelbase points 53, 55 that are defined at a ground clearance height on the front and rear wheelbase vertical planes 47, 51. In the present embodiment, the ground clearance height is defined by the underside of the lower portions of frame 15 that are generally at the same height as outer tubes 70 as shown in FIGS. 2, 2A-E. The portion of frame 15 that provides the ground clearance height at the rear wheelbase vertical plane 51 is shown in FIGS. 15 and 21. The portion of frame 15 that provides the ground clearance height at the front wheelbase vertical plane 47 is shown in FIG. 3.

Front and rear lower frame wheelbase points 53, 55 define a first axis 57 therebetween. Front lower frame wheelbase point 53 and the rearward seat height point 33 define an axis 59 therebetween. Rear lower frame wheelbase point 55 and the rearward seat height point 33 define an axis 79 therebetween. FIG. 2B depicts axis 57 and axis 59 defining approximately a seventeen (17) degree angle therebetween (the shown angle is between 16 and 17 degrees). FIG. 2B further depicts axis 57 and axis 79 defining approximately a thirty-one (31) degree angle (the shown angle is between 32 ad 32 degrees). Still further, FIG. 2b depicts axis 59 and axis 79 defining approximately a one-hundred-thirty-two (132) degree angle (the angle shown is between 131 and 132 degrees).

Figure 2C:
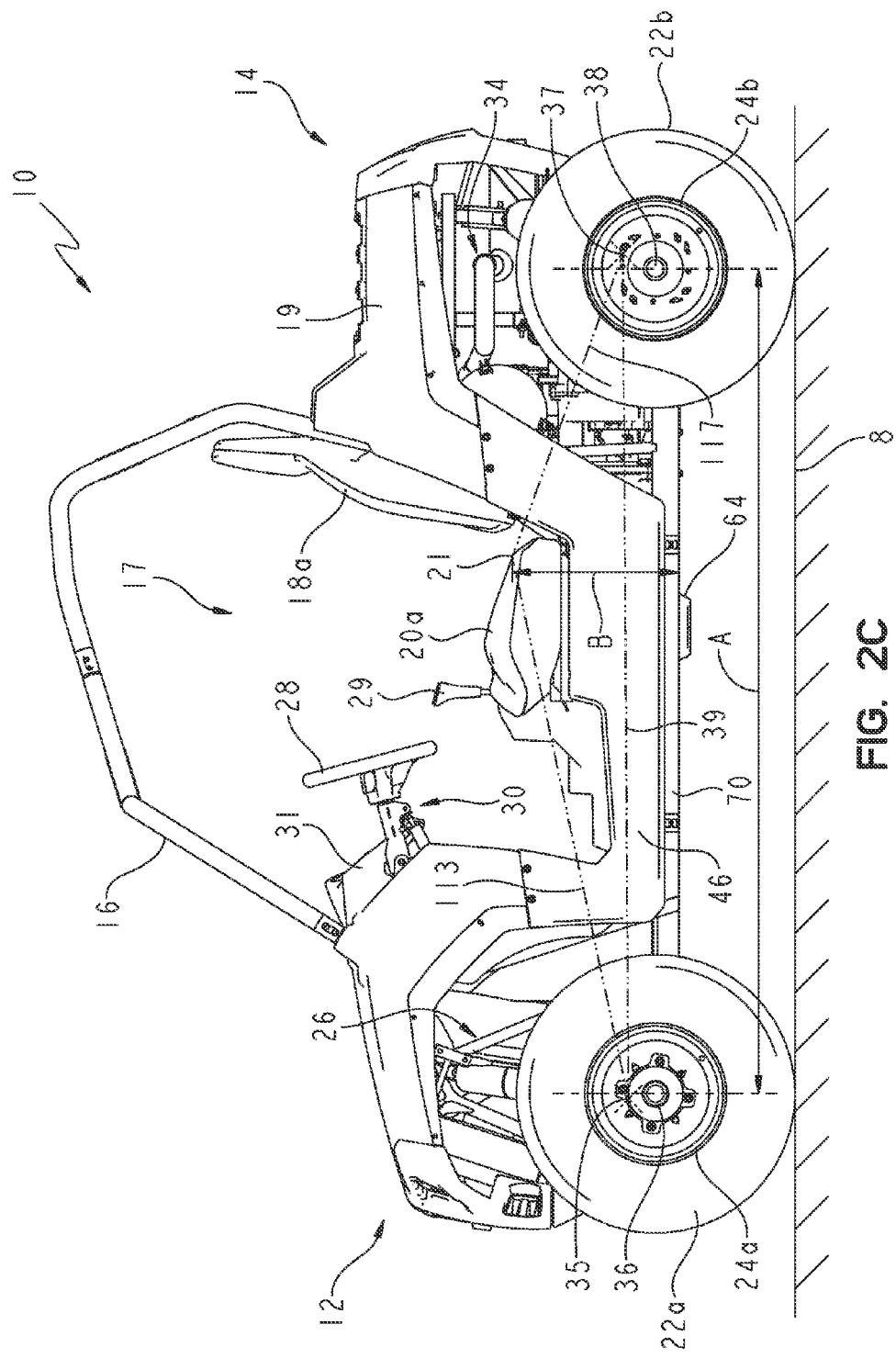
Figure 3:
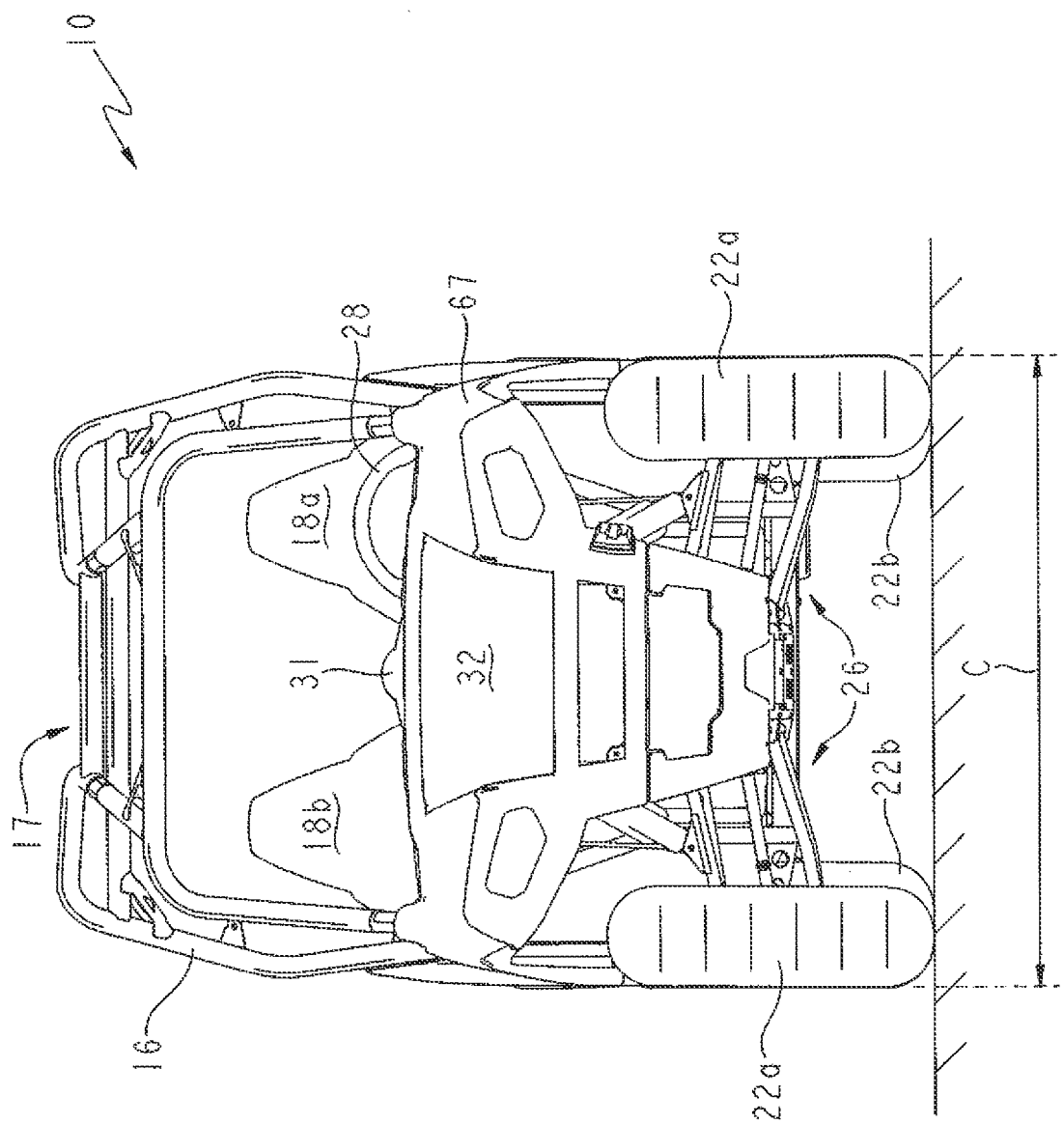
FIG. 3 is a front view of the ATV shown in FIGS. 1 and 2.

With reference to FIG. 2C, front axle attachment point 35 and low point 21 define an axis 113 therebetween. Rear axle attachment point 37 and low point 21 define an axis 117 therebetween. FIG. 2C depicts first attachment axis 39 and axis 113 defining approximately a twelve (12) degree angle therebetween (the shown angle is between 11 and 12 degrees). FIG. 2C further depicts first attachment axis 39 and axis 117 defining approximately a twenty (20) degree angle (the shown angle is between 20 and 21 degrees). Still further, FIG. 2C depicts axis 113 and axis 117 defining approximately a one-hundred-forty-eight (148) degree angle (the shown angle is between 147 and 148 degrees).

Figure 2D:
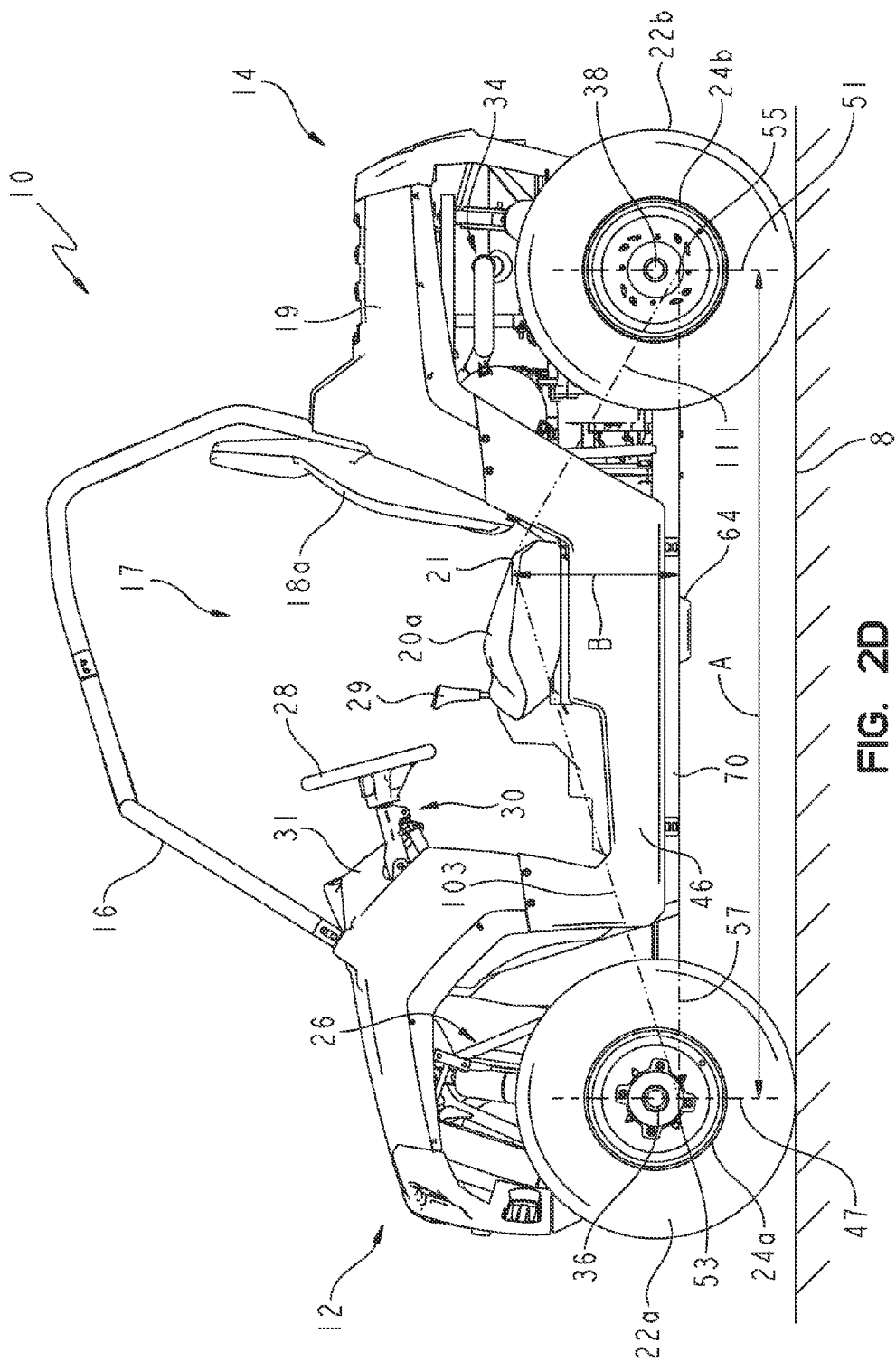

With reference to FIG. 2D, front and rear lower frame wheelbase points 53, 55 are again shown that are defined at a ground clearance height on the front and rear wheelbase vertical planes 47, 51.

Front lower frame wheelbase point 53 and low point 21 define an axis 103 therebetween. Rear lower frame wheelbase point 55 and low point 21 define an axis 111 therebetween. FIG. 2D depicts axis 57 and axis 103 defining approximately a seventeen (17) degree angle therebetween (the shown angle is between 17 and 18 degrees). FIG. 2d further depicts axis 57 and axis 111 defining approximately a thirty (30) degree angle (the shown angle is between 29 and 31 degrees). Still further, FIG. 2D depicts axis 103 and axis 111 defining approximately a one-hundred-thirty-three (133) degree angle (the shown angle is between 132 and 133 degrees). It is noted that the triangle formed via axes 103, 111, and 57 is a triangle with a base length of A and a height of B.

Figure 2E:
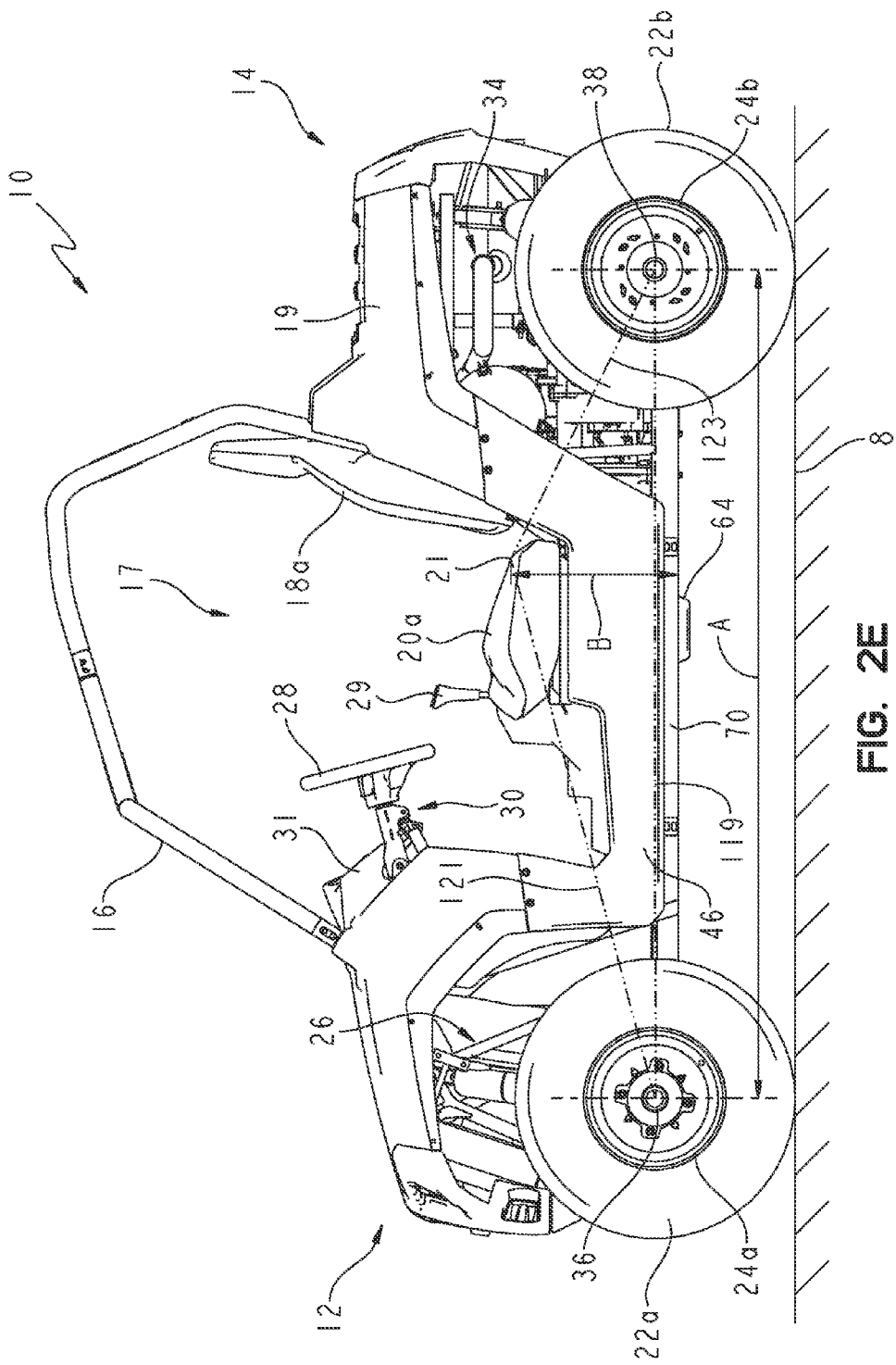

With reference to FIG. 2E, front axle point 36 (at front wheel 22a) and rear axle point 38 (at rear wheel 22b) are shown on the front and rear wheelbase vertical planes 47, 51. Front axle point 36 and rear axle point 38 define axle axis 119 therebetween.

Front axle point 36 and low point 21 define an axis 121 therebetween. Rear axle point 38 and low point 21 define an axis 123 therebetween. FIG. 2E depicts axis 119 and axis 121 defining approximately a fifteen (15) degree angle therebetween (the shown angle is between 14 and 15 degrees). FIG. 2E further depicts axis 119 and axis 123 defining approximately a twenty-six (26) degree angle (the shown angle is between 26 and 27 degrees). Still further, FIG. 2E depicts axis 121 and axis 123 defining approximately a one-hundred-thirty-nine (139) degree angle (the shown angle is between 138 and 139 degrees)."

Figure 4:
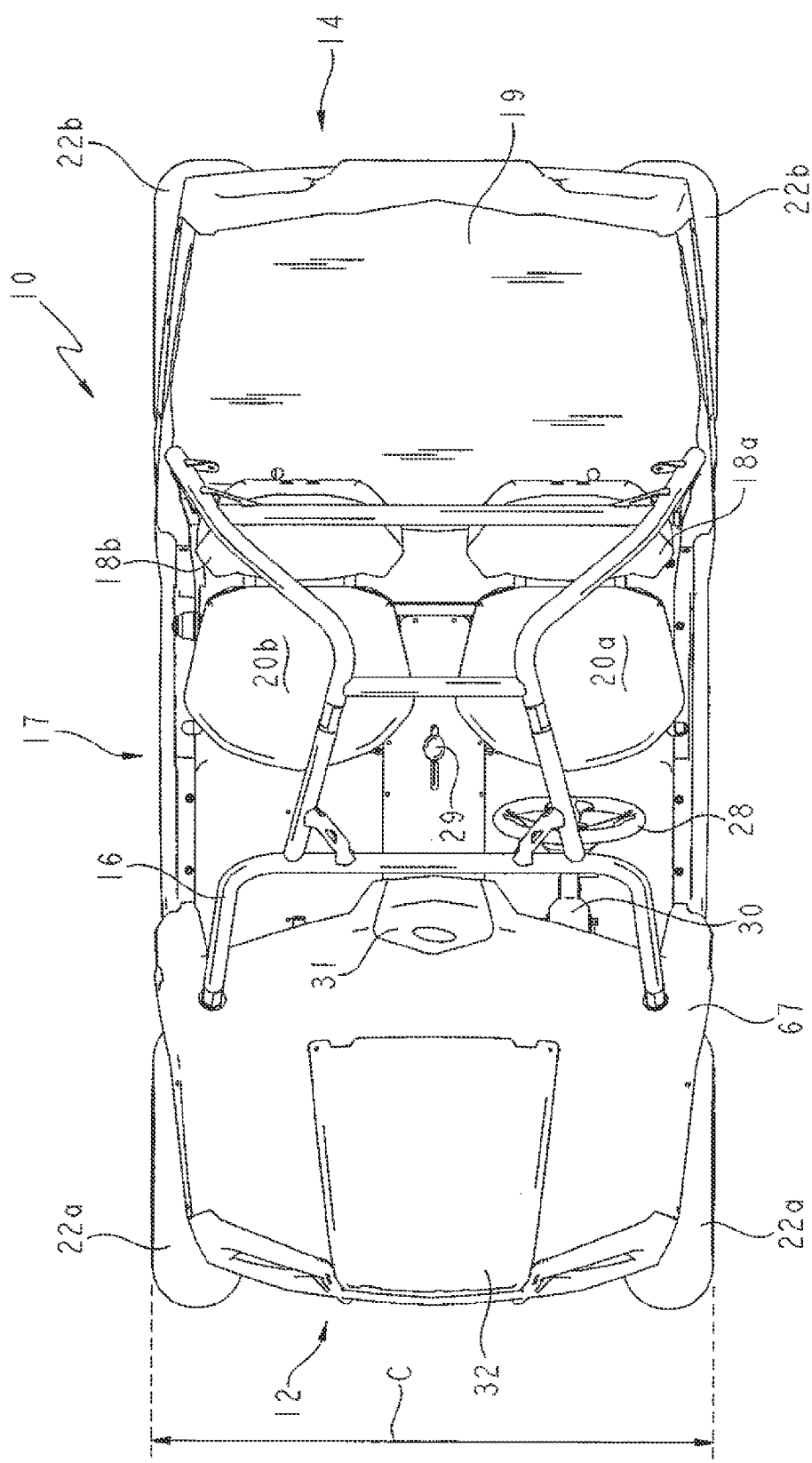
FIG. 4 is a top plan view of the side-by-side ATV shown in FIGS. 1 through 3.

Referring now to FIGS. 3 and 4, a front view and top plan view of ATV 10 is shown. In the illustrative embodiment, width C, which is defined as the overall width of ATV 10, extends between the outermost lateral points of ATV 10. In the illustrative embodiment, outer surfaces of tires 22 on the front and rear ends of ATV 10 define the outermost points. In other embodiments, width C may be measured from the outer fenders of front panel 67. It may be appreciated that width C may be defined by both the outer surfaces of tires 22 and fenders of front panel 67, should the respective dimensions be substantially equal. In the illustrative embodiment, width C is about 50 inches. In other embodiments, ATV 10 may be constructed to other suitable widths, however the present invention contemplates ATVs having a trail compliant width or less than about 54 inches.

Figure 5:
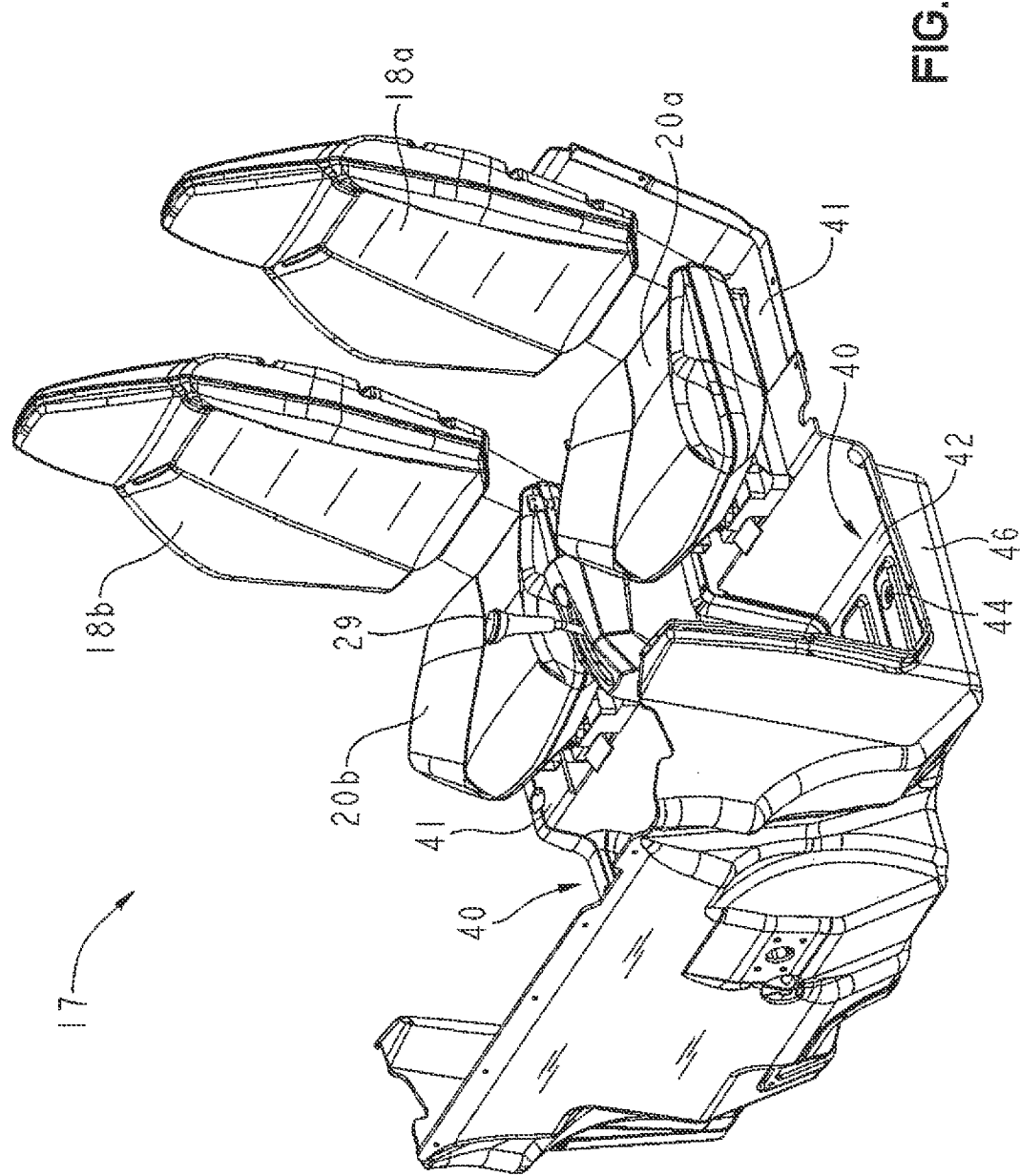
FIG. 5 is a partial perspective view of the cab area of the side-by-side ATV shown in FIGS. 1 through 4.
Figure 6:
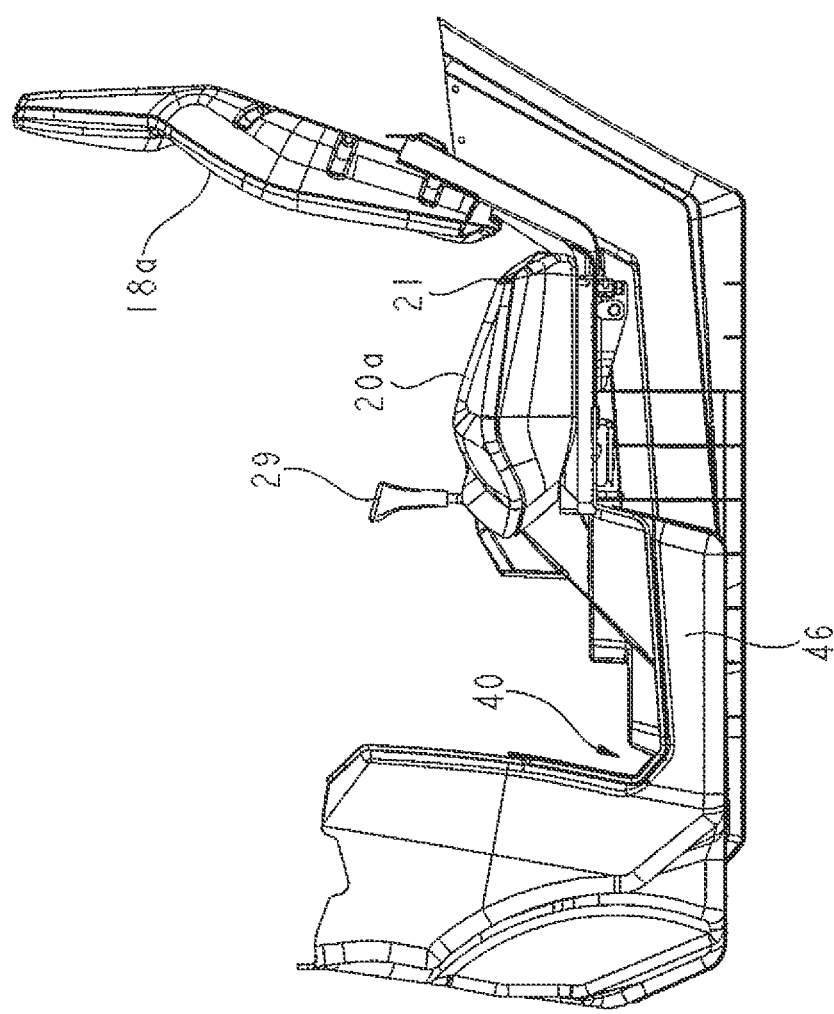
FIG. 6 is a partial profile view of the cab area shown in FIG. 5.

Referring now to FIG. 5, a partial view of cab 17 of ATV 10 is shown. Lower seating surfaces 20 are coupled to base 41 of ATV 10. Foot well area 40 extends below base 41 and encloses each passenger's feet and lower leg portions. Foot well area 40 includes floorboard 42 and side panel 46 on each side of ATV 10. Floorboard 42 includes an aperture 44 positioned to allow fluid to drain out of floorboard 42. Side panel 46 extends upwardly from floorboards 42 on each side of ATV 10. In the illustrative embodiment, side panels 46 extend upward about 4 inches (10.2 centimeters) from floorboards 42, however side panels 46 may be constructed to any suitable height. Side panels 46 and foot well areas 40 prevent the feet and lower leg portions of the driver and passenger of ATV 10 from moving outside of cab 17 when ATV 10 is in motion, for example when traversing rough terrain. In other embodiments (not shown), side panels 46 may be removed to allow easier entry and exit into cab 17 of ATV 10.

Figure 7:
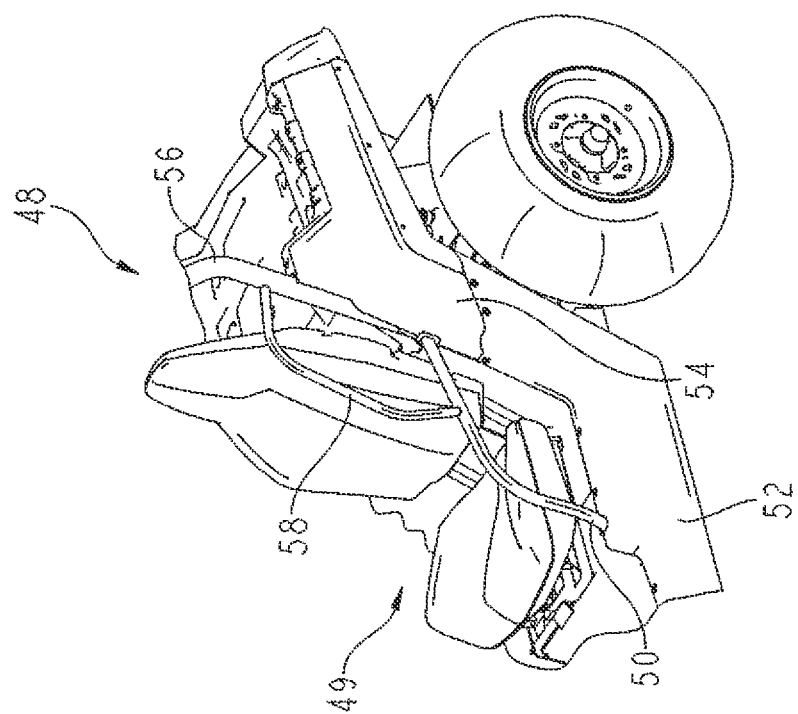
FIG. 7 is a partial perspective view of one embodiment of a guard rail that may be used on a side-by-side ATV, such as the side-by-side ATV shown in FIG. 1.

Referring now to FIG. 7, an illustrative embodiment of a side-by-side ATV 48 is shown. ATV 48 includes driver's side seat 49, side panel 52, and engine cover 54. Tube 56 extends upward from engine cover 54 to form protective cage 16. Seat guard 50 is coupled between engine cover 54 and side panel 52 to prevent a passenger positioned on seat 49 from sliding laterally off of seat 49 during vigorous driving. Additionally, seat guard 50 may provide protection against passing external obstacles. Seat guard 50 may also be included on the passenger's side of ATV 48.

Figure 8:
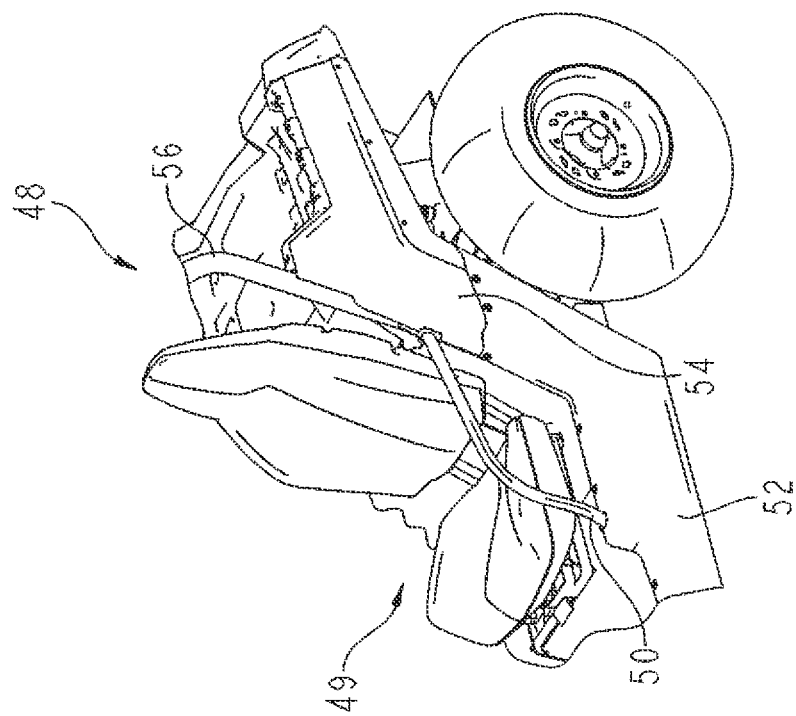
FIG. 8 is another embodiment of a guard rail that may be used on a side-by-side ATV, such as the side-by-side ATV shown in FIG. 1.

Referring now to FIG. 8, another illustrative embodiment of ATV 48 is shown including an additional safety bar 58. In this embodiment, safety bar 58 couples between tube 56 and seat guard 50 to further enclose a passenger in the cab area of ATV 48. Additionally, safety bar 58 may be used as a handle when entering or exiting ATV 48. Safety bar 58 may also be included on the passenger's side of ATV 48. Additionally, there may be a panel or restrictive member, such as a mesh netting, placed between one or more of seat guard 50, safety bar 58, tube 56 and side panel 52 to further restrict the driver's or passenger's appendages from exiting the vehicle during vigorous driving.

Figure 9:
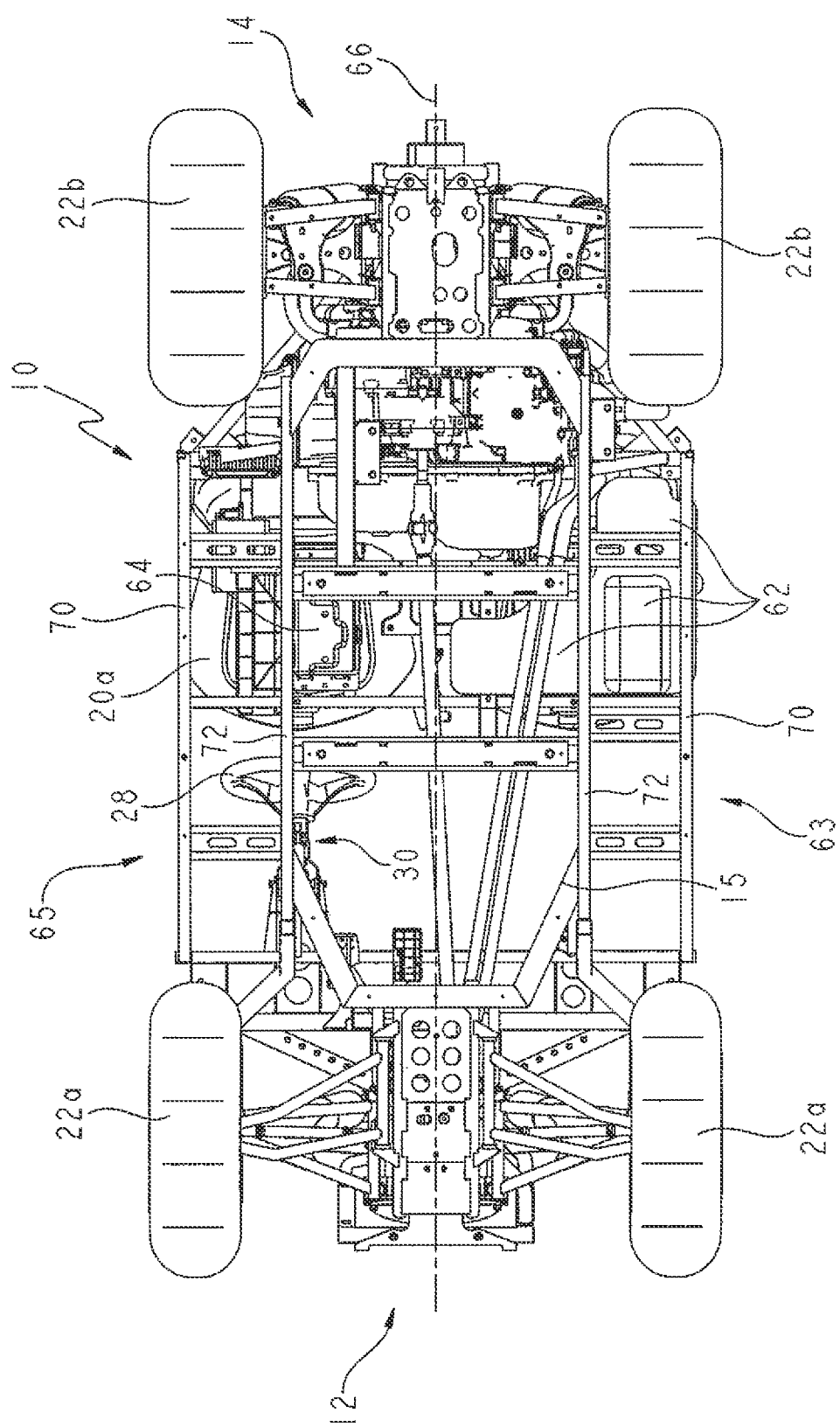
FIG. 9 is a bottom plan view of the side-by-side ATV shown in FIGS. 1 through 4.
Figure 10:
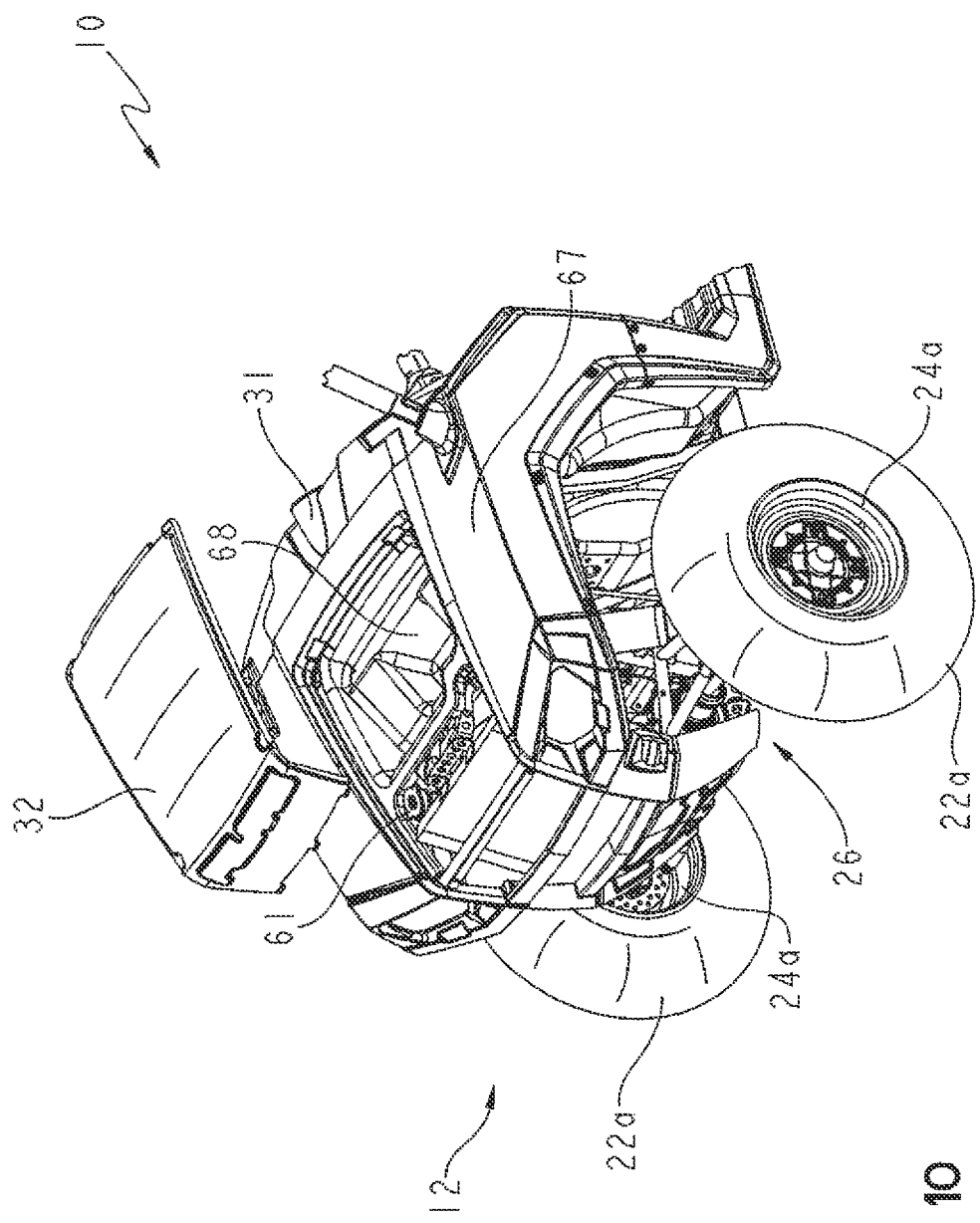
FIG. 10 is a partially exploded, perspective view of the front end of the ATV shown in FIGS. 1 through 4.
Figure 11:
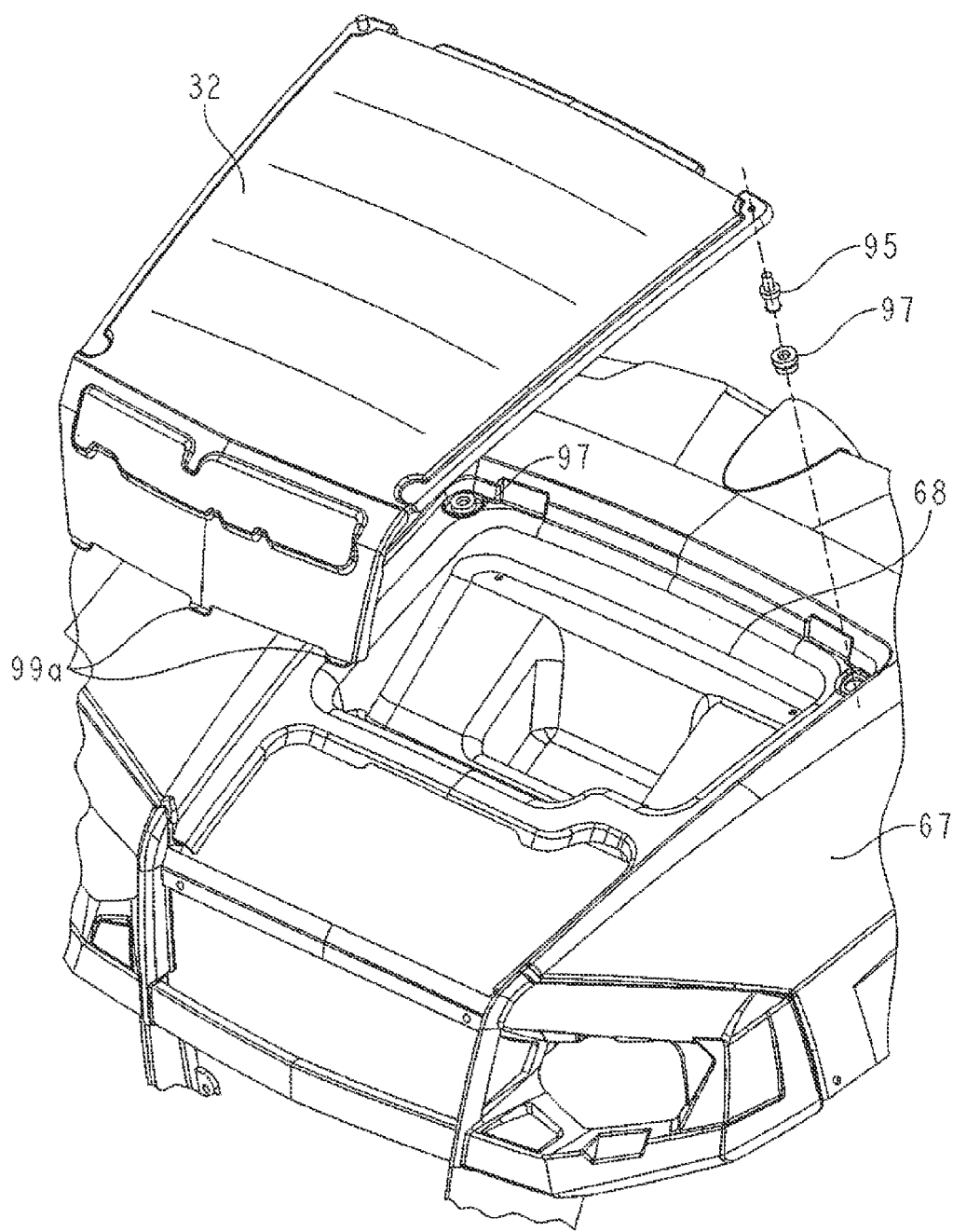
FIG. 11 is a partially exploded, perspective view similar to FIG. 10 showing hood mounting details.
Figure 12:
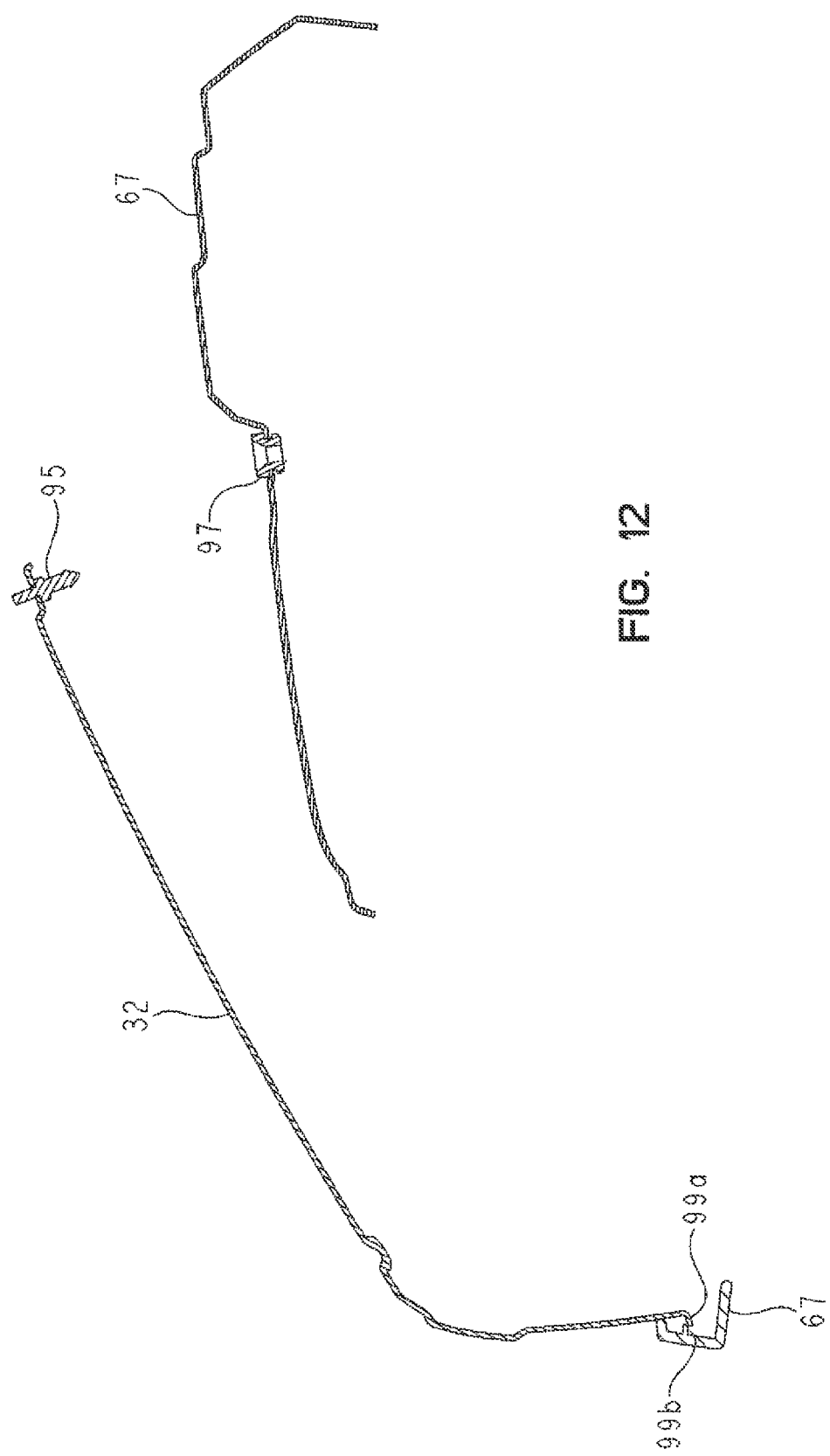
FIG. 12 is a cross-sectional view illustrating the hood mounting with the hood partially removed from the front panel.
Figure 13:
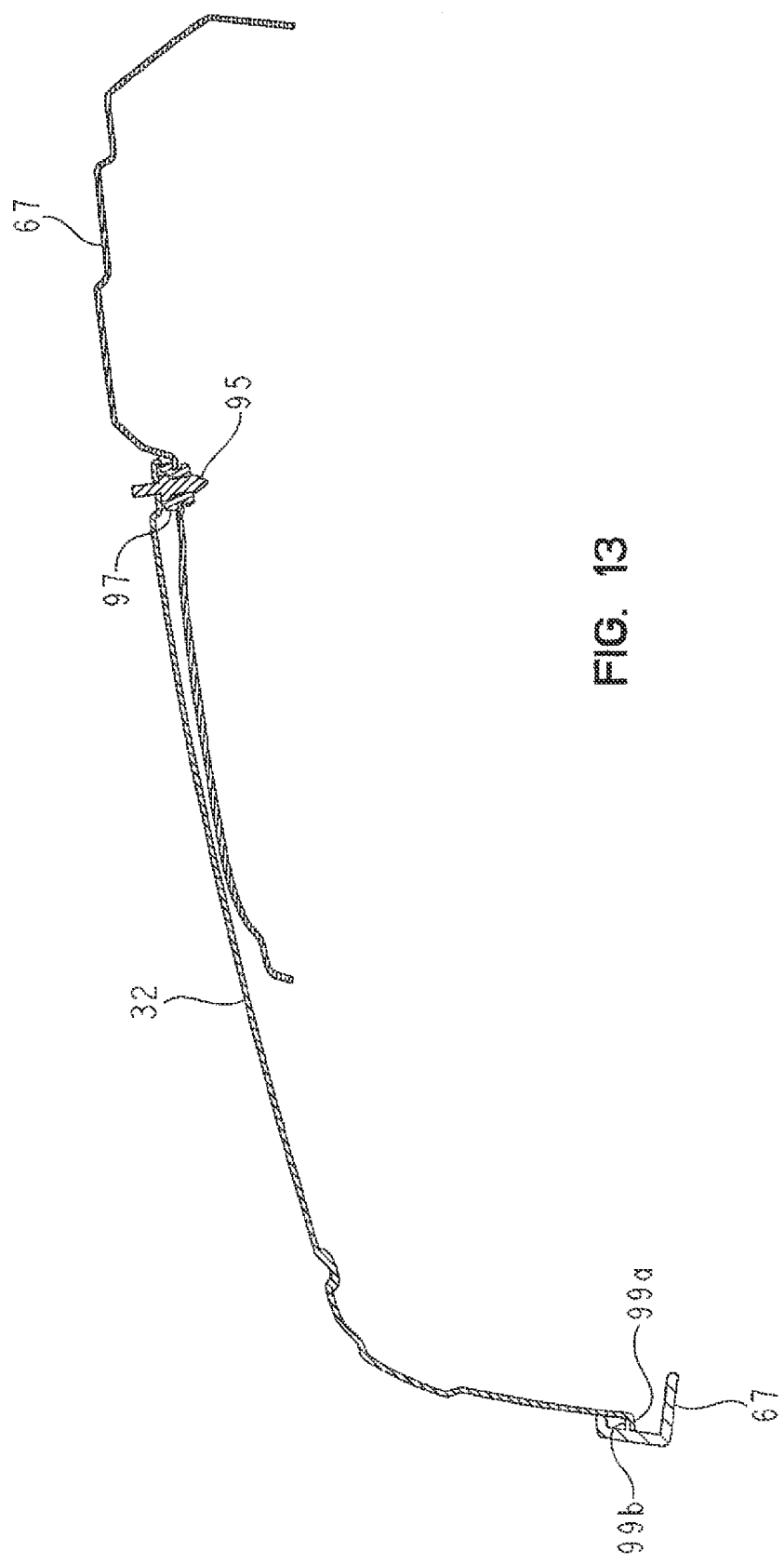
FIG. 13 is a cross-sectional view similar to FIG. 12 with the hood coupled to the front panel.

Referring now to FIG. 9, an illustrative bottom plan view of ATV 10 is shown. For simplicity, the floorboards and bottom side shielding have been removed. In this embodiment, driver's side 65 of ATV 10 is shown on the upper portion of FIG. 9 and passenger's side 63 is shown on the lower portion of FIG. 9. Longitudinal axis 66 separates driver's side 65 from passenger's side 63 and defines the longitudinal center line of ATV 10. In this embodiment, various relatively heavy components are positioned vertically proximate the frame 15 to lower the vehicle's center of gravity, thereby improving balance and stability. For example, fuel tank 62 is positioned under lower seating surface 20b on passenger's side 63 of ATV 10. Fuel tank 62 is supported by frame 15. As shown, fuel tank 62 is L-shaped, however any suitably shaped fuel tank may be used. Positioning fuel tank 62 on passenger's side 63 improves the balance of ATV 10 when only a driver is present on driver's side 65 of ATV 10. Battery 64 is positioned under lower seating surface 20a on driver's side 65 of ATV 10. In this embodiment, battery 64 is positioned near axis 66 and relatively low on the ATV 10, thereby improving balance. Positioning of battery 64 near the seating surface 20a also allows for easier serviceability and for reduced routing of lines to the engine assembly 34.

Referring now to FIGS. 10-13, front end 12 of ATV 10 is shown in greater detail. Front end 12 includes hood 32, which may be removably coupled to front panel 67. As illustrated, a hood mounting assembly includes a pair of plungers or pegs 95 which are removably received within cylindrical grommets 97. Plungers 95 are fixed near the rear corners of the hood 32, while grommets 97 are fixed to the front panel 67 near the rear corners of a storage area 68. In this embodiment, plungers 95 and grommets 97 are illustratively formed of steel and a resilient material (such as an elastomer), respectively, however any suitable material may be used. The front of hood 32 includes a plurality of flanges 99a which are configured to cooperate with a lip 99b formed within front panel 67, thereby defining a releasable hinge.

In this illustrative embodiment, storage area 68 and access panel 61 are positioned under hood 32. Storage area 68 may receive a tool kit, cargo net or any other suitable vehicle accessory for ATV 10. Access panel 61 may include any suitable engine or vehicle maintenance port or terminal, such as a radiator fill cap, battery charging terminals, oil fill plug, or transmission fill plug.

Referring now to FIG. 14, one illustrative embodiment of frame 15 of a side-by-side ATV such as ATV 10 shown in FIG. 1 is shown. Frame 15 includes inner rails 72, front crossmember 71, mid crossmember 73, and rear crossmember 77. Frame 15 also includes outer tubes 70 that define the outermost width of frame 15. Rear assembly 92 is coupled to upper frame rails 90 and cross-member 77 and is described in more detail below. The portion of frame 15 between mid crossmember 73 and rear crossmember 77 supports modular engine assembly 34 of ATV 10. In this embodiment, modular engine assembly 34 may include a transmission 136 such as a continuously variable transmission, and a rear differential 132 prior to being installed in frame 15, as shown in FIG. 15.

Referring to FIGS. 14 and 15, inner rails 72 of frame 15 are coupled together on a front end by crossmember 71 and on the rear end by rear crossmember 77. Brackets 76 couple upper frame tubes 88, upper frame rails 90, vertical tubes 74, and outer tubes 70 together on each side of ATV 10. Outer tubes 70 are coupled to inner rails 72 by brackets 69. Vertical tubes 74 are coupled on a lower end to inner rails 72. Upper frame tubes 88 are coupled to support tubes 83 which are coupled on a lower end to inner rails 72. Upper frame rails 90 are coupled on a rear end to cross tube 91.

As shown in FIG. 15, modular engine assembly 34 may be preassembled before being installed in frame 15. During the construction of frame 15, upper brace 78 is attached to frame 15 to provide dimensional stability during welding. During installation of modular engine assembly 34, upper brace 78 is removed from frame 15 and modular engine assembly 34 is placed on frame 15. Upper brace 78 is then reattached to frame 15. More particularly, after modular engine assembly 34 is positioned between upper frame rails 90 in frame 15, as shown in FIG. 14, upper brace 78 may be installed.

Upper brace 78 includes outer brackets 86, rear bracket 84, crossmember 80 and angular members 82. Angular members 82 are coupled together on an end by bracket 84 and on an opposing end by crossmember 80. Each bracket 86 is substantially U-shaped and includes apertures 85. U-shaped brackets 86 are adapted to overlap upper frame tubes 88. Apertures 85 in brackets 86 and apertures 87 in upper frame tubes 88 align and accept fasteners to secure upper brace 78 to upper frame tubes 88. Bracket 84 includes apertures 81 which align with aperture 89 in cross tube 91 and may be secured using any suitable fasteners.

Figure 18:
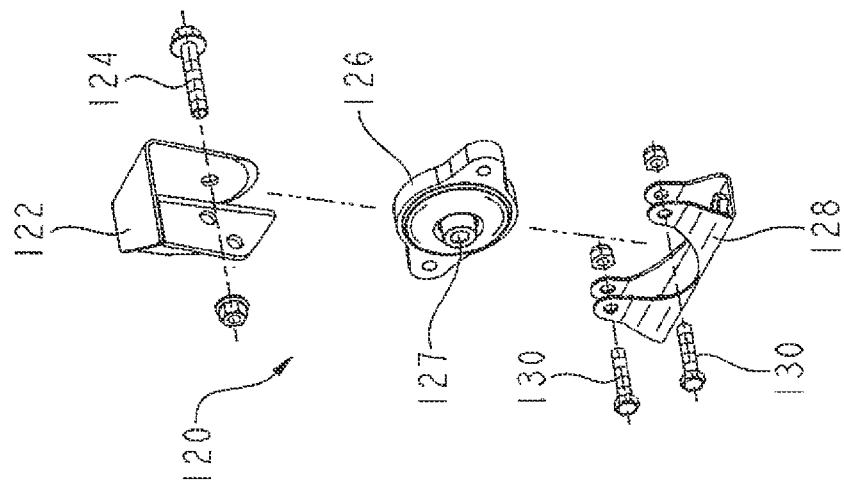
FIG. 18 is an exploded perspective view of yet another embodiment of an engine mounting assembly that may be used on an ATV such as the side-by-side ATV shown in FIGS. 1 through 4.
Figure 17:
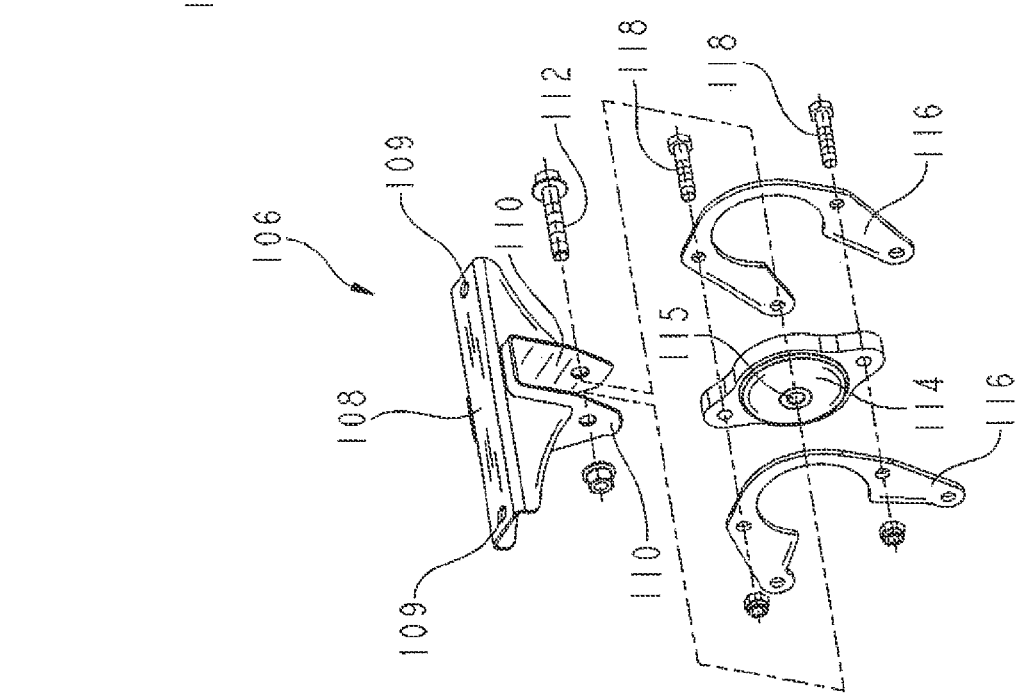
FIG. 17 is an exploded perspective view of another embodiment of an engine mounting assembly that may be used on an ATV such as the side-by-side ATV shown in FIGS. 1 through 4.
Figure 16:
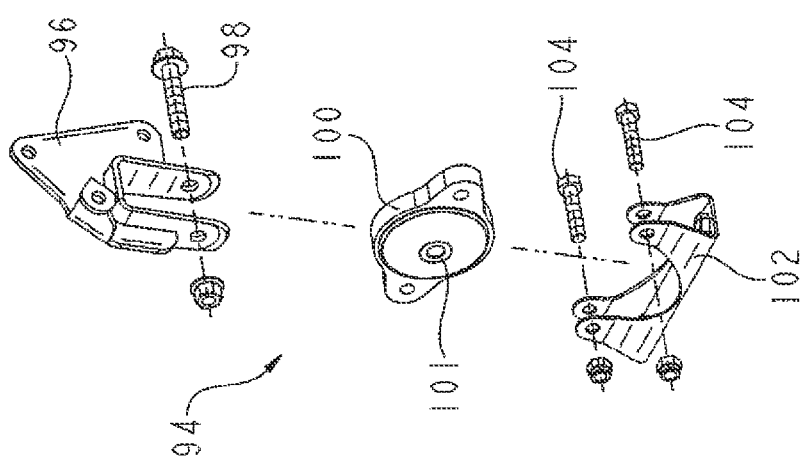
FIG. 16 is an exploded perspective view of one embodiment of an engine mounting assembly that may be used on an ATV such as the side-by-side ATV shown in FIGS. 1 through 4.

In this embodiment, modular engine assembly 34 is mounted on frame 15 of ATV 10 using a three position mounting system to allow modular engine assembly 34 to be dropped into frame 15 and bolted or attached as one unit. Illustrative embodiments of each of the three mounting assemblies are shown in FIGS. 16 through 18. Referring now to FIG. 16, mounting system 94 positioned on the driver's side of modular engine assembly 34 and frame 15 is shown. Bracket 96 is mounted to modular engine assembly 34 prior to installation of modular engine assembly 34 in frame 15. Lower bracket 102 is coupled to rail 75 of frame 15 and receives mounting plate 100. Mounting plate 100 is coupled to bracket 102 by fasteners 104.

During installation of modular engine assembly 34 into frame 15, bracket 96 is aligned with mounting plate 100 and fastener 98 is positioned in an aperture in bracket 96 and aperture 101 of mounting plate 100 to secure bracket 96 and modular engine assembly 34 to frame 15. Similarly, mounting assembly 120, as shown in FIG. 18, is positioned on the passenger's side of modular engine assembly 34 and frame 15. Bracket 128 is coupled to frame 15. Mounting plate 126 is coupled to bracket 128 by fasteners 130. Bracket 122 is coupled to the passenger's side of modular engine assembly 34 and is positioned such that an aperture in bracket 122 aligns with central aperture 127 of mounting plate 126 when modular engine assembly 34 is installed in frame 15. Fastener 124 extends through the aperture in bracket 122 and aperture 127 in mounting plate 126 to secure modular engine assembly 34 to frame 15.

Modular engine assembly 34 is also mounted to frame 15 by a third mounting assembly shown in FIGS. 14 and 17. Mounting assembly 106 includes bracket 108, side plates 116, and mounting plate 114. Bracket 108 couples to brackets 93 of rear assembly 92. Bracket 108 includes vertically extending plates 110 and is coupled to brackets 93 by extending fasteners (not shown) through apertures 109. Side plates 116 are coupled to rear differential 132 of engine assembly 34. Mounting plate 114 is coupled between side plates 116 by fasteners 118. During installation of modular engine assembly 34 in frame 15, vertically extending plates 110 of bracket 108 are positioned one each side of mounting plate 114. Fastener 112 is then positioned through apertures in vertically extending plates 110 and aperture 115 of mounting plate 114 to secure modular engine assembly 34 in frame 15.

Figure 19:
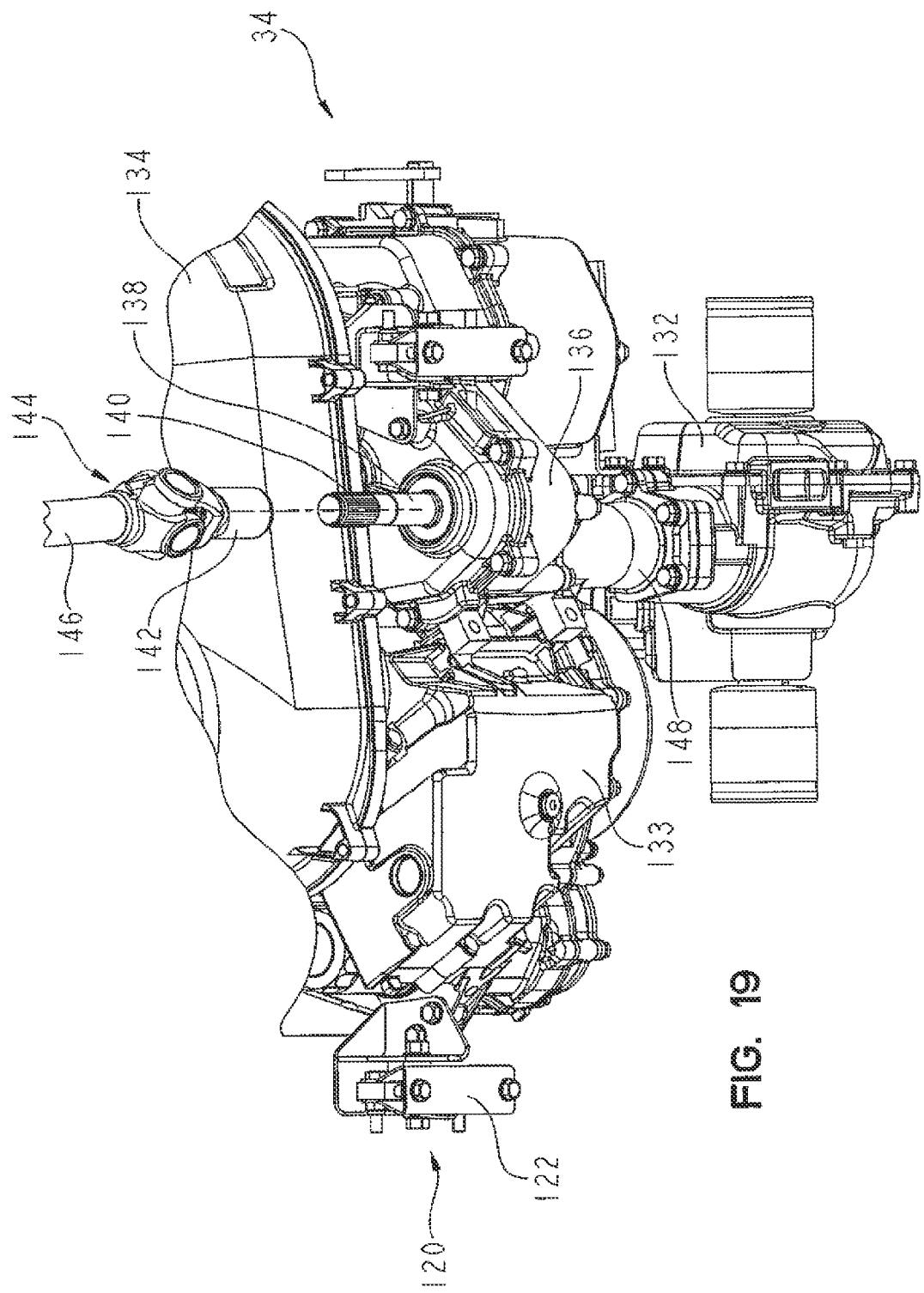
FIG. 19 is a partial front perspective view of the bottom side of the drive train components of the side-by-side ATV shown in FIGS. 1 through 4.

Referring now to FIG. 19, a partial forward-facing, bottom side perspective view of the drivetrain components of ATV 10 is shown. Modular engine assembly 34 includes engine 133, transmission 136, and rear differential 132. In this embodiment, the crankshaft (not shown) of engine 133 is parallel with the fore/aft direction of ATV 10 and provides for a narrower overall vehicle width and improved center of gravity of ATV 10. In this embodiment, engine 133 is a 760 cc engine producing about 50 horsepower. Engine 133 produces excellent acceleration characteristics and responsiveness. ATV 10 weighs about 950 pounds (430.9 kilograms) and has a power to weight ratio of about 0.053/1 (horsepower/pound). Any suitable engine may be used in ATV 10, and ATV 10 may be constructed to any suitable weight, however the present invention contemplates ATVs having a power to weight ratio of at least 0.045/1 (horsepower/pound).

Rear differential 132 of modular engine assembly 34 is directly coupled to transmission 136 by housing 148 to maintain center distances and allow for easy assembly. In this illustrative embodiment, rear differential 132 is an electric rear lockable differential, however any suitable rear differential or rear axle may be used. Output shaft 138 extends outward from transmission 136 toward the front of ATV 10 and rotates to power front wheels 24a of ATV 10. In this embodiment, ATV has on-demand all-wheel drive with switchable backdrive, however any suitable drivetrain such a two-wheel drive or four-wheel drive may be used.

As shown in FIG. 19, output shaft 138 extends under protective panel 134. Protective panel 134 is positioned behind upper and lower seating surfaces 18a, 18b and 20a, 20b and protects passengers in ATV 10 from moving parts of modular engine assembly 34, as well as, assists in shielding from noise. The extending end of output shaft 138 includes splined portion 140 which is adapted to engage the interior circumference of coupler 142. Coupler 142 is coupled to universal joint 144. Universal joint 144 connects coupler 142 to front drive shaft 146 which powers the front wheels of ATV 10. Coupler 142 may move in a fore and aft direction on splined portion 140 of output shaft 138 while remaining engaged with splined portion 140. During vigorous driving, front drive shaft 146 may move in the fore and aft direction causing coupler 142 to slide longitudinally on splined portion 140 of output shaft 138 while front drive shaft 146 remains rotationally coupled with output shaft 138.

Figure 20:
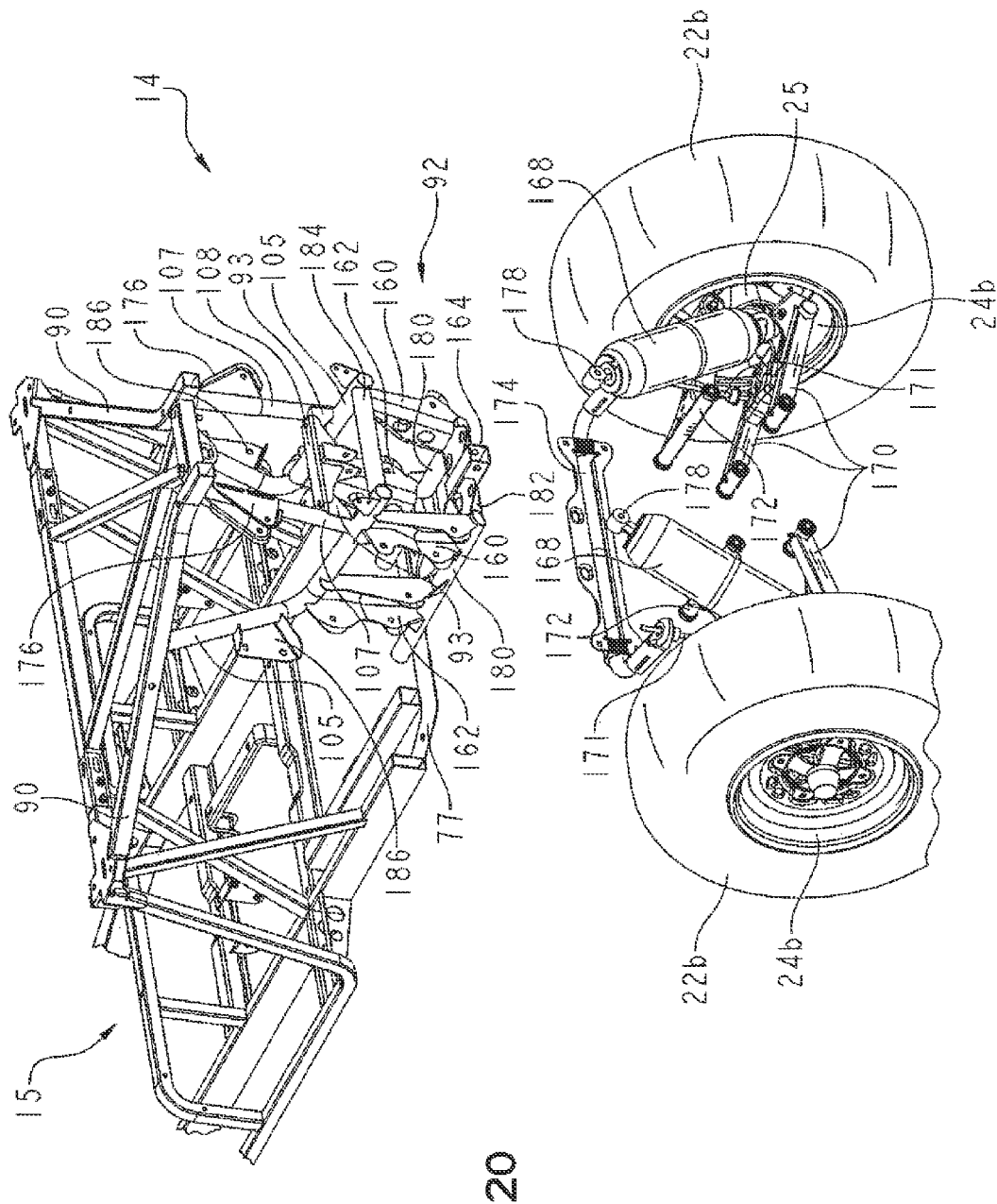
FIG. 20 is a partially exploded rear view of components of the frame and rear suspension system of the side-by-side ATV shown in FIGS. 1 through 4.

Referring now to FIGS. 20 and 21, components of the rear suspension of ATV 10 is shown. Rear frame assembly 92 is formed by down tubes 105, vertical tubes 107, rear brackets 160, front brackets 162, lower tubes 180, and cross tubes 182 and 184. Down tubes 105 are coupled to upper frame rails 90 and extend rearward. Lower tubes 180 are coupled to rear crossmember 77 on one end. The opposing ends of lower tubes 180 are coupled together by cross tube 182. Cross tube 182 supports hitch 164 which may be used to couple to a trailer or other device for towing behind ATV 10. The lower ends of down tubes 105 are coupled together by cross tube 184. Front brackets 162 and rear brackets 160 extend between lower tubes 180 and down tubes 105. Vertical tubes 107 extend downward from upper frame rails 90 and couple to down tubes 105. Each down tube 105 includes bracket 186. Similarly, each vertical tube 107 includes bracket 176.

Rear wheels 24b include inner hub assemblies 25. The lower ends of upper and lower control arms 172 and 170 are coupled to inner hub assemblies 25 of rear wheels 24b. The lower ends of dampeners 168 are also coupled to inner hub assemblies 25. The upper ends of upper and lower control arms 172 and 170 are pivotally coupled to front and rear brackets 162 and 160 on each side of ATV 10. Upper ends 178 of dampeners 168 are coupled to brackets 176 on vertical tubes 107. Stabilizer or torsion bar 174 is coupled to inner hub assemblies 25 by rods 171. More particularly, rods 171 have upper ends connected to opposing ends of torsion bar 174 and lower ends connected to lower control arms 170. Torsion bar 174 is coupled to brackets 186 on down tubes 105 and provides a torsional transverse connection between the lower control arms 170 of rear wheels 24b.

Rear wheels 24b may move vertically in an independent manner along a path defined by upper and lower control arms 172 and 170. For example, when ATV 10 encounters rough terrain, rear wheels 24b may move upward and downward to maintain contact with a ground surface. By positioning brackets 176, which couple to dampeners 168, on vertical tubes 107 of frame 15, the load path generated when rear wheels 24b move upward is translated through vertically orientated frame members (vertical tubes 107) of frame 15. Additionally, torsion bar 174 provides interaction between the independent suspensions of the rear wheels 24b through respective control arms 170. As known in the art, during a turn, torsion bar 174 resists deflection of an outer rear wheel 24b due to centrifugal force by transmitting deflection to the inner rear wheel 24b. These elements may improve the ride and handling characteristics of ATV 10.

Figure 22:
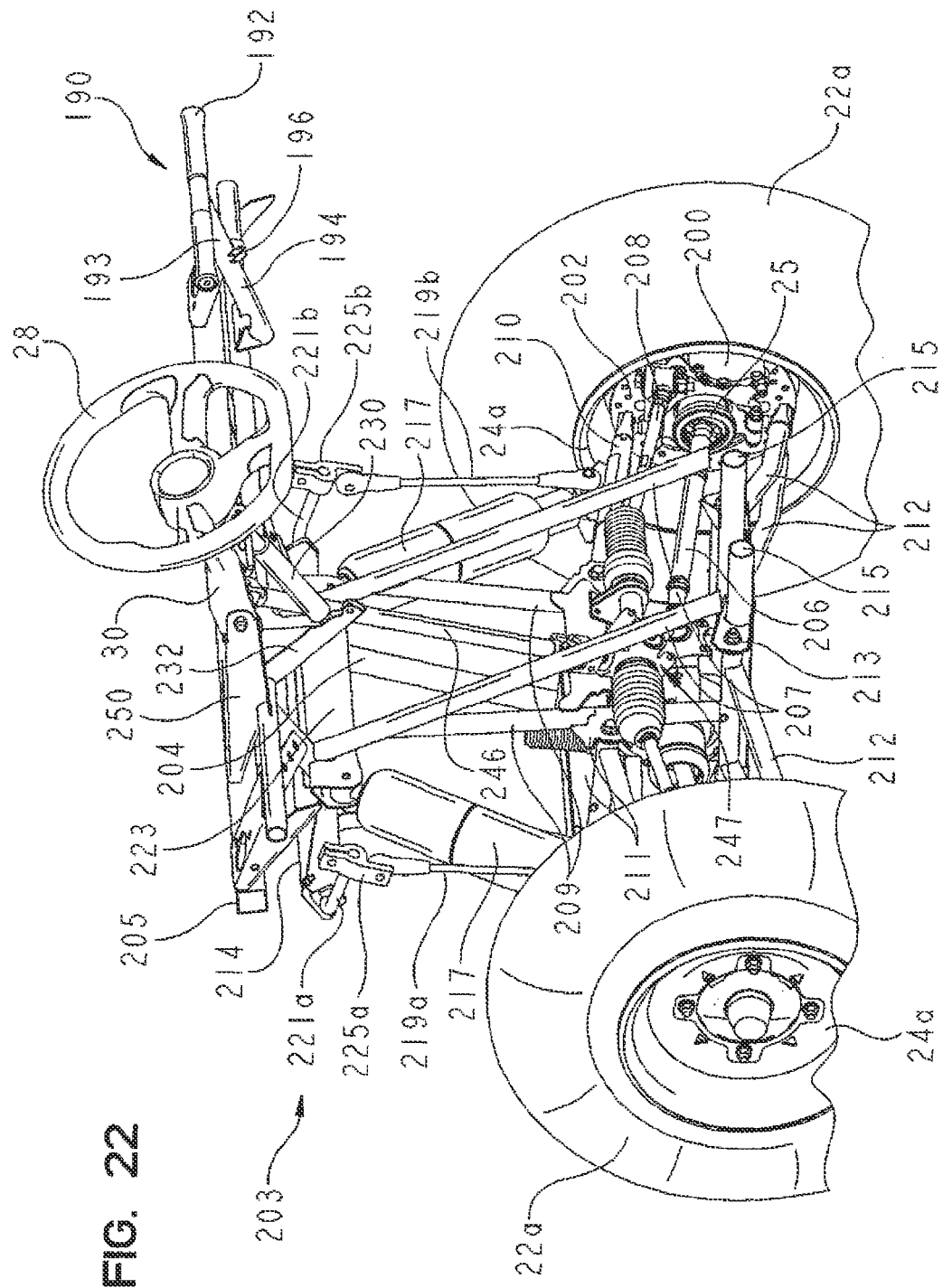
FIG. 22 is a partial rear perspective view of a steering mechanism and front axle assembly that may be used on an ATV such as the side-by-side ATV shown in FIGS. 1 through 4.
Figure 23:
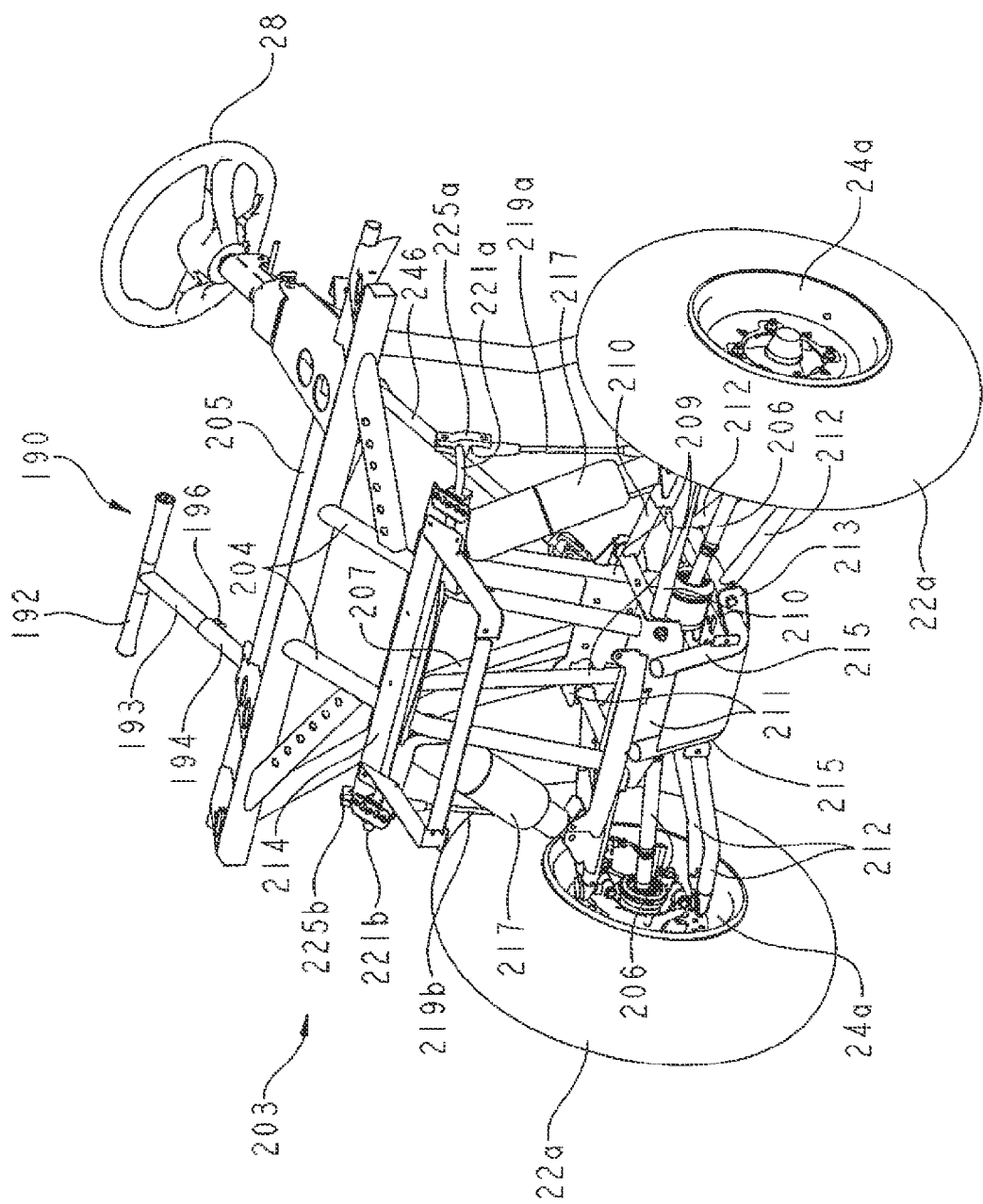
FIG. 23 is a partial front perspective view of the steering mechanism and front axle assembly of the ATV shown in FIG. 22.
Figure 24:
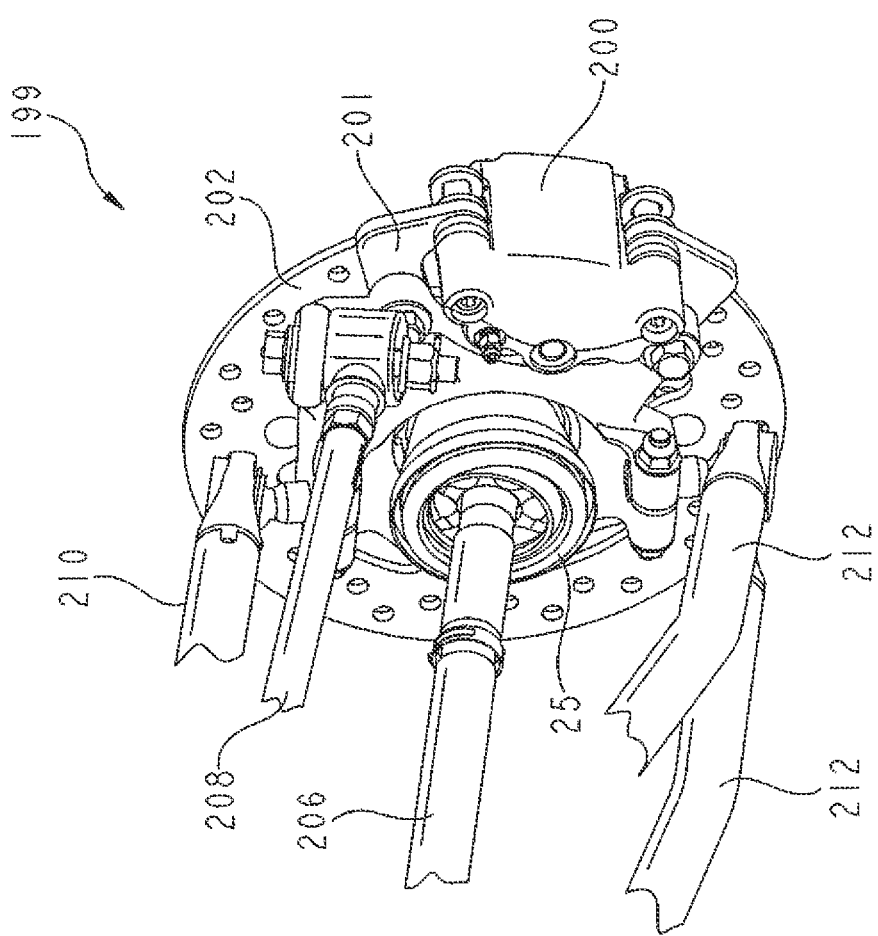
FIG. 24 is a partial perspective view of one embodiment of a braking assembly that may be used on an ATV such as the side-by-side ATV shown in FIGS. 1 through 4.

Referring now to FIGS. 22-24, components of the front suspension, including right front brake assembly 199 are shown. Front frame assembly 203 includes front tubes 204 coupled to an upper crossmember 205. Rear tubes 207 are positioned rearwardly of the front tubes 204 and are coupled to angled braces 209 and crossmember 71 (FIG. 14). Upper brackets 211 are supported by front tubes 204 and braces 209, while lower brackets 213 are supported by lower tubes 215. The lower ends of upper and lower control arms 210 and 212 couple to inner hubs 25 of wheels 24a. Lower ends of steering arms 208 (commonly called tie rods), and dampeners 217 are also coupled to inner hubs of wheels 24a. The upper ends of upper and lower control arms 210 and 212 are pivotally coupled to lower brackets on each side of ATV 10. Upper ends of dampeners 217 are pivotally coupled to bracket 223 extending between rear tubes 207. The control arms 210, 212 and dampeners 217 cooperate to define independent front suspensions for the right and left front wheels 24a. More particularly, front wheels 24a may move vertically in an independent manner along a path defined by upper and lower control arms 210 and 212.

With further reference to FIGS. 22 and 23, a stabilizer or torsion bar 214 is coupled to front tubes. Links or rods 219a and 219b are operably coupled to opposing left and right ends of torsion bar 214, illustratively through left and right clamps 225a and 225b and torque bars 221a and 221b, respectively. Rods 219 are coupled to inner hub assemblies 25 of right and left front wheels 24a through upper control arms 210. In use, when a force is exerted on one of the right and left front wheels 24a during vehicle travel, the front suspension may transmit a corresponding force on the other of the left and right front wheel 24a. For example, when an upward force is exerted on the left front wheel 24a due to, e.g., a bump or a turn, the corresponding upper and lower control arms 210 and 212 may move upward relative to the ATV 10. Such upward movement may urge the corresponding rod 219a upward, which may cause the corresponding end of the left torque bar 221a to move upward. The left torque bar 221a may act as a lever, exerting a torque on the left end of the torsion bar 214.

The torsion bar 214 may include a torque transfer regulator (not shown), which determines how much of the torque exerted by the left torque bar 221a (or right torque bar 221b) is transferred to the right torque bar 221b (or left torque bar 221a). Clamps 225a and 225b may be repositioned or moved along torque bars 221a and 221b to change the suspension effect. In the current example, upward movement of the left torque bar 221a may cause upward movement of the right torque bar 221b, thereby urging the right rod 219b and connected control arms 210 and 212 upward. The upward movement of the right control arms 210 and 212 may exert an upward force on the right front wheel 24a. Thus, the front suspension may exert on the right front wheel 24a a portion of the upward force that a travel surface exerts on the left front wheel 24a. While the current example involved a force exerted by the travel surface on the left front wheel 24a, the front suspension may operate in a similar manner when a force is exerted by the travel surface on the right front wheel 24a. An illustrative embodiment torsion bar is disclosed in U.S. patent application Ser. No. 11/340,301, filed Jan. 26, 2006, which is expressly incorporated by reference herein.

For simplicity, only right front brake assembly 199 is shown in FIGS. 22 and 23, however a similar brake assembly may be used for each wheel 24 of ATV 10. Front brake assembly 199 is coupled to inner hub 25 of wheel 24. Front axle 206 is supported by inner hub assembly 25. As detailed above, upper control arms 210, lower control arms 212, and steering arms 208 couple to inner hubs 25 of wheels 24a. Steering arm 208 is positioned above and rearward of front axle 206 to allow caliper bracket 201 and caliper 200 to be positioned rearward or on the back side of front axle 206. Control arm 210 is positioned above steering arm 208 to facilitate the relative positioning of steering arm 208 and hence, caliper bracket 201 and caliper 200. Caliper bracket 201 and brake disc 202 are also coupled to inner hub 25 of wheel 24. Brake caliper 200 is coupled to the back or rearward facing end of caliper bracket 201. The placement of brake caliper 200 on the rearward facing end of caliper bracket 201 prevents mud and debris from piling up on top of caliper 200 as tire 22 rotates forward or counterclockwise. Placement of caliper 201 on the frontward facing side or end of brake disc 202 may require a wiper or housing to prevent mud and debris from tire 22 from piling up on caliper 200.

Figure 25:
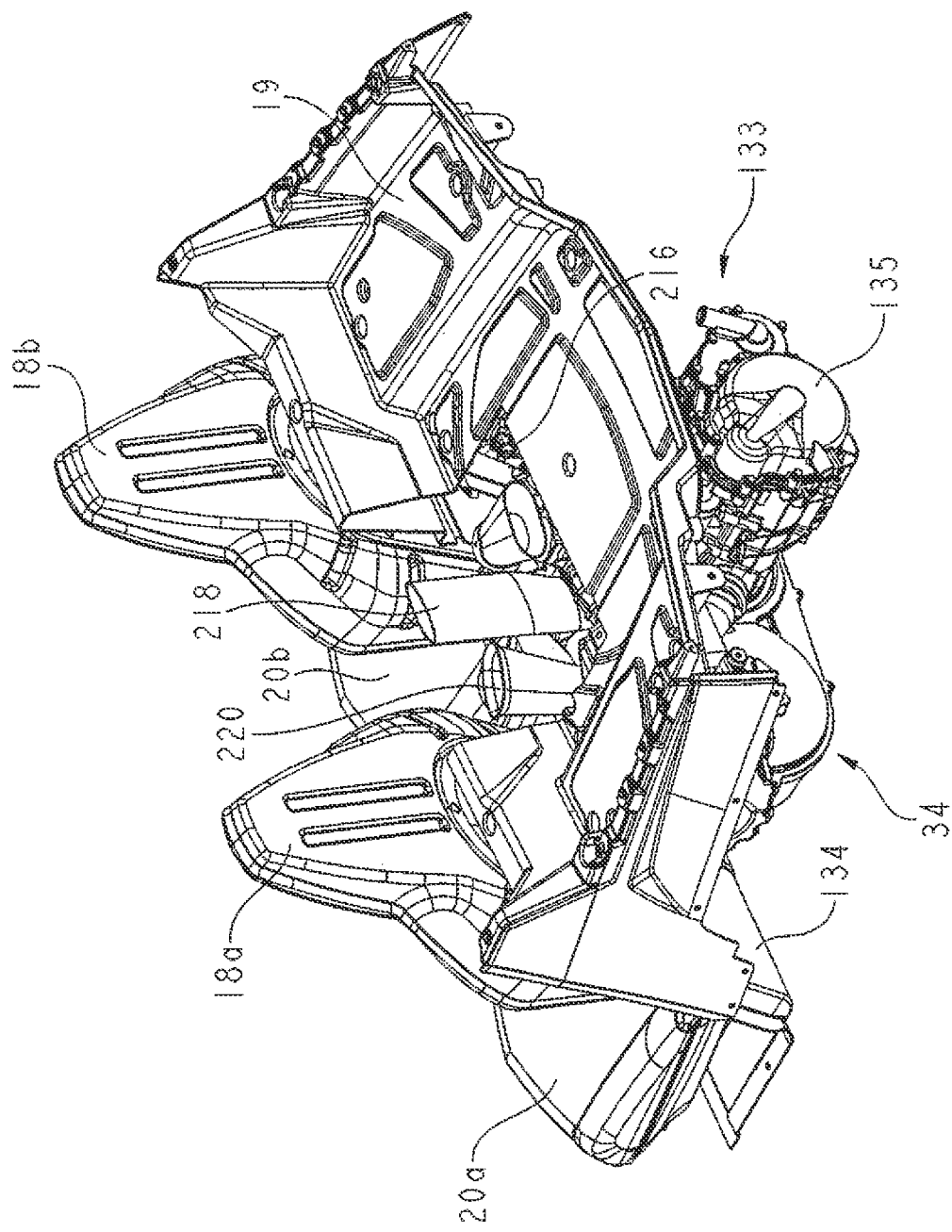
FIG. 25 is an elevated rear perspective view of the engine and clutch cooling components of the side-by-side ATV shown in FIGS. 1 through 4.
Figure 26:
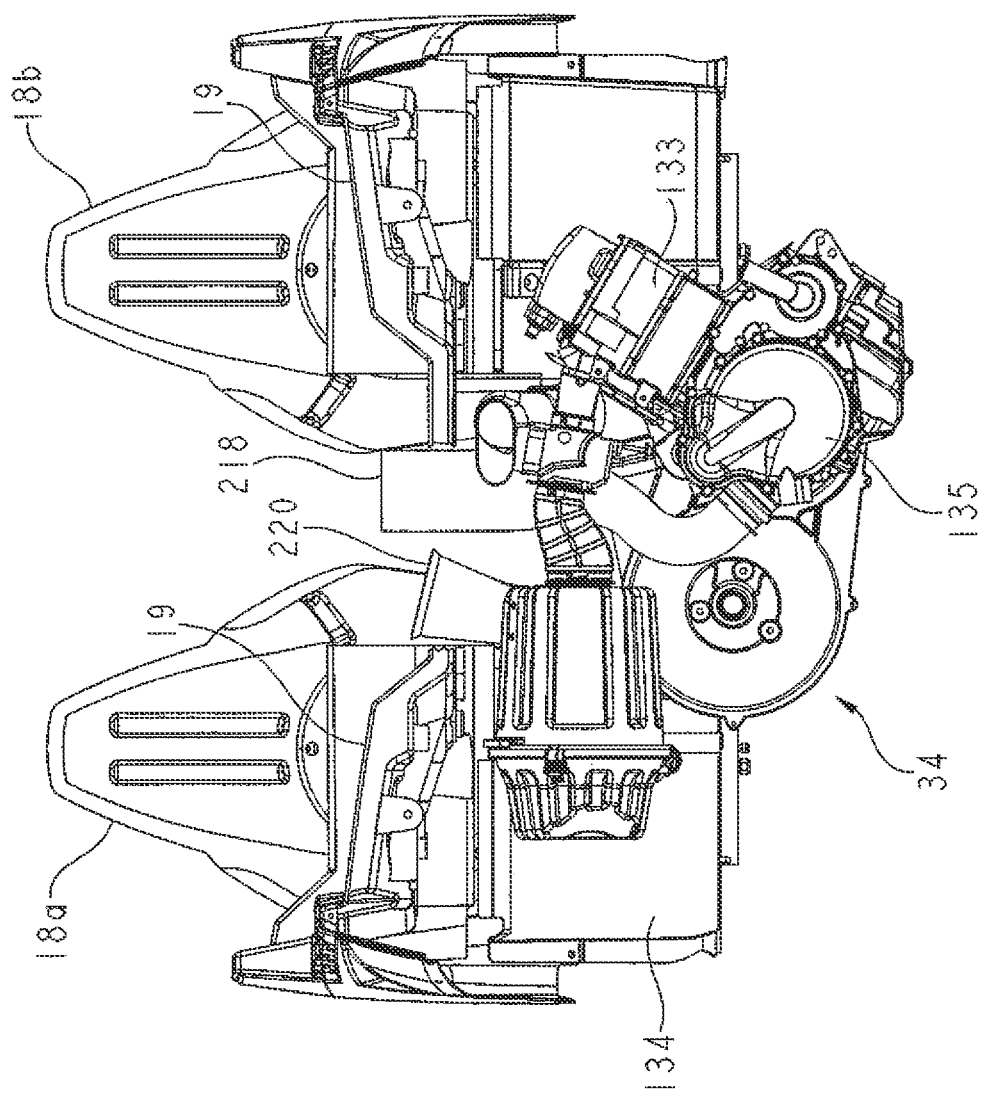
FIG. 26 is a partial rear view of the engine and clutch cooling components shown in FIG. 25.

Referring now to FIGS. 25 and 26, an elevated perspective view and a rear profile view of engine cover 19 of ATV 10 is shown. Modular engine assembly 34 includes engine cooling intake 220 and clutch cooling intake 218. Intakes 218 and 220 extend upward through opening 216 in engine cover 19 and direct cooling air to clutch housing 135 and engine 133. Clutch housing 135 protects a clutch mechanism adapted to transmit power from engine 133 to transmission 136. Intakes 218 and 220 are positioned between driver and passenger upper seating surfaces 18 to collect air passing between upper seating surfaces 18a and 18b when ATV is driven in the forward direction. As ATV 10 increases in speed, more air passes between upper seating surfaces 18a and 18b and is collected by intakes 218 and 220.

Figure 27:
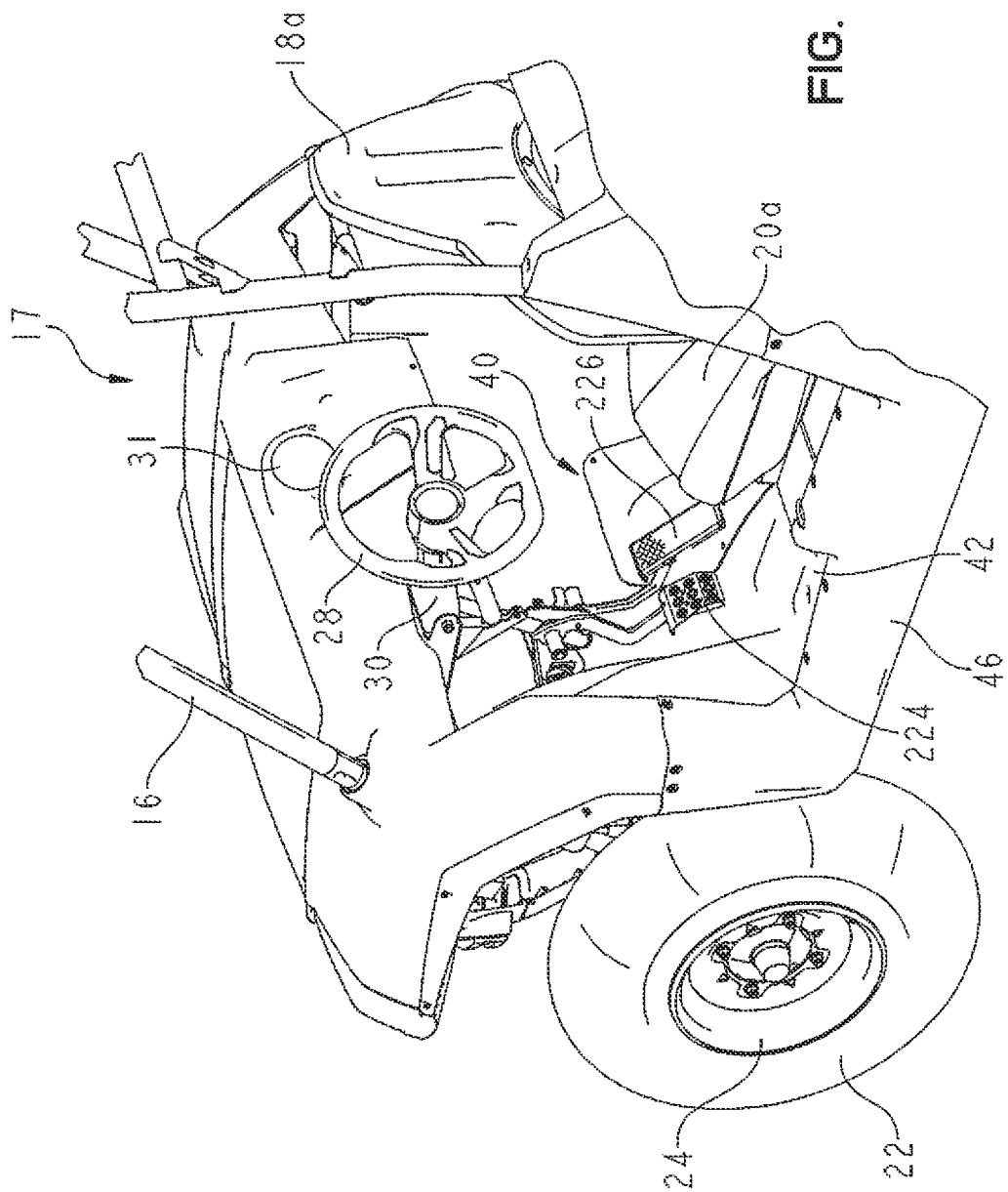
FIG. 27 is a partial perspective view of the driver's side foot well area of the ATV shown in FIGS. 1 through 4.

Referring now to FIG. 27, a partial perspective view of the driver's side of cab 17 of ATV 10 is shown. As described above, cab 17 includes upper seating surface 18, lower seating surface 20, steering wheel 28 and front console 31. In this illustrative embodiment, accelerator 226 and brake pedal 224 are positioned in footwell 40 of cab 17.

Figure 28:
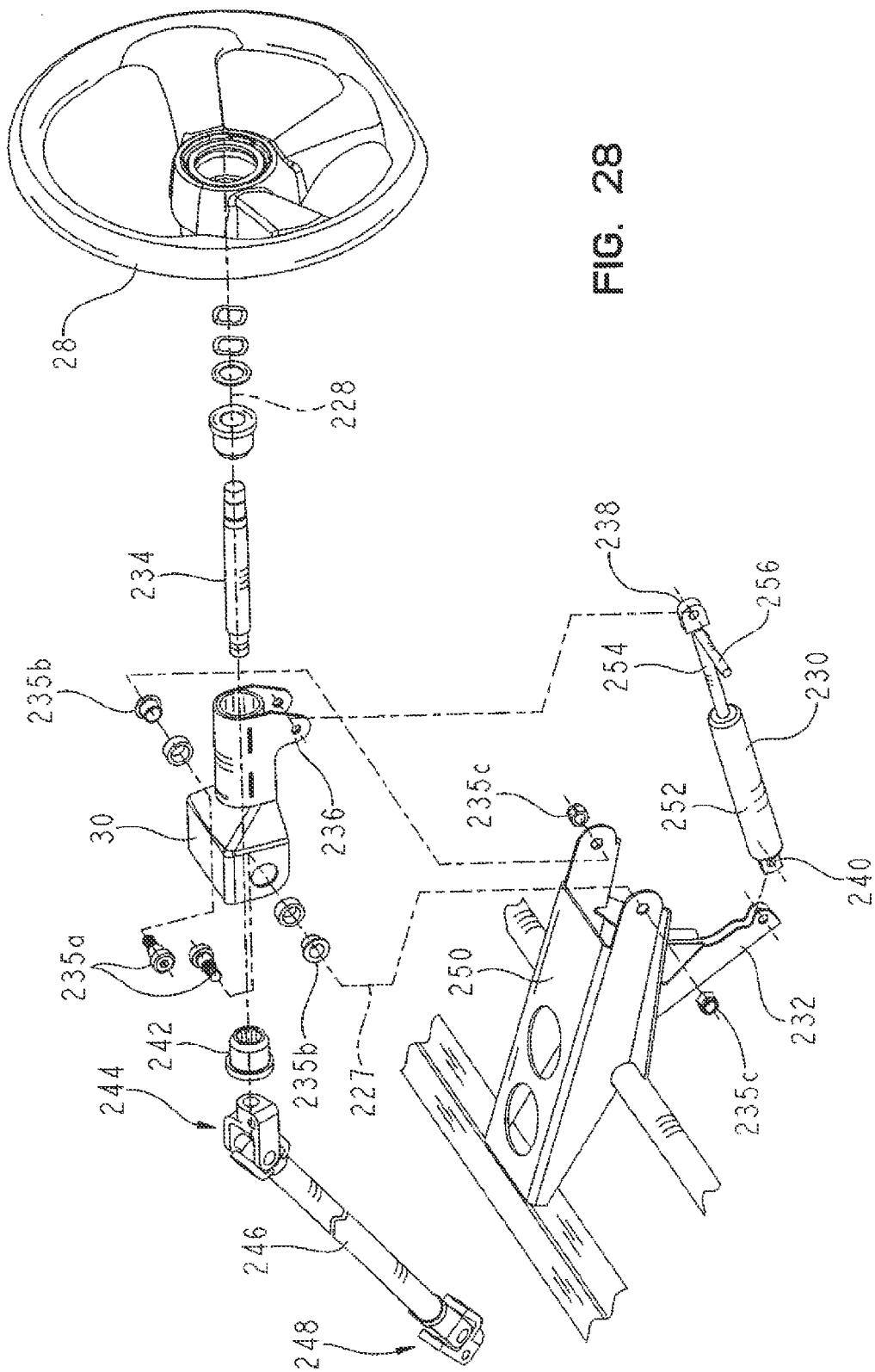
FIG. 28 is an partial exploded view of a steering assembly that may be used on an ATV such as the side-by-side ATV shown in FIGS. 1 through 4.
Figure 29:
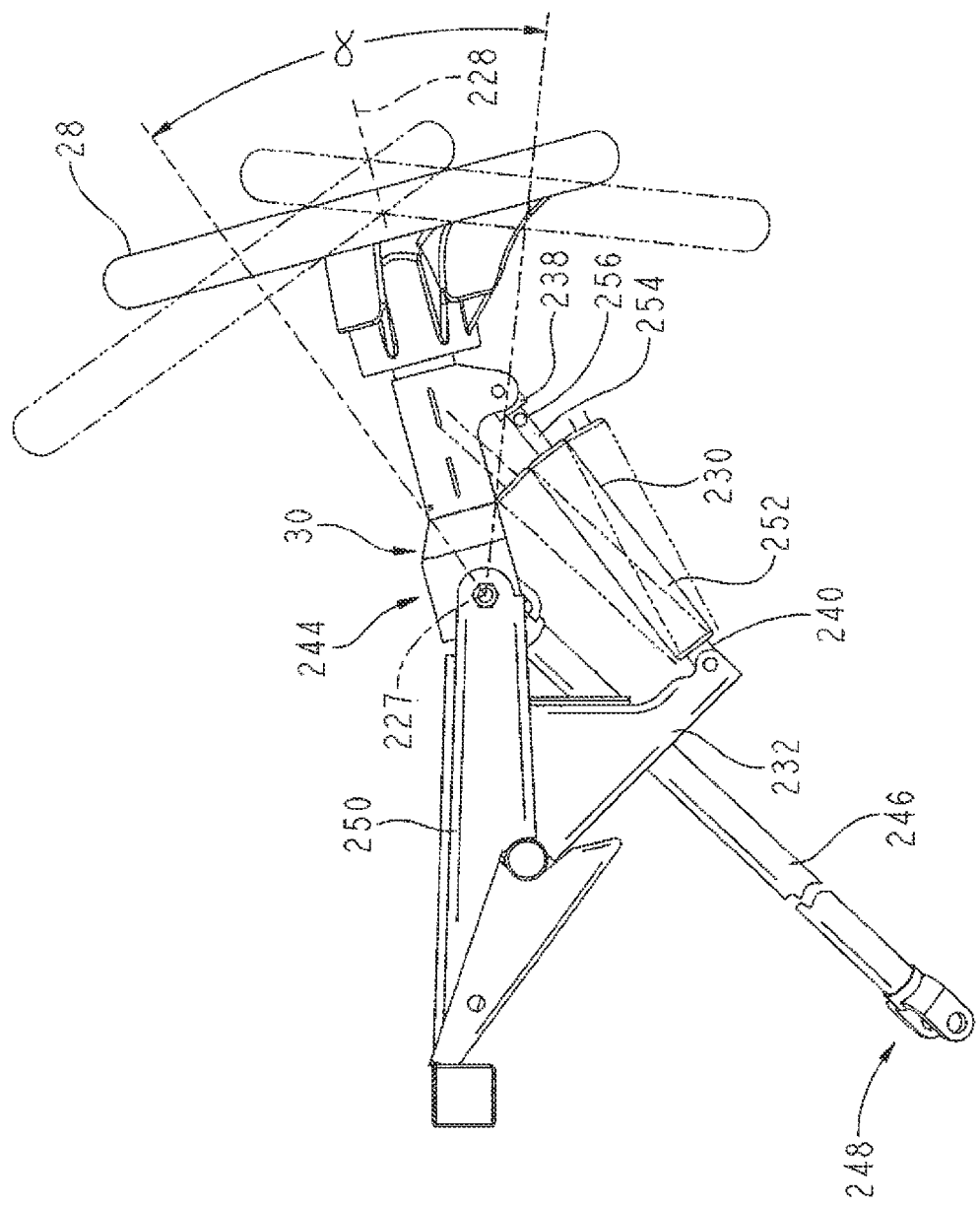
FIG. 29 is a side elevational view of the steering assembly of FIG. 28, showing the steering wheel in various tilted positions.

Referring now to FIG. 28, an exploded view of a steering assembly that may be used on an ATV such as ATV 10 is shown. In this illustrative embodiment, steering wheel 28 may be tilted by pivoting about a pivot axis 227, as shown in FIG. 29. Illustratively, steering wheel 28 may be infinitely adjusted, i.e. in a continuous manner, throughout a predefined angular range of motion α. In the illustrated embodiment, α is defined to be approximately 42 degrees. In a further illustrative embodiment, steering wheel 28 may be adjusted telescopically in a direction along a longitudinal axis 228.

Steering wheel 28 is coupled to rod 234 which extends through tilt bracket 30. Rod 234 is connected to coupler 242 which translates rotation of steering wheel 28 and rod 234 to universal joint 244. Universal joint 244 is coupled to an upper end of steering shaft 246. The lower end of steering shaft 246 is coupled to universal joint 248 which translates the rotation of steering shaft 246 to a front gearbox assembly 247 and steering arms 208 (FIG. 22) to turn front wheels 24. Tilt bracket 30 is pivotally coupled to bracket 250 by a fastener assembly 235, defining pivot axis 227. Fastener assembly 235 may include conventional bolts 235a, washers 235b, and nuts 235c. Bracket 250 includes lower arm 232. Lower end or mount 240 of adjustment device 230 is coupled to arm 232 of bracket 250. Upper end or mount 238 of adjustment device 230 is coupled to tabs 236 of tilt bracket 30. When steering wheel 28 is tilted upward, adjustment device 230 is extended and tilt bracket 30 is rotated upward. Conversely, when steering wheel 28 is tilted downward, adjustment device 230 is retracted and tilt bracket 30 is rotated downward.

In the illustrated embodiment, adjustment device 230 comprises a gas spring having a cylinder 252 and a movable piston rod 254. A lever 256 is operably coupled to the piston rod 254 and is configured to selectively block fluid flow within the cylinder 252. In operation, the lever 256 is in a rest position when it blocks fluid flow and locks the rod 254, and hence steering wheel 28, in position. Activation of the lever 256 permits fluid flow within the cylinder 252 and thus adjustment of the rod 254, and steering wheel 28. In one illustrative embodiment, adjustment device 230 comprises a Bloc-O-Lift® gas spring available from Stabilus.

Figure 30:
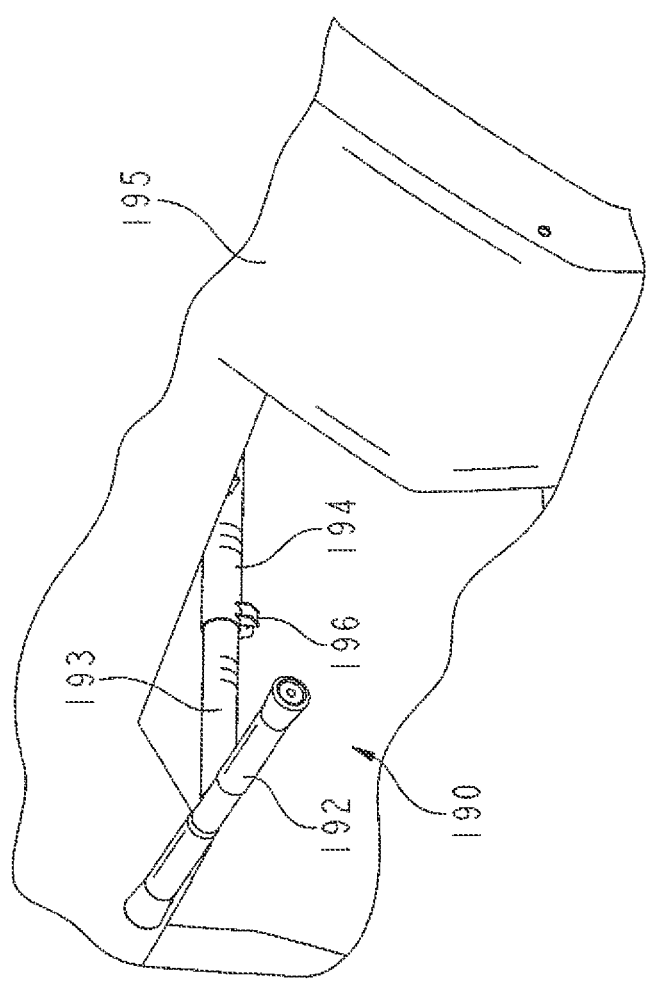
FIG. 30 is a partial perspective view of an adjustable grab bar that may be used on an ATV such as the side-by-side ATV shown in FIGS. 1 through 4.

Referring now to FIG. 30, an adjustable grab bar for a passenger riding in ATV 10 is shown. Adjustable grab bar 190, also shown in FIGS. 22 and 23, is positioned in front dash panel 195 of ATV 10 and extends rearward toward a passenger seated in cab 17. Adjustable grab bar 190 includes handle portion 192, tubes 193 and 194, and locking mechanism 196. The passenger may telescopically adjust the position of handle portion 192. Tube 193 may be extended out of and retracted within tube 194 to allow the passenger to adjust the position of handle portion 192 during ingress or egress from cab 17 of ATV 10. Locking mechanism 196 secures tube 193 and handle portion 192 in the desired position.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. An all-terrain vehicle, comprising:
    a frame;
    a pair of laterally spaced-apart seating surfaces supported by the frame, the pair of laterally spaced-apart seating surfaces including a lower seating surface having an upward facing seating surface height and a seating surface low point height, the lower seating surface further including a lower seating surface rearmost point, the lower seating surface rearmost point being located within a vertical rear seat plane, a rearward seat height point being defined at the upward facing seating surface height within the vertical rear seat plane;
    an engine located rearwardly of the vertical rear seat plane,
    a transmission,
    a pair of front wheels;
    a pair of rear wheels spaced-apart from the pair of front wheels by a wheelbase distance, the pairs of front and rear wheels adapted to support the frame above a ground surface, the pair of laterally spaced-apart seating surfaces supported above the frame by a seat height distance;
    front and rear axle attachment points that are fixed relative to the frame and are operable to respectively couple a front axle and a rear axle to the frame;
    a power train drivingly coupled to front and rear wheels, the power train including a front drive shaft operable to drive the front wheels, a portion of the drive shaft being located in a space that is:
        1) lower than the upward facing seating surface height,
        2) higher than a portion of the frame that supports the laterally spaced-apart seating surfaces,
        3) rearward of a forwardmost portion of the lower seating surfaces, and
        4) forward of the vertical rear seat plane; and
    wherein the front and rear axle attachment points define a first attachment axis therebetween, the front axle attachment point and the rearward seat height point defining a second axis therebetween, the first and second axes cooperating to define a first angle, the first angle being less than 12 degrees, further wherein a pair of outermost lateral points of the vehicle define a vehicle width of less than 54 inches.

2. An all-terrain vehicle, comprising:
    a frame:
    a pair of laterally spaced-apart seating surfaces supported by the frame, the pair of laterally spaced-apart seating surfaces including a lower seating surface having an upward facing seating surface height and a seating surface low point height, the lower seating surface further including a lower seating surface rearmost point, the lower seating surface rearmost point being located within a vertical rear seat plane, a rearward seat height point being defined at the upward facing seating surface height within the vertical rear seat plane;
    an engine located rearwardly of the vertical rear seat plane.
    a transmission,
    a pair of front wheels;
    a pair of rear wheels spaced-apart from the pair of front wheels by a wheelbase distance, the pairs of front and rear wheels adapted to support the frame above a ground surface, the pair of laterally spaced-apart seating surfaces supported above the frame by a seat height distance;
    front and rear axle attachment points that are fixed relative to the frame and are operable to respectively couple a front axle and a rear axle to the frame;
    a power train drivingly coupled to front and rear wheels, the power train including a front drive shaft operable to drive the pair of front wheels, a portion of the front drive shaft being located in a space that is:
        1) lower than the upward facing seating surface low point height,
        2) higher than a portion of the frame that supports the pair of laterally spaced-apart seating surfaces,
        3) rearward of a forwardmost portion of the lower seating surfaces, and
        4) forward of the vertical rear seat plane and
    wherein the front and rear axle attachment points define a first attachment axis therebetween, the front axle attachment point and the rearward seat height point defining a second axis therebetween, the first and second axes cooperating to define a first angle, the first angle being less than 12 degrees, the engine is part of a modular engine assembly having a clutch cooling inlet and an engine cooling inlet each adapted to communicate cooling air to the modular engine assembly, the clutch cooling inlet and the engine cooling inlet extending upwardly laterally between the laterally spaced-apart seating surfaces.

3. The all-terrain vehicle of claim 1, further comprising a cab including a protective cage, the protective cage including an upper portion, the upper portion having a width less than the vehicle width.

4. The all-terrain vehicle of claim 1, further comprising a torsion bar operably coupled between the pair of front wheels.

5. The all-terrain vehicle of claim 1, wherein the engine is supported by the frame and defines a power output, further wherein the all-terrain vehicle defines a weight and a power to weight ratio, the power to weight ratio being equal to at least 0.045/1 horsepower/pound.

6. The all-terrain vehicle of claim 1, wherein the rear axle attachment point and the rearward seat height point define a third axis therebetween, the first and third axes cooperating to define a second angle, the second angle being less than 22 degrees.

7. The all-terrain vehicle of claim 1, wherein the rear axle attachment point and the rearward seat height point define a third axis therebetween, the second and third axes cooperating to define a third angle, the third angle being greater than 147 degrees.

8. An all-terrain vehicle, comprising:
    a frame including a lower frame member that defines a ground clearance height for the vehicle;
    a pair of laterally spaced-apart seating surfaces supported by the frame, the pair of laterally spaced-apart seating surfaces including a lower seating surface having an upward facing seating surface height and a seating surface low point height, the lower seating surface further including a lower seating surface rearmost point, the lower seating surface rearmost point being located within a vertical rear seat plane, a rearward seat height point being defined at the upward facing seating surface height within the vertical rear seat plane;

an engine located rearwardly of the vertical rear seat plane, a transmission, a pair of front wheels defining a front wheelbase vertical plane;

a pair of rear wheels defining a rear wheelbase vertical plane, the front and rear wheelbase vertical planes being spaced-apart to define a wheelbase distance, the pairs of front and rear wheels adapted to support the frame above a ground surface;

front and rear lower frame wheelbase points that are defined at the ground clearance height on the front and rear wheelbase vertical planes, respectively;

a power train drivingly coupled to front and rear wheels, the power train including a front drive shaft operable to drive the pair of front wheels, a portion of the front drive shaft being located in a space that is:
1) lower than the upward facing seating surface low point height,
2) higher than a portion of the frame that supports the pair of laterally spaced-apart seating surfaces,
3) rearward of a forwardmost portion of the lower seating surfaces, and
4) forward of the vertical rear seat plane; and wherein the front and rear lower frame wheelbase points define a first axis therebetween, the front lower frame wheelbase point and the rearward seat height point defining a second axis therebetween, the first and second axes cooperating to define a first angle, the first angle being less than 17 degrees, further wherein a pair of outermost lateral points of the vehicle define a vehicle width of less than 54 inches.

9. The vehicle of claim 8, wherein the rear lower frame wheelbase point and the rearward seat height point define a third axis therebetween, the first and third axes cooperating to define a second angle, the second angle being less than 32 degrees.

10. The all-terrain vehicle of claim 8, wherein the rear lower frame wheelbase point and the rearward seat height point define a third axis therebetween, the second and third axes cooperating to define a third angle, the third angle being greater than 131 degrees.

11. An all-terrain vehicle, comprising:
a frame;
a pair of laterally spaced-apart seating surfaces supported by the frame, the pair of laterally spaced-apart seating surfaces including a lower seating surface having a low point; an engine located rearwardly of a vertical rear seat plane containing the low point,
a transmission,
a pair of front wheels;
a pair of rear wheels spaced-apart from the pair of front wheels by a wheelbase distance, the pairs of front and rear wheels adapted to support the frame above a ground surface, the pair of laterally spaced-apart seating surfaces supported above the frame by a seat height distance;
front and rear axle attachment points that are fixed relative to the frame and are operable to respectively couple a front axle and a rear axle to the frame;

a power train drivingly coupled to front and rear wheels, the power train including a front drive shaft operable to drive the pair of front wheels, a portion of the front drive shaft being located in a space that is:
1) lower than the lower seating surface low point,
2) higher than a portion of the frame that supports the pair of laterally spaced-apart seating surfaces,
3) rearward of a forwardmost portion of the lower seating surfaces, and
4) forward of the vertical rear seat plane; and wherein the front and rear axle attachment points define a first attachment axis therebetween, the front axle attachment point and the lower seating surface low point defining a second axis therebetween, the first and second axes cooperating to define a first angle, the first angle being less than 12 degrees when viewed in a lateral plan view, further wherein a pair of outermost lateral points of the vehicle define a vehicle width of less than 54 inches.

12. The all-terrain vehicle of claim 11, wherein the rear axle attachment point and the lower seating surface low point define a third axis therebetween, the first and third axes cooperating to define a second angle, the second angle being less than 21 degrees.

13. The all-terrain vehicle of claim 11, wherein the rear axle attachment point and the lower seating surface low point define a third axis therebetween, the second and third axes cooperating to define a third angle, the third angle being greater than 147 degrees.

14. An all-terrain vehicle, comprising:
a frame including a lower frame member that defines a ground clearance height for the vehicle;
a pair of laterally spaced-apart seating surfaces supported by the frame, the pair of laterally spaced-apart seating surfaces including a lower seating surface having a low point;
an engine located rearwardly of a vertical rear seat plane containing the low point,
a transmission,
a pair of front wheels defining a front wheelbase vertical plane;
a pair of rear wheels defining a rear wheelbase vertical plane, the front and rear wheelbase vertical planes being spaced-apart to define a wheelbase distance, the pairs of front and rear wheels adapted to support the frame above a ground surface;
front and rear lower frame wheelbase points that are defined at the ground clearance height on the front and rear wheelbase vertical planes, respectively;
a power train drivingly coupled to front and rear wheels, the power train including a front drive shaft operable to drive the pair of front wheels, a portion of the front drive shaft being located in a space that is:
1) lower than the lower seating surface low point,
2) higher than a portion of the frame that supports the pair of laterally spaced-apart seating surfaces,
3) rearward of a forwardmost portion of the lower seating surfaces, and
4) forward of the vertical rear seat plane; and wherein the front and rear lower frame wheelbase points define a first axis therebetween, the front lower frame wheelbase point and the lower seating surface low point defining a second axis therebetween, the first and second axes cooperating to define a first angle, the first angle being less than 18 degrees when viewed in a lateral plan view, further wherein a pair of outermost lateral points of the vehicle define a vehicle width of less than 54 inches.

15. The vehicle of claim 14, wherein the rear lower frame wheelbase point and the lower seating surface low point define a third axis therebetween, the first and third axes cooperating to define a second angle, the second angle being less than 31 degrees.

16. The all-terrain vehicle of claim 14, wherein the rear lower frame wheelbase point and the lower seating surface low point define a third axis therebetween, the second and third axes cooperating to define a third angle, the third angle being greater than 132 degrees.

17. An all-terrain vehicle, comprising:
  a frame including a lower frame member that defines a ground clearance height for the vehicle;
  a pair of laterally spaced-apart seating surfaces supported by the frame, the pair of laterally spaced-apart seating surfaces including a lower seating surface having a low point;
  an engine located rearwardly of a vertical rear seat plane containing the low point,
  a transmission,
  a pair of front wheels;
  a pair of rear wheels, the pairs of front and rear wheels adapted to support the frame above a ground surface;
  front and rear wheel-axle points that are defined at centers of the front and rear wheels, respectively;
  a power train drivingly coupled to front and rear wheels, the power train including a front drive shaft operable to drive the pair of front wheels, a portion of the front drive shaft being located in a space that is:
  1) lower than the lower seating surface low point,
  2) higher than a portion of the frame that supports the pair of laterally spaced-apart seating surfaces,
  3) rearward of a forwardmost portion of the lower seating surfaces, and
  4) forward of the vertical rear seat plane; and
  wherein the front and rear wheel-axle points define a first axis therebetween, the front wheel-axle point and the lower seating surface low point defining a second axis therebetween, the first and second axes cooperating to define a first angle, the first angle being less than 15 degrees when viewed in a lateral plan view, further wherein a pair of outermost lateral points of the vehicle define a vehicle width of less than 54 inches.

18. The vehicle of claim 17, wherein the rear wheel-axle point and the lower seating surface low point define a third axis therebetween, the first and third axes cooperating to define a second angle, the second angle being less than 27 degrees.

19. The all-terrain vehicle of claim 17, wherein the rear wheel-axle point and the lower seating surface low point define a third axis therebetween, the second and third axes cooperating to define a third angle, the third angle being greater than 138 degrees.

20. The vehicle of claim 1, wherein the transmission has a forwardmost point that is not located forward of a forwardmost point of the engine.

21. The vehicle of claim 8, wherein the transmission has a forwardmost point that is not located forward of a forwardmost point of the engine.

22. The vehicle of claim 11, wherein the transmission has a forwardmost point that is not located forward of a forwardmost point of the engine.

23. The vehicle of claim 14, wherein the transmission has a forwardmost point that is not located forward of a forwardmost point of the engine.

24. The vehicle of claim 17, wherein the transmission has a forwardmost point that is not located forward of a forwardmost point of the engine.

\* \* \* \* \*

UNITED STATES PATENT AND TRADEMARK OFFICE
CERTIFICATE OF CORRECTION

PATENT NO. : 9,434,244 B2
APPLICATION NO. : 13/776588
DATED : September 6, 2016
INVENTOR(S) : Richard Larry Sunsdahl et al.

Page 1 of 1

It is certified that error appears in the above-identified patent and that said Letters Patent is hereby corrected as shown below:

In the Claims

In Claim 1, Column 13, Line 42, please amend as follows:
--front drive shaft operable to drive the pair of front wheels, a portion of the front drive shaft being located in a space that is:--

In Claim 1, Column 13, Line 44, please amend as follows:
--lower than the upward facing seating surface low point height.--

In Claim 1, Column 13, Line 46, please amend as follows:
--higher than a portion of the frame that supports the pair of laterally spaced-apart seating surfaces.--

Signed and Sealed this
Twenty-first Day of February, 2017

Michelle K. Lee
*Director of the United States Patent and Trademark Office*